United States Patent
Yamada et al.

(10) Patent No.: US 7,099,085 B2
(45) Date of Patent: Aug. 29, 2006

(54) OPTICAL PICK-UP APPARATUS AND SEMICONDUCTOR LASER APPARATUS

(75) Inventors: Shigehiro Yamada, Yamatokooriyama (JP); Takashi Itoh, Nara (JP); Nobumasa Kaneko, Nara (JP); Kazunori Matsubara, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 70 days.

(21) Appl. No.: 10/723,888

(22) Filed: Nov. 26, 2003

(65) Prior Publication Data

US 2004/0174801 A1 Sep. 9, 2004

(30) Foreign Application Priority Data

Nov. 27, 2002 (JP) ............................ P2002-344212
Jun. 30, 2003 (JP) ............................ P2003-188345

(51) Int. Cl.
*G02B 5/18* (2006.01)
(52) U.S. Cl. .................. 359/569; 359/15; 359/495; 369/112.05; 369/112.1; 369/112.16
(58) Field of Classification Search ............... 359/566, 359/15, 569, 486, 495, 619; 369/112.03, 369/112.04, 112.05, 112.06, 112.07, 112.1, 369/112.11, 112.12, 112.15, 112.16, 112.17, 369/112.18, 112.19, 121, 122
See application file for complete search history.

(56) References Cited

U.S. PATENT DOCUMENTS

| 5,748,658 | A | 5/1998 | Nakanishi et al. ............. 372/43 |
| 6,195,315 | B1 * | 2/2001 | Takahashi et al. ........ 369/44.23 |
| 6,366,548 | B1 * | 4/2002 | Ohyama ................ 369/112.04 |
| 6,574,182 | B1 * | 6/2003 | Yamada et al. ......... 369/112.03 |

FOREIGN PATENT DOCUMENTS

| JP | 6-203403 | 7/1994 |
| JP | 11-25465 | 1/1999 |
| JP | 11-174226 | 7/1999 |
| JP | 2000-196176 | 7/2000 |
| JP | 2000-196177 | 7/2000 |
| JP | 2001-111159 | 4/2001 |
| WO | WO 200036597 A1 * | 6/2000 |

* cited by examiner

Primary Examiner—Arnel C. Lavarias
(74) Attorney, Agent, or Firm—Morrison & Foerster LLP

(57) ABSTRACT

An optical pick-up apparatus and a semiconductor laser apparatus which can suppress reduction of optical utilization efficiency for the laser light emitted from the semiconductor laser element. When a laser light which is emitted from a laser element for DVD and whose polarization direction is perpendicular to a direction of a groove of the polarization grating is incident on the polarization grating, the polarization grating does not diffract the laser light and transmits the laser light as zero-order diffraction light. Consequently, all of the laser light emitted from the laser element for DVD can be used for reading information signal of DVD and detecting FES and TES. This enables reduction of optical utilization efficiency arising by diffracting action of a grating used for detecting TES of CD in a conventional optical pick-up apparatus to be suppressed.

3 Claims, 30 Drawing Sheets

FIG. 20
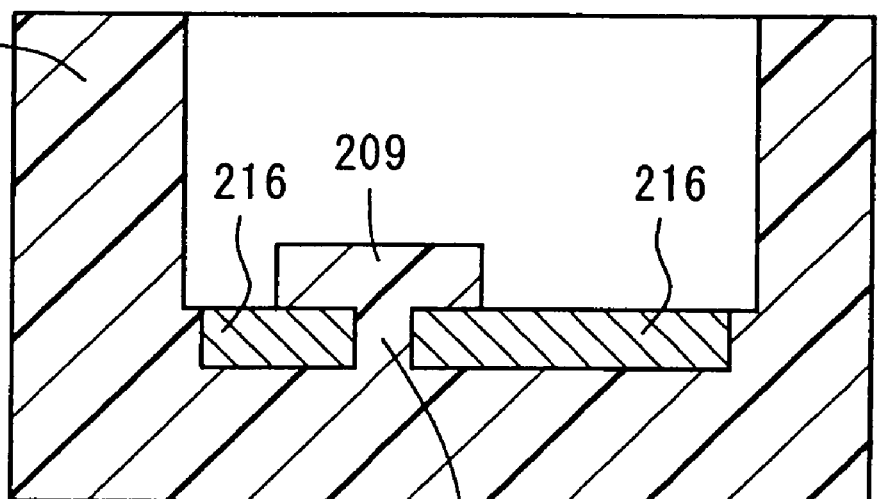
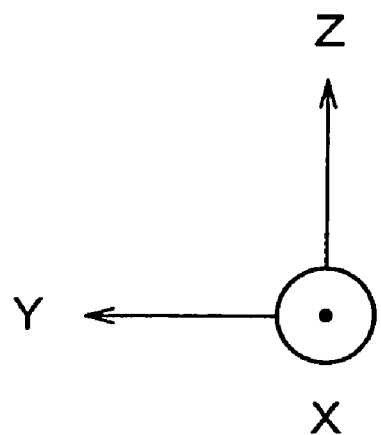

OPTICAL PICK-UP APPARATUS AND SEMICONDUCTOR LASER APPARATUS

BACKGROUND OF THE INVENTION

1. Field of the Invention

The present invention relates to an optical pick-up apparatus which reads information in an optical recording medium such as CD (Compact Disk), DVD (Digital Versatile Disk) or the like and records the information into an optical recording medium and also relates to a semiconductor laser apparatus which can be preferably implemented for the optical pick-up apparatus.

2. Description of the Related Art

FIG. 28 is a view showing simplified configuration of a conventional optical pick-up apparatus 1 and FIG. 29 is a view showing diffraction light occurring after laser lights R and r emitted from first and second semiconductor laser elements 12 and 13 respectively transmit a grating 3. In addition, in FIG. 29, a broken line is drawn respectively for first-order diffraction light R1 and first-order diffraction light R1' occurring when the laser light R emitted from the first semiconductor laser element 12 is spectrally split by incidence of the laser light R on the grating 3 and a solid line is drawn respectively for first-order diffraction lights r1 and r1' occurring when the laser light r emitted from the second semiconductor laser element 13 is spectrally split by incidence of the laser light r on the grating 3.

The optical pick-up apparatus 1 comprises a semiconductor laser unit 2, the grating 3 (however, there is a case where the grating is represented as diffraction grating in the following description), a collimating lens 4, a beam splitter 5, an object lens 6, a splitting element 7, a light-receiving element 8, a driving portion 9, a signal processing portion 10 and a control portion 11. The optical pick-up apparatus 1 is used for optically reading information recorded on an information recording surface of an optical recording medium 17 and for optically recording the information in the information recording surface.

The semiconductor laser unit 2 comprises the first semiconductor laser element 12 emitting red wavelength laser light whose oscillating wavelength is for instance 654 nm, the second semiconductor laser element 13 emitting infrared laser light whose oscillating wavelength is for instance 784 nm, a stem 14, leads 15 and a cap 16. The first semiconductor laser element 12 is used at the time of reading information for instance in DVD. (Digital Versatile Disk) and the second semiconductor laser element 13 is used at the time of reading information for instance in CD (Compact Disk).

In the following description, there is a case where the first semiconductor laser element is represented as a laser element for DVD and the second semiconductor laser element is represented as a laser element for CD.

In the optical pick-up apparatus 1, when the laser light R emitted from the laser element 12 for DVD is incident on the grating 3, the laser light R is spectrally split into three laser lights consisting of zero-order diffraction light R0 transmitting the grating 3 without diffraction, diffracted first-order diffraction light R1 and diffracted first-order diffraction light R1'. When the laser light r emitted from the laser element 13 for CD is incident on the grating 3, the laser light r is spectrally split into three laser lights consisting of zero-order diffraction light r0 transmitting the grating 3 without diffraction, diffracted first-order diffraction lights r1 and r1'. As mentioned above, when the laser light R and the laser light r emitted respectively from the laser element for DVD 12 and the laser element for CD 13 are incident on the grating 3, diffraction angles and diffraction efficiency are respectively different depending on difference between wavelengths of two laser lights R and r, but the two laser lights R and r are spectrally split in concurrence with each other by the grating 3.

After the laser lights R1 and r1 are spectrally split respectively into three laser lights by the grating 3, the split laser lights pass through the collimating lens 4, the beam splitter 5 and the object lens 6 and are converged on the optical recording medium 17. A substantially half of light is reflected by the beam splitter 5 and the reflected light is not used. Laser light reflected by the optical recording medium 17 passes through the object lens 6 and then a substantially half of the reflected laser light is reflected by the beam splitter 5, and the reflected light is incident on the predetermined light-receiving element 8 via the splitting element 7.

The beam splitter 5 is concretely configured by an infrared dichroic beam splitter and a red dichroic beam splitter which are arranged on a common optical axis. The infrared dichroic beam splitter has fifty percent of reflectance for the laser element 13 for CD and makes a hundred percent of incident light transmit the infrared dichroic beam splitter for the laser element 12 for DVD. In addition, the red dichroic beam splitter has fifty percent of reflectance for the laser element 12 for DVD and makes a hundred percent of incident light transmit the infrared dichroic beam splitter for the laser element 13 for CD.

On the splitting element 7, signal light is split so as to get information, a focus error signal (hereinafter abbreviated to FES) and a tracking error signal (hereinafter, abbreviated as TES) which are recorded in the optical recording medium 17.

When TES of DVD is detected, DPP (Differential Push-Pull) method is used. In this case, it is sufficient that laser light emitted from the laser element 12 for DVD is split into three portions including an optical axis through the splitting element 7 and the three portions are received. Here, as to the laser light emitted from the laser element 12 for DVD, a section perpendicular to the optical axis is circular. In addition, when FES of DVD is detected, the laser light emitted from the laser element 12 for DVD is split into a first semicircle including the optical axis and a second semicircle and the second semicircle is additionally split into two quarter circles which include the optical axis and have an equal area and thereby FES can be detected in a knife-edge method.

On the other hand, when TES of CD is detected, a three-beam method, using three laser lights which are emitted from the laser element 13 for CD and are spectrally split by the grating 3, is used. In addition, when FES of CD is detected, the zero-order diffraction light on the grating 3 is split into two portions including the optical axis by the splitting element 7 and thereby FES can be detected in the knife-edge method.

The laser light being incident on the light-receiving element 8 is converted to an electric signal. On the basis of this electric signal, Reading is performed for an information signal recorded on the information recording surface of the optical recording medium 17 such as CD and DVD or the like, and a detection of FES and TES is performed.

Here, FES is used for performing control for adjusting a focus so that the focus can be always formed on the information recording surface by following surface oscillation of the optical recording medium 17. TES is used for performing a control for correcting a gap from a track center of laser light converged on the information recording surface of the optical recording medium 17 to perform a control for making the laser light follow the track precisely.

As another prior art, an optical head which is provided with two semiconductor laser elements having different oscillating wavelength and reads out signal on the optical recording medium with different signal reading out wavelength. This optical head is provided with a polarization hologram which incident laser light transmits as zero-order diffraction light or on which the laser light is diffracted as ± first-order diffraction light in dependence on the difference in an oscillating direction of the laser light.

On the optical head, two laser lights emitted from the two semiconductor laser elements having different oscillating wavelengths concurrently transmit the polarization hologram as zero-order diffraction light, and pass through the collimating lens, a quarter-wavelength plate and the object lens and are converged on the optical recording medium. The laser light reflected by the optical recording medium follows the same optical path as an approach route and passes through the object lens, the quarter wavelength plate and the collimating lens and is incident on the polarization hologram. The laser light which is incident on the polarization hologram is diffracted as ± first-order diffraction light and is incident on a photodetector disposed at a position corresponding to the diffracting direction of the laser light (for instance, see Japanese Unexamined Patent Publication JP-A 11-174226).

As mentioned above, an optical pick-up apparatus which reads and records information into an optical recording medium such as CD and DVD or the like is configured by, for instance, a semiconductor laser apparatus with a hologram laser method. The hologram laser method is explained as follows. In a semiconductor laser apparatus for which a semiconductor laser element, a hologram element and a light-receiving element for detecting a signal are incorporated in one package, laser light is emitted from the semiconductor laser element, and a signal light reflected by the optical disk functioning as an optical recording medium is diffracted by a hologram element in a direction which is different from the semiconductor laser element traveling direction, and the signal light is guided to the light-receiving element for detecting a signal.

A semiconductor laser apparatus 100 shown in aftermentioned FIGS. 30A, 30B and 31 to 35 is known as a conventional semiconductor laser apparatus with use of the hologram laser method. FIG. 30A is a simplified perspective view showing the conventional semiconductor laser apparatus 100. FIG. 30B is a perspective view showing the semiconductor laser apparatus 100 from which a hologram element 106 is omitted. FIG. 31 is a front view showing the semiconductor laser apparatus 100. FIG. 32 is a right side view showing the semiconductor laser apparatus 100. FIG. 33 is a cross sectional view on a cross sectional line A—A in FIG. 31. FIG. 34 is a cross sectional view on a cross sectional line B—B in FIG. 31. FIG. 35 is a cross sectional view on a cross sectional line C—C in FIG. 31. Here, an X-axis, a Y-axis and a Z-axis shown in these drawings are three-dimensional orthogonal coordinate axes. Directions of the X-axis, the Y-axis and the Z-axis correspond to a longitudinal direction, a width direction and a thickness direction respectively of the semiconductor laser apparatus 100.

The semiconductor laser apparatus 100 comprises a semiconductor laser element 101, a sub-mount 102, an optical axis conversion mirror 103, the hologram element 106, a light-receiving element 107 for detecting a signal, an insulating frame 108, and leads 109. The hologram element 106 comprises a grating for generating three beams 104 and a hologram pattern 105. The sub-mount 102 is mounted on an island portion 111.

In an optical pick-up apparatus using the semiconductor laser apparatus 100, a plurality of light sources having different oscillation wavelengths are required for performing reading and writing information with the following two optical recording media. One is an optical recording medium called as CD family which performs reading and recording of information using only light, and the other is an optical recording medium called as DVD family which performs reading and recording information using light and magnetism. In the conventional semiconductor laser apparatus 100, as a light source, the semiconductor laser element 101 is applied, and the semiconductor laser element 101 comprises first oscillating point emitting a laser light for performing reading and recording for the optical recording media of CD family, and second oscillating point emitting a laser light for performing reading and recording toward the optical recording media of DVD family.

The laser lights 110a and 110b emitted from the first and the second oscillating points of the semiconductor laser element 1 respectively in the conventional semiconductor laser apparatus 100 are reflected by the optical axis conversion mirror 103 as shown in FIG. 33, and the traveling direction of the laser lights 110a and 110b is changed to vertical direction. The laser lights 110a and 110b which are changed the traveling direction by the optical axis conversion mirror 103 are incident on the grating 104 for generating three beams. When the laser lights 110a and 110b are incident on the grating 104 for generating three beams, the laser lights 110a and 110b are split into zero-order diffraction light which is transmitted without being diffracted and ± first-order diffraction light which is diffracted. After being split into three laser lights by the grating 104 for generating three beams, three laser lights are converged on an optical recording medium which is not shown in the figures. As shown in FIG. 35, the laser lights 110a and 110b emitted from the semiconductor laser element 101 and reflected by the optical recording medium, are diffracted by the hologram pattern 105, and are incident on the predetermined receiving portion of the light-receiving element 107 for detecting a signal.

When a tracking error signal (hereinafter abbreviated as TES) in the optical recording medium of CD family is detected, a three-beam method is applied in which a sub-beam proceeds in an elongating direction of the optical recording medium track against a main beam and another sub-beam follows are used. Further, when the TES in the optical recording medium of DVD family is detected, a phase difference method using the phase difference between signals splitting the main beam is used.

In another conventional semiconductor laser apparatus, a semiconductor laser chip is mounted on a chip mounting portion, a connecting point on external leads provided by surrounding the chip mounting portion and an electrode of the semiconductor laser chip are connected, and a frame body made from insulating material is provided surrounding the chip mounting portion and the connecting point on external leads. A hologram optical element including a grating pattern for generating three beams and a hologram pattern for beam splitter is mounted On the frame body. The laser light emitted from the semiconductor laser chip is split into three laser lights by the grating pattern for generating three beams, and then is converged on the optical disk. The laser light reflected by the optical disk is diffracted by the hologram pattern for beam splitter, and is incident on a light detecting circuit (for instance, see Japanese Unexamined Patent Publications JP-A 6-203403, JP-A 2000-196176, JP-A 2000-196177, and JP-A 2001-111159).

Furthermore, a semiconductor laser apparatus in another prior art, a semiconductor laser chip is mounted on a lead frame, and the lead frame is encapsulated with resin package. On the resin package, a hologram element including a grating and a hologram is mounted. Laser light emitted from a semiconductor laser chip is reflected by a micro mirror and is incident on the grating, and is split into three laser lights, then is converged on an optical disk. Laser light reflected by the optical disk is diffracted by a hologram, and is incident on a photodiode (for instance, see Japanese Unexamined Patent Publication JP-A 11-25465).

In the above mentioned conventional optical pick-up apparatus 1, when the TES of CD is detected, for instance, the three-beam method is applied. In the three-beam method, TES is detected by using three laser lights r0, r1, and r1' to which a laser light r having infrared wavelength emitted from a laser element 13 for CD is spectrally split by the grating 3. In the optical pick-up apparatus 1, when the TES of DVD is detected, for instance, DPD (Differential Phase Detection) method is applied. In the DPD method, TES is detected by splitting light R0 which is one laser light transmitted as zero-order diffraction light by the fact that laser light R having red wavelength emitted from the laser element 12 for DVD is incident on the grading 3.

As mentioned above, the TES of DVD can be detected by only applying one laser light R0, and it is not necessary to split the laser light R emitted from the laser element 12 for DVD to three laser lights R0, R1, and R1' by the grating 3. In other words, when the TES of DVD is detected, the grating 3 is not necessary. However, in the optical pick-up apparatus 1 having the semiconductor laser unit 2 provided with the laser element 12 for DVD and the laser element 13 for CD having different oscillating wavelength, positions on which the laser element 12 for DVD and the laser element 13 for CD are arranged are close to each other and therefore it is difficult for the optical pick-up apparatus 1 to make only laser light emitted from one laser element incident on the grating 3 and not to make laser light emitted from another laser element incident on the grating 3. This is because conventional optical pick-up apparatus 1 cannot help splitting the laser light R emitted from the laser element 12 for DVD to the three laser lights R0, R1, R1' by grating 3.

Consequently, when TES of DVD is detected, there is usage of one laser light R0 which is not diffracted and transmits as zero-order diffraction light among laser lights R0, R1 and R1' spectrally split by the grating 3 and there is not usage of the two laser lights R1 and R1' spectrally split. Therefore, there is a problem that optical utilization efficiency for the laser light R emitted from the laser element 12 for DVD is reduced. In addition, there is a problem that current consumption is increased by increasing quantity of light of the laser light R emitted from the laser element 12 for DVD in consideration of lowering of the optical utilization efficiency.

As to an optical head in Japanese Unexamined Patent Publication JP-A 111 -174226, two photodetectors should be arranged on a predetermined position on which a semiconductor laser element is sandwiched between the photodetectors and therefore there is a problem that assembling and adjusting the photodetectors are difficult.

In the optical pick-up apparatus using the conventional semiconductor laser apparatus 100, in the case of detecting TES of the optical recording medium of the CD family for instance the three-beam method is used. In the three-beam method, TES is detected by using the three laser lights split by the grating 104 for generating three beams. In addition, in the optical pick-up apparatus using the conventional semiconductor laser apparatus 100, in the case of detecting TES of the optical recording medium of the DVD family for instance the phase difference method is used. In the phase difference method, one laser light transmitted as zero-order diffraction light among three laser lights split by the grating 104 is split and thereby TES is detected.

As mentioned above, when TES of the optical recording medium of the DVD family is detected, there is usage of one laser light which is not diffracted and transmits as zero-order diffraction light among three laser lights split by the grating 104 and there is not usage of the remaining two laser lights split. Therefore, there is a problem that quantity of light of laser light to be originally converged on the optical recording medium is reduced and thereby loss of the quantity of light arises and optical utilization efficiency for the laser light emitted from the semiconductor laser element 1 is reduced.

SUMMARY OF THE INVENTION

An object of the invention is to provide an optical pick-up apparatus and a semiconductor laser apparatus that can suppress reduction of optical utilization efficiency for the laser light emitted from the semiconductor laser element.

The invention provides an optical pick-up apparatus comprising:

a light source for emitting laser light in two wavebands;

a light-receiving element for receiving laser light which is emitted from the light source and is reflected by an optical recording medium; and a grating having polarization characteristics between the light source and the optical recording medium by which the laser light emitted from the light source and being incident is transmitted without diffraction when a polarization direction for the laser light is equal to a predetermined first polarization direction and also by which the laser light emitted from the light source and being incident is diffracted when a polarization direction for the laser light is equal to a predetermined second polarization direction, the optical pick-up apparatus performing at least one of processes for reading information of the optical recording medium and recording information on the optical recording medium by irradiating the optical recording medium by the laser light emitted from the light source on the optical recording medium, and the polarization directions of the laser lights in the two wavebands being orthogonal with each other on a position on which the laser light is incident on the diffraction grating.

According to the invention, as to laser light in one waveband which is emitted from the light source and is incident on the grating for instance red wavelength laser light whose oscillating wavelength is 654 nm, when a polarization direction for the laser light is orthogonal to the predetermined first polarization direction for instance a direction of a groove of the diffraction grating, function of diffraction served as the diffraction grating can be made ineffective and the laser light can be made transmitted without diffraction of the laser light. In addition, as to laser light in another waveband which is emitted from the light source and is incident on the diffraction grating for instance infrared wavelength laser light whose oscillating wavelength is 784 nm, when a polarization direction for the laser light is parallel to the predetermined second polarization direction for instance a direction of a groove of the diffraction grating, function of diffraction served as the diffraction grating can be made effective and the laser light can be made transmitted and can be spectrally split into laser light transmitted as zero-order diffraction light and laser light diffracted as ± first-order diffraction light.

When information of an optical recording medium for instance DVD is read by using red wavelength laser light which is emitted from the light source and whose polarization direction is the first polarization direction, the laser light emitted from the light source is incident on the diffraction grating and nevertheless function of diffraction of the diffraction grating is made ineffective and the diffraction grating transmits the laser light without diffraction of the laser light. Consequently, all the laser lights emitted from the light source can be used for reading the information of DVD. When information of DVD is read by using these laser lights, the optical pick-up apparatus can suppress reduction of optical utilization efficiency which has arisen by diffraction of the laser light diffracted by the diffraction grating similarly as a conventional optical pick-up apparatus. In addition, since the optical pick-up apparatus can suppress reduction of optical utilization efficiency, there is no necessity for increasing quantity of light of the laser light emitted from the light source and increase of current consumption accompanying increase of the quantity of light of the laser light can be avoided and thereby an optical disk reproducer which can reproduce, for instance, DVD and is mobile can reproduce the optical disk for longer time than an optical disk apparatus using a conventional optical pick-up apparatus.

In addition, in the invention it is preferable that the light source emits the first and second polarization directional laser lights which are parallel to each other, and a half wavelength plate is arranged between the diffraction grating and the light source so as not to have an effect on a polarization direction for the second polarization directional laser light and so as to change a polarization direction for the first polarization directional laser light.

According to the invention, when the second polarization directional laser light emitted from the light source is incident on the half wavelength plate, the half wavelength plate has no effect on the polarization direction for the laser light having the second polarization directional wavelength and when the first polarization directional laser light emitted from the light source is incident on the half wavelength plate, the polarization direction for the laser light is rotated at an angle of 90 degrees. Consequently, the polarization directions of the first and second polarization directional laser lights emitted from the light source are orthogonal to each other on a position on which the laser lights are incident on the diffraction grating and thereby only the second polarization directional laser light can be diffracted by the diffraction grating.

In addition, in the invention it is preferable that the optical pick-up apparatus further comprises a first optical assembly, including, a first optical element, disposed between the light source and the optical recording medium, provided with a hologram for diffracting incident light on a first surface portion and spectrally splitting the incident light to a plurality of lights and provided with the diffraction grating on a second surface portion, and a light source unit having the light source and the light-receiving element.

According to the invention, in the optical pick-up apparatus comprising the first optical assembly including the first optical element and the light source unit, the first optical element and the light source unit are unified as the first optical assembly and therefore a number of optical parts and a number of assembling processes are reduced at the time of producing the optical pick-up apparatus and optical adjusting operation such as an optical axis adjustment is simplified and productivity of the optical pick-up apparatus can be improved. In addition, reduction of the number of optical parts enables the optical pick-up apparatus to be miniaturized and become lighter and enables cost of the optical pick-up apparatus to be reduced.

In addition, in the invention it is preferable that the hologram of the first optical element is a polarizing hologram having polarization characteristics by which the laser light emitted from the light source and being incident on the hologram is not diffracted and is transmitted.

According to the invention, laser light emitted from the light source and transmitted by the diffraction grating is incident on the polarizing hologram of the first optical element. The laser light being incident on the polarizing hologram is not diffracted by the polarization characteristics of the polarizing hologram and all the laser light is transmitted as zero-order diffraction light. Using the polarizing hologram enables unnecessary light which arises at the time of using a hologram having no polarization characteristics and is diffracted and is not converged on the information recording surface of the light recording medium to be eliminated and also enables all the laser lights emitted from the light source on the information recording surface of the light recording medium to be converged. And thereby optical utilization efficiency for the laser light emitted from the light source can be improved in comparison with an optical pick-up apparatus provided with hologram having no polarization characteristics.

In addition, in the invention it is preferable that the optical pick-up apparatus further comprises a second optical assembly, including, a second optical element, disposed between the light source and the optical recording medium, provided with a hologram diffracting incident light on a first surface portion and spectrally splitting the incident light to a plurality of lights and provided with the diffraction grating on a second surface portion, and a light source unit having the light source and the light-receiving element.

According to the invention, the laser light transmitted by the diffraction grating is incident on the half wavelength plate arranged between the diffraction grating and the hologram of the first optical element. When the second polarization directional laser light transmitted by the diffraction grating is incident on the half wavelength plate, there is no effect on the polarization direction for the laser light having the second polarization directional wavelength and when the first polarization directional laser light transmitted by the diffraction grating is incident on the half wavelength plate, the polarization direction for the laser light having the first polarization directional wavelength is rotated at an angle of 90 degrees. Laser light transmitted by the half wavelength plate is incident on the hologram. The laser light being incident on the hologram is not subject to diffracting action and all the laser light is transmitted by the hologram and is converged on the optical recording medium. As mentioned above, arranging the half wavelength plate between the diffraction grating and the hologram of the first optical element enables the laser light being incident on the hologram to be subject to no diffracting action of the hologram. This enables unnecessary light which arises by diffracting action of the hologram and is not converged on the optical recording medium to be eliminated and enables optical utilization efficiency for the laser light emitted from the light source to be improved.

In addition, in the optical pick-up apparatus comprising the second optical assembly including the second optical element and the light source unit, the second optical element and the light source unit are unitized as the second optical assembly and therefore a number of optical parts and a number of assembling processes are reduced at the time of producing the optical pick-up apparatus and optical adjusting operation such as an optical axis adjustment is simplified and productivity of the optical pick-up apparatus can be improved. In addition, reduction of the number of optical parts enables the optical pick-up apparatus to be miniaturized and become lighter and enables cost of the optical pick-up apparatus to be reduced.

In addition, the invention provides a semiconductor laser apparatus comprising:

a light source for emitting laser light in a plurality of wavebands and installed so that polarization directions of a plurality of laser lights emitted therefrom can be parallel to each other;

an optical axis conversion mirror for changing a traveling direction of laser light emitted from the light source and provided with a half wavelength plate for changing a polarization direction for laser light in one of wavebands; and a light-receiving element for receiving reflected light of laser light which is emitted from the light source and is transmitted in one direction.

According to the invention, an optical axis conversion mirror is provided with a half wavelength plate for changing a polarization direction for laser light in one of wavebands. Thereby, when for instance infrared wavelength laser light is incident on the axis conversion mirror provided with the half wavelength plate among laser lights emitted from the light source and being in a plurality of wavebands, the infrared laser light is reflected by the axis conversion mirror and a traveling direction of the infrared laser light is changed. In addition, when for instance red wavelength laser light is incident on the axis conversion mirror provided with the half wavelength plate among laser lights emitted from the light source and being in a plurality of wavebands, the red laser light is reflected by the axis conversion mirror and a traveling direction of the infrared laser light is changed and a polarization direction for the red laser light is rotated at an angle of 90 degrees.

When the semiconductor laser apparatus comprising the optical axis conversion mirror provided with the light source and the half wavelength plate is used for instance for the optical pick-up apparatus and the laser light reflected by the optical axis conversion mirror is made incident on a polarization diffraction grating which changes a diffracting function depending on the polarization directions of the laser light, the red wavelength laser light whose polarization direction is rotated at an angle of 90 degrees by the function of the half wavelength plate, is not subject to diffracting action and is transmitted by the polarization diffraction grating and the infrared wavelength laser light whose polarization direction is not changed, is subject to diffracting action and is diffracted to a plurality of laser lights.

Consequently, by using the red wavelength laser light for instance for reading information of DVD and using the infrared laser light for instance for reading information of CD, laser light which is emitted from the light source and is used in a case of reading information of DVD is not diffracted by the diffraction grating with difference from the prior art. This can suppress reduction of optical utilization efficiency accompanied by loss of the quantity of light caused by lowering of the quantity of laser light to be originally converged.

In addition, in the invention it is preferable that the half wavelength plate is a birefringent crystal thin plate.

According to the invention, the birefringent crystal thin plate such as crystal is used as the half wavelength plate. As mentioned above, by using the birefringent crystal thin plate as the half wavelength plate, quantity of phase shift of the half wavelength plate can be precisely controlled. This enables difference of diffraction efficiency for a plurality of laser lights being incident on the polarizing hologram to be set according to design of the difference of diffraction efficiency.

In addition, in the invention it is preferable that the half wavelength plate is an anisotropic resin film.

According to the invention, since the anisotropic resin film is comparatively cheaper than a birefringent crystal, using the anisotropic resin film for instance such as ARTON or the like as a half wavelength enables production cost of the semiconductor laser apparatus to be reduced.

In addition, in the invention it is preferable that the light source and the light-receiving element are mounted on a resin base provided with a lead.

According to the invention, the light source and the light-receiving element are mounted on the resin base provided with the lead. As mentioned above, since the light source and the light-receiving element are mounted on a same base, die bonding and wire bonding can be easily performed. In addition, since die bonding and wire bonding can be easily performed, assembly work of a semiconductor laser apparatus can be performed relatively in a short period of time.

In addition, in the invention it is preferable that the light source and the light-receiving element are mounted on a metal pedestal, a lead kept under a condition electrically insulated from the pedestal is attached to the pedestal, and the lead is arranged so as to extend in a direction parallel to a direction of an optical axis converted by the optical axis conversion mirror.

According to the invention, the light source and the light-receiving element are mounted on the metal pedestal. A lead kept under a condition electrically insulated from the pedestal is attached to the pedestal and the lead is arranged so as to extend in a direction parallel to a direction of an optical axis converted by the optical axis conversion mirror. These apparatuses enable a semiconductor laser apparatus to become thin. In addition, since the light source and the light-receiving element are mounted on the same metal pedestal, there is no necessity for displacing a direction of the semiconductor laser apparatus in the middle of producing the semiconductor laser apparatus. Consequently, the semiconductor laser apparatus can be easily produced and for instance characteristics of laser light emitted from the semiconductor laser apparatus can be easily measured.

In addition, in the invention it is preferable that the light source and the light-receiving element are mounted on a silicon substrate.

According to the invention, the light source and the light-receiving element are mounted on the silicon substrate. As mentioned above, since the light source and the light-receiving element are mounted on the same silicon substrate, positions of the light source and the light-receiving element can be precisely adjusted and a hologram can be easily adjusted. In addition, die bonding and wire bonding can be easily performed. Furthermore, since die bonding and wire bonding can be easily performed, assembly work of a semiconductor laser apparatus can be performed relatively in a short period of time.

In addition, in the invention it is preferable that the optical axis conversion mirror is formed by processing the silicon substrate.

According to the invention, the optical axis conversion mirror is formed by processing the silicon substrate in a predetermined shape. For instance, a projection portion having a truncated pyramid shape is formed with use of etching technique. A side of the projection portion having the truncated pyramid shape formed with use of etching technique is a crystal surface of the silicon substrate and this crystal surface functions as the optical axis conversion mirror. As mentioned above, the shape of the silicon substrate is processed with use of etching technique or the like and thereby a reflection surface, functioning as the optical axis conversion mirror having optical characteristics equal to or more than those of a reflection surface formed in a shape of glass prism, can be formed on the side of the projection portion having the truncated pyramid shape. In addition, an angle of the reflection surface can be easily formed to a predetermined angle with appropriate selection of a surface direction of the silicon substrate and an etching solution.

In addition, in the invention it is preferable that the semiconductor laser apparatus further comprises a polarization diffraction grating having polarization characteristics by which diffraction efficiency for laser light in a predetermined first polarization direction is greater than diffraction efficiency for laser light in a second polarization direction orthogonal to the first polarization direction.

According to the invention, the polarization diffraction grating has polarization characteristics by which diffraction efficiency for laser light in a predetermined first polarization direction is greater than diffraction efficiency for laser light in a second polarization direction orthogonal to the first polarization direction. Consequently, when the laser light in the first polarization direction is incident on the polarization diffraction grating, the laser light in the first polarization direction is diffracted and is split into laser light transmitted as zero-order diffraction light and laser light diffracted as ± first-order diffraction light. In addition, when the laser light in the second polarization direction is incident on the polarization diffraction grating, the laser light in the second polarization direction is not split and is transmitted as zero-order diffraction light.

Consequently, laser light whose polarization direction is the first polarization direction at the time of being incident on the polarization diffraction grating is used for instance for reading information of CD and laser light whose polarization direction is the second polarization direction at the time of being incident on the polarization diffraction grating is used for instance for reading information of DVD and thereby laser light emitted from the light source used in the case of reading information of DVD is not diffracted by the diffraction grating with difference from the prior art. This can suppress reduction of optical utilization efficiency arising with loss of the quantity of light caused by reduction of quantity of laser light to be converged on an optical recording medium.

In addition, in the invention it is preferable that the semiconductor laser apparatus further comprises a hologram for diffracting reflected light of laser light transmitted in one direction into a direction of the light-receiving element, the hologram having polarization characteristics by which diffraction efficiency for laser light in a predetermined first polarization direction is greater than diffraction efficiency for laser light in a second polarization direction orthogonal to the first polarization direction.

According to the invention, the hologram for diffracting the reflected light of laser light transmitted in one direction into a direction of the light-receiving element has polarization characteristics by which diffraction efficiency for laser light in a predetermined first polarization direction is greater than diffraction efficiency for laser light in a second polarization direction orthogonal to the first polarization direction. Using the hologram having the aforementioned polarization characteristics enables optical utilization efficiency for laser light emitted from the light source to be improved. This enables oscillating output of laser light at the light source to be reduced and therefore the light source can be used relatively for a long time.

BRIEF DESCRIPTION OF THE DRAWINGS

Other and further objects, features, and advantages of the invention will be more explicit from the following detailed description taken with reference to the drawings wherein:

FIG. 20 is a cross sectional view taken along a cross sectional line Q—Q of FIG. 18;

DETAILED DESCRIPTION OF THE PREFERRED EMBODIMENTS

Figure 1:
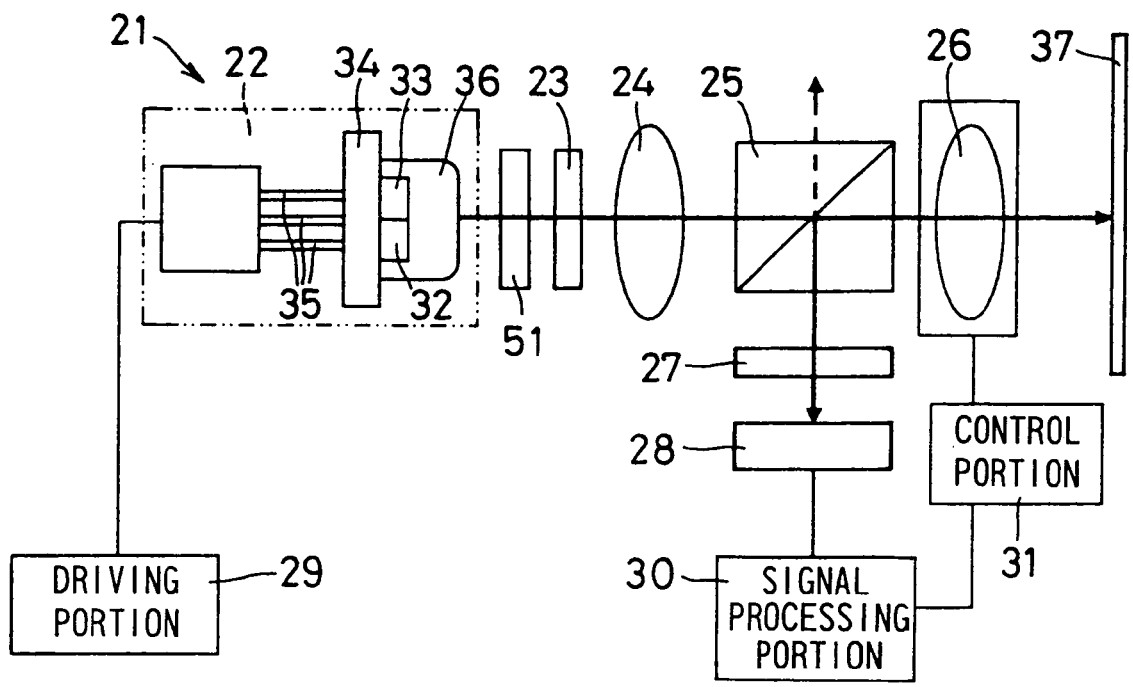
FIG. 1 is a view showing a simplified configuration of an optical pick-up apparatus according to a first embodiment of the invention.

Now referring to the drawings, preferred embodiments of the invention are described below.

Figure 2:
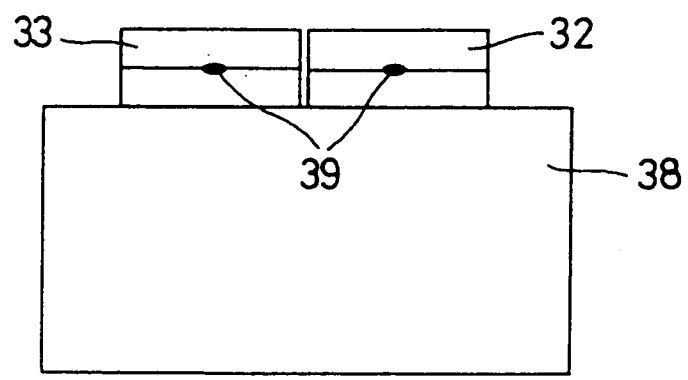
FIG. 2 is a plan view showing first and second semiconductor laser elements which are mounted on a sub-mount 38 and are in different wavebands.

FIG. 1 is a view showing a simplified configuration of an optical pick-up apparatus 21 according to a first embodiment of the invention. FIG. 2 is a plan view showing first and second semiconductor laser elements 32 and 33 which are mounted on a sub-mount 38 and are in different wavebands. The optical pick-up apparatus 21 comprises a semiconductor laser unit 22, a half wavelength plate 51, a polarization grating 23, a collimating lens 24, a beam splitter 25, an object lens 26, a branch element 27, a light-receiving element 28, a driving portion 29, a signal processing portion 30 and a control portion 31.

As the sub-mount 38, a silicon (Si) semiconductor is usually used to integrate a photodiode for monitoring, but in the case of large optical output, dielectric such as silicon carbide (SiC), aluminum nitride (AlN) and sapphire may be used.

An optical pick-up apparatus 21 is an apparatus which can optically read information recorded on information recording surface of an optical recording medium 37 or optically record information on the recording surface. the optical recording medium 37 is for instance CD (Compact Disk) CD-R/RW (Compact Disk-Recordable/ReWritable), DVD (Digital Versatile Disk) or the like.

A semiconductor laser unit 22 comprises a first semiconductor laser element 32, a second semiconductor laser element 33, a stem 34, leads 35 and a cap 36.

The first semiconductor laser element 32 and the second semiconductor laser element 33 correspond to a light source in the optical pick-up apparatus 21. The first semiconductor laser element 32 emits red wavelength laser light whose oscillating wavelength is for instance 654 nm. The first semiconductor laser element 32 is used at the time of reading information recorded on an information recording surface for instance in DVD. The second semiconductor laser element 33 emits infrared laser light whose oscillating wavelength is for instance 784 nm. The second semiconductor laser element 33 is used at the time of reading information recorded on an information recording surface for instance in CD or CD-R/RW. In the following description, the first semiconductor laser element 32 is represented as a laser element 32 for DVD and the second semiconductor laser element 33 is represented as a laser element 33 for CD.

The laser element 32 for DVD and the laser element 33 for CD are arranged on one side of the stem 34. The leads 35 are arranged in a state of projecting from another side of the stem 34 and are electrically connected to the laser element 32 for DVD, the laser element 33 for CD and a driving portion 29.

The cap 36 is a sealing member for sealing the laser element 32 for DVD and the laser element 33 for CD to avoid physical contact of the laser element 32 for DVD and the laser element 33 for CD with an external apparatus and is fixed on one side of the stem 34. This makes the laser element 32 for DVD and the laser element 33 for CD sealed by the stem 34 and the cap 36.

The laser element 32 for DVD and the laser element 33 for CD are mounted on the common sub-mount 38 in parallel as shown in FIG. 2. For instance, a strained super grating type of quantum well laser having different grating constants between an active layer and an substrate is used as the laser element 32 for DVD. A polarization direction of this strained super grating type of quantum well laser has difference of an angle of 90 degrees depending on an absolute value of strain. In the case of a laser element 32 for DVD such as the laser element 32 for DVD whose oscillating wavelength is for instance approximately 654 nm like the laser element 32 for DVD in this embodiment, making a polarization direction of laser light to be emitted parallel to a mounting surface enables characteristics such as a good oscillating threshold and reliability to be obtained. A polarization direction of laser light emitted from the laser element 33 for CD is usually parallel to the mounting surface. A form of this embodiment is defined in consideration of the above mentioned contents so that a polarization direction of red wavelength laser light emitted from an oscillating point 39 of the laser element 32 for DVD and a polarization direction of infrared wavelength laser light emitted from an oscillating point 39 of the laser element 33 for CD can be parallel to each other.

When the laser element 32 for DVD and the laser element 33 for CD are glued to the sub-mount 38, a brazing material is used. As the brazing material, for instance gold tin (AuSn), gold silicon (AuSi) or the like is used.

When laser light emitted from the laser element 32 for DVD is incident on a half wavelength plate (hereinafter, there is a case where the half wavelength plate is represented as λ/2 plate) 51, the laser light is emitted as linear polarized laser light whose polarization direction is rotated at an angle of 90 degrees. On the other hand, when laser light emitted from the laser element 33 for CD is incident on the half wavelength plate 51, the laser light is emitted as linear polarized laser light whose polarization direction is not changed. This λ/2 plate 51 can be realized by adjustment of a thickness of birefringent material to be used for the λ/2 plate 51.

The polarization grating 23 is a diffraction grating made of birefringent material on which a groove having a substantially rectangular cross section is formed. In addition, the polarization grating 23 may be also a diffraction grating formed with a groove in which birefringent material is filled. The polarization grating 23 has characteristics of making diffraction function as a diffraction grating ineffective so that the laser light cannot be diffracted when a polarization direction of incident laser light is perpendicular to a direction of the groove, and making diffraction function as a diffraction grating effective so that the laser light can be diffracted when the polarization direction of the incident laser light is parallel to the direction of the groove. A ratio of zero-order diffraction light to ± first-order diffraction light can be controlled by adjustment of a depth of the groove.

As mentioned above, polarization directions of laser lights emitted from the laser element 32 for DVD and the laser element 33 for CD are parallel to each other, but a polarization direction of laser light emitted from the laser element 32 for DVD is rotated at an angle of 90 degrees because of passing through the λ/2 plate 51. Consequently, polarization directions of laser lights emitted from the laser element 32 for DVD and the laser element 33 for CD can be made perpendicular to each other at a position where the laser lights are incident on the polarization grating 23.

The collimating lens 24 makes incident light parallel light to each other. The beam splitter 25 comprises two beam splitters of a beam splitter for CD laser and a beam splitter for DVD laser respectively not shown. In the beam splitter for CD laser, a reflection film, having fifty percent reflectance and fifty percent transmittance for laser light emitted from the laser element 33 for CD and also having a hundred percent transmittance for laser light emitted from the laser element 32 for DVD, is formed on an inclined surface tilted at an angle of 45 degrees with respect to an optical axis. The beam splitter for CD laser transmits fifty percent of incident laser light being incident after emission from the laser element 33 for CD and reflects fifty percent of the incident laser light at right angles.

In the beam splitter for DVD laser, a reflection film, having fifty percent reflectance and fifty percent transmittance for laser light emitted from the laser element 32 for DVD and also having a hundred percent transmittance for laser light emitted from the laser element 33 for CD, is formed on an inclined surface tilted at an angle of 45 degrees with respect to the optical axis. The beam splitter for DVD laser transmits fifty percent of incident laser light being incident after emission from the laser element 32 for DVD and reflects fifty percent of the incident laser light at right angles.

The object lens 26 converges incident light on the information recording surface of the optical recording medium 37. The splitting element 27 splits laser light reflected by the beam splitter 25 into a plurality of areas and makes the split light incident on a predetermined receiving portion of the light-receiving element 28 for reading information signal recorded on the information recording surface of the optical recording medium 37 and detecting FES and TES. The light-receiving element 28 is realized for instance by a photo diode and converges incident light to electric signal.

The driving portion 29 supplies predetermined driving voltage and driving current required for emission of red wavelength laser light to be performed by the laser element 32 for DVD to the semiconductor laser unit 22 and also supplies predetermined driving voltage and driving current required for emission of infrared wavelength laser light to be performed by the laser element 33 for CD to the semiconductor laser unit 22.

The signal processing portion 30 applies signal processing such as amplifying an electric signal to an electric signal photoelectrically converted by the light-receiving element 28 and then sends the electric signal to which the signal processing is applied to the control portion 31.

The control portion 31 performs control of a focus position on the object lens 26 so that laser light emitted from the laser element 32 for DVD or the laser element 33 for CD in the semiconductor laser unit 22 can focus on an information recording surface of the optical recording medium 37 via the object lens 26 and also performs control for making the laser light accurately follow a track of the optical recording medium 37 on the basis of an electric signal sent from the signal processing portion 30. When these controls are performed, the signal processing portion 30 and the control portion 31 are made so as to be operated by time-series linkage.

Figure 3:
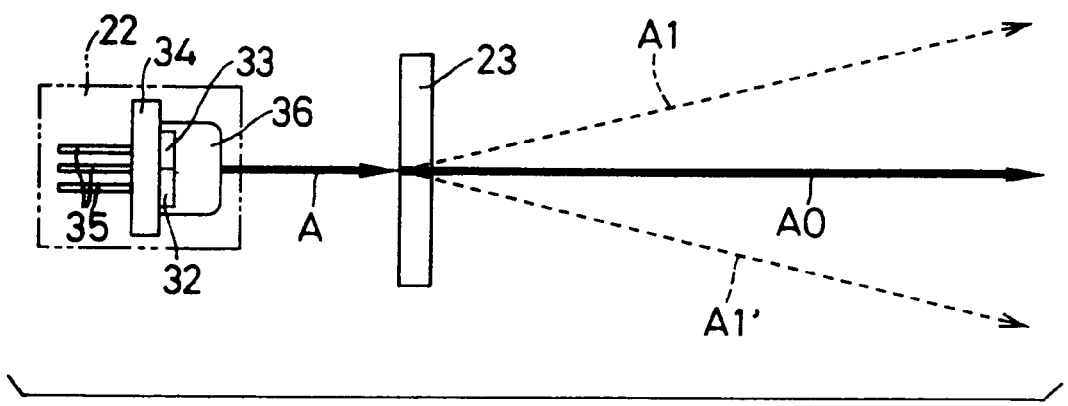
FIG. 3 is a view showing diffraction light arising after a red wavelength laser light A emitted from a laser element for DVD is transmitted by a polarization grating.
Figure 4:
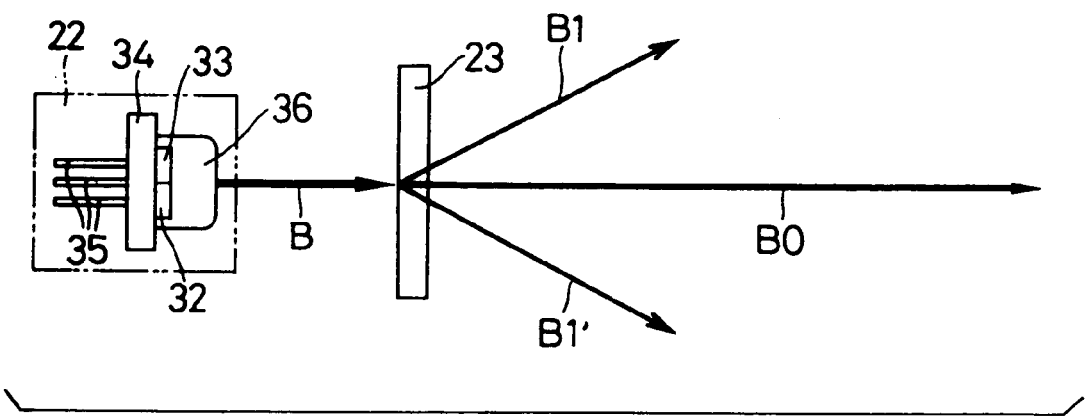
FIG. 4 is a view showing diffraction light arising after an infrared wavelength laser light B emitted from a laser element for CD is transmitted by the polarization grating.

FIG. 3 is a view showing diffraction light arising after a red wavelength laser light A emitted from the laser element 32 for DVD is transmitted by the polarization grating 23. FIG. 4 is a view showing diffraction light arising after an infrared wavelength laser light B emitted from the laser element 33 for CD is transmitted by the polarization grating 23. However, in FIGS. 3 and 4, the half wavelength plate 51 arranged between the semiconductor laser unit 22 and the polarization grating 23 is omitted.

In FIG. 3, when the red wavelength laser light A emitted from the laser element 32 for DVD is incident on the polarization grating 23, only zero-order diffraction light A0 is transmitted. In FIG. 4, when the infrared wavelength laser light B emitted from the laser element 33 for CD is incident on the polarization grating 23, the incident laser light is spectrally split into three lights consisting of zero-order diffraction light B0, ± first-order diffraction lights B1 and B1'. In FIG. 3, the zero-order diffraction light A0 is represented by using a solid line and ± first-order diffraction lights A1 and A1' which do not arise are represented by using a broken line.

When driving voltage and driving current are supplied to the laser element 32 for DVD via the leads 35 arranged on the stem 34, the red wavelength laser light A is emitted from the laser element 32 for DVD. For instance, when laser light A whose polarization direction is perpendicular to the direction of the groove of the polarization grating 23 is incident on the polarization grating 23, diffraction function of the polarization grating 23 is made inefficient and therefore the laser light A is not diffracted. In other words, ± first-order diffraction lights A1 and A1' as shown in FIG. 3 do not arise and the laser light A is transmitted A0 by the polarization grating 23 as zero-order diffraction light A0.

When driving voltage and driving current are supplied to the laser element 33 for CD via the leads 35 arranged on the stem 34, the infrared wavelength laser light B is emitted from the laser element 33 for CD. For instance, when laser light B whose polarization direction is parallel to the direction of the groove of the polarization grating 23 is incident on the polarization grating 23, diffraction function of the polarization grating 23 is made efficient and therefore the laser light B is diffracted and the diffracted laser light is spectrally split into three laser lights consisting of zero-order diffraction B0, ± first-order diffraction lights B1 and B1' as shown in FIG. 4.

The laser light transmitted by the polarization grating 23 as zero-order diffraction light A0 and the laser lights B0, B1, B1' diffracted by the polarization grating 23 are incident on the collimating lens 24. The laser lights being incident on the collimating lens 24 become parallel lights and pass through the beam splitter 25 and the object lens 26 and are converged on the information recording surface of the optical recording medium 37. The laser lights reflected by the information recording surface of the optical recording medium 37 pass through the object lens 26 and are incident on the beam splitter 25.

The laser lights reflected by the information recording surface is reflected to a direction of the splitting element 27 at an angle of 90 degrees by the beam splitter 25 and is incident on the splitting element 27. The laser light being incident on the splitting element 27 is reflected to a predetermined direction and is incident on the light-receiving element 28. A combination of a splitting element and a light-receiving element for the laser light emitted from the laser element 33 for CD (hereinafter, represented as "splitting element for CD laser" and "light-receiving element for CD laser" respectively) and a combination of a splitting element and a light-receiving element for the laser light emitted from the laser element 32 for DVD (hereinafter, represented as "splitting element for DVD laser" and "light-receiving element for DVD laser" respectively) are not shown, but are respectively prepared.

The laser light being incident on the light-receiving element 28 is converted to an electric signal. On the basis of this electric signal, detection is performed for an information signal, a focus error signal (hereinafter abbreviated to FES) and a tracking error signal (hereinafter abbreviated as TES) which are recorded on the information recording surface of the optical recording medium 37 such as CD, DVD or the like. Here, FES is used for performing control for adjusting a focus so that the focus can be always formed on the information recording surface by following surface oscillation of the optical recording medium 37. TES is used for performing a control for correcting a gap from a track center of laser light converged on the information recording surface of the optical recording medium 37 to perform a control for making the laser light follow the track precisely.

The polarization grating 23 has characteristics of making diffraction function as a diffraction grating ineffective so that the laser light cannot be diffracted when a polarization direction of incident laser light is perpendicular to a direction of the groove, and making diffraction function as a diffraction grating effective so that the laser light can be diffracted when the polarization direction of the incident laser light is parallel to the direction of the groove. When the laser light A is incident on the polarization grating 23, the polarization grating 23 can transmit the laser light A as zero-order diffraction light A0 without diffracting the laser light A.

Consequently, all of the laser lights A emitted from the laser element 32 for DVD can be used for reading an information signal of DVD and detecting FES and TES. This enables the optical pick-up apparatus 21 to suppress reduction of optical utilization efficiency for laser light emitted from the laser element 32 for DVD arising by diffraction action of the diffraction grating to be used for detecting TES of CD in the conventional optical pick-up apparatus 1.

In addition, since the optical pick-up apparatus 21 can suppress reduction of optical utilization efficiency, there is no necessity for increasing quantity of light of the laser light A emitted from the laser element 32 for DVD and can avoid increase of current consumption accompanying increase of the quantity of light of the laser light A and thereby an optical disk apparatus which can reproduce, for instance, DVD and is mobile can reproduce the optical disk for longer time than an optical disk apparatus using the conventional optical pick-up apparatus 1.

Figure 5:
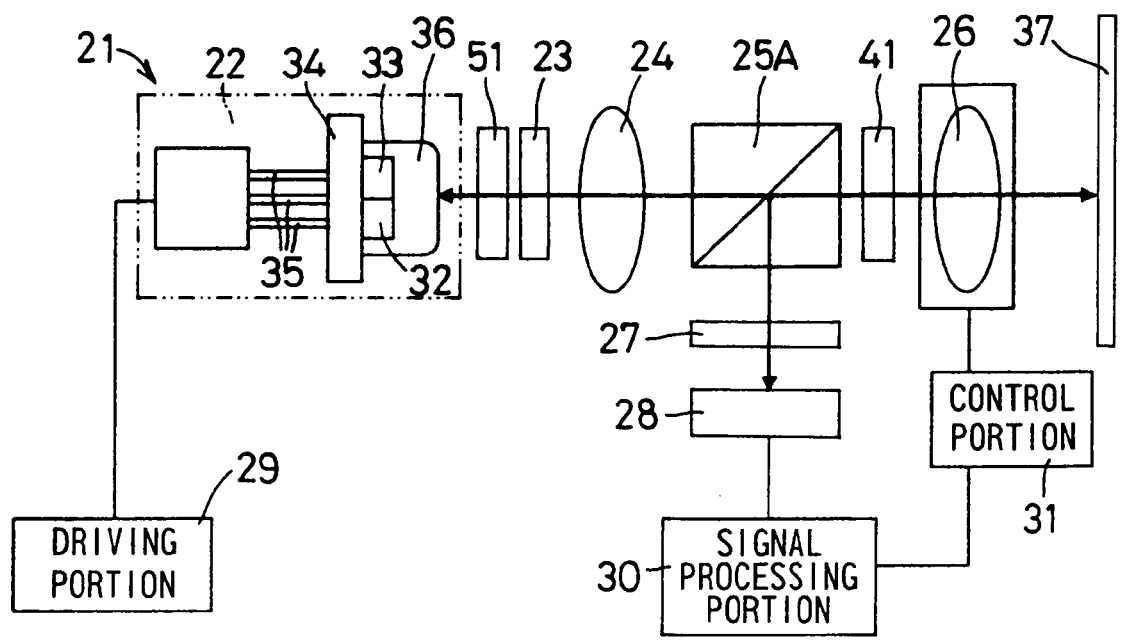
FIG. 5 is a view showing a simplified configuration of the optical pick-up apparatus for which a quarter wavelength plate is arranged between a polarization beam splitter and an object lens 26.

FIG. 5 is a view showing a simplified configuration of the optical pick-up apparatus 21 for which a quarter wavelength plate 41 is arranged between a polarization beam splitter 25A and an object lens 26. In addition, a quarter wavelength plate is represented as a λ/4 plate in the following description. In FIG. 5, a polarization beam splitter 25A is used instead of the polarization beam splitter 25 shown in FIG. 1.

The polarization beam splitter 25A comprises two polarization beam splitters of a polarization beam splitter for CD laser and a polarization beam splitter for DVD laser respectively not shown. The polarization beam splitter for CD laser has zero percent reflectance and a hundred percent transmittance for laser lights emitted from the laser element 33 for CD and the laser element 32 for DVD in a first polarization direction. In addition, the polarization beam splitter for CD laser has a hundred percent reflectance and zero percent transmittance for laser light emitted from the laser element 33 for CD and has a hundred percent transmittance for laser light emitted from the laser element 32 for DVD in a second polarization direction.

A beam splitter for DVD laser has zero percent reflectance and a hundred percent transmittance for laser lights emitted from the laser element 32 for DVD and the laser element 33 for CD in the first polarization direction. In addition, the beam splitter for DVD laser has a hundred percent reflectance and zero percent transmittance for laser light emitted from the laser element 32 for DVD and has a hundred percent transmittance for laser light emitted from the laser element 33 for CD in the second polarization direction.

When linearly polarized light is incident on the λ/4 plate 41, the λ/4 plate 41 converts the incident light to circularly polarized light and emits the converted light and when circularly polarized light is incident on the λ/4 plate 41, the λ/4 plate 41 converts the incident light to linearly polarized light and emits the converted light. Laser lights emitted from the laser element 32 for DVD and the laser element 33 for CD are linearly polarized lights. When these linearly polarized lights are incident on the λ/4 plate 41, the incident lights are converted to circularly polarized lights. The circularly polarized lights pass through the object lens 26 and are converged on the information recording surface of the optical recording medium 37. Laser light reflected on the information recording surface is transmitted again by the λ/4 plate 41 and thereby is converted to linearly polarized light whose polarization direction is orthogonal to the direction of original laser light and a hundred percent of the converted light is reflected by the polarization beam splitter 25A and then the reflected laser light passes through the splitting element 27 and is incident on the light-receiving element 28. In addition, a combination of a splitting element for CD laser and a light-receiving element for CD laser to be used for the laser light which is emitted from the laser element 33 for CD and is reflected by the information recording surface and a combination of a splitting element for DVD laser and a light-receiving element for DVD laser to be used for the laser light which is emitted from the laser element 32 for DVD and is reflected by the information recording surface are not shown, but are respectively prepared.

In the beam splitter 25 in the optical pick-up apparatus 21, reflection film having fifty percent reflectance is formed on a slant surface tilted at an angle of 45 degrees for the optical axis of the object lens 26. When laser light emitted from the laser element 32 for DVD or the laser element 33 for CD is incident on the beam splitter 25, fifty percent of the incident light is transmitted and is incident on the object lens 26 and fifty percent of the incident light is reflected in an opposite direction to a direction of the branch element 27. Consequently, fifty percent of the laser light emitted from the laser element 32 for DVD or the laser element 33 for CD cannot be used for reading information signal of the optical recording medium 37 and detecting FES and TES. Since this light becomes a so-called unnecessary light, optical utilization efficiency for the laser light is reduced.

In the optical pick-up apparatus 21 shown in FIG. 5, using the above mentioned polarization beam splitter 25A makes reflectance on the reflection surface of the polarization beam splitter 25A zero percent. This enables no unnecessary light to arise. Consequently, all laser lights which are emitted from the laser element 32 for DVD or the laser element 33 for CD and are incident on the polarization beam splitter 25A can he converged on the optical recording medium 37 and optical utilization efficiency for the same laser light can be improved.

Figure 6:
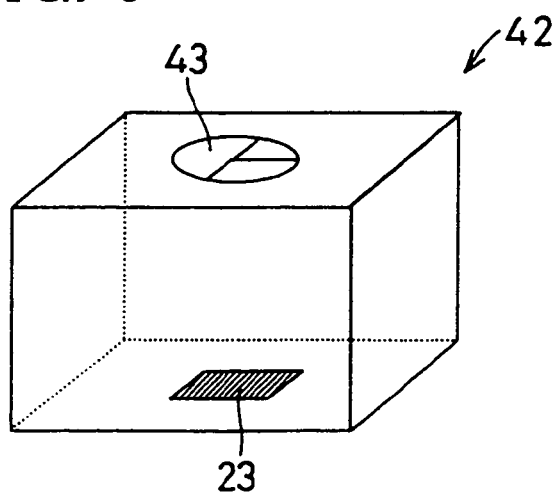
FIG. 6 is a perspective view showing a hologram element.

FIG. 6 is a perspective view showing a hologram element 42. The hologram element 42 is a first optical element having two surfaces which have rectangle shapes and are parallel to each other and on which surfaces the polarization grating 23 and a hologram 43 are respectively arranged. FIG. 6 shows the hologram element 42 having a shape of substantially rectangular parallelepiped, but the shape of the hologram element 42 is not restricted to this substantially rectangular parallelepiped. A groove whose cross section is substantially rectangle is formed on the hologram 43. The hologram 43 spectrally splits laser light emitted from the laser element 32 for DVD or the laser element 33 for CD to a plurality of laser lights by diffraction and also spectrally splits laser light which passes through the hologram 43 and is reflected by the information recording surface of the optical recording medium 37 to a plurality of laser lights by diffraction.

The polarization grating 23 and the hologram 43 of the hologram element 42 are arranged so that directions of the polarization grating 23 and the groove formed on the hologram 43 can be orthogonal to each other for instance as shown in FIG. 6.

Figure 7:
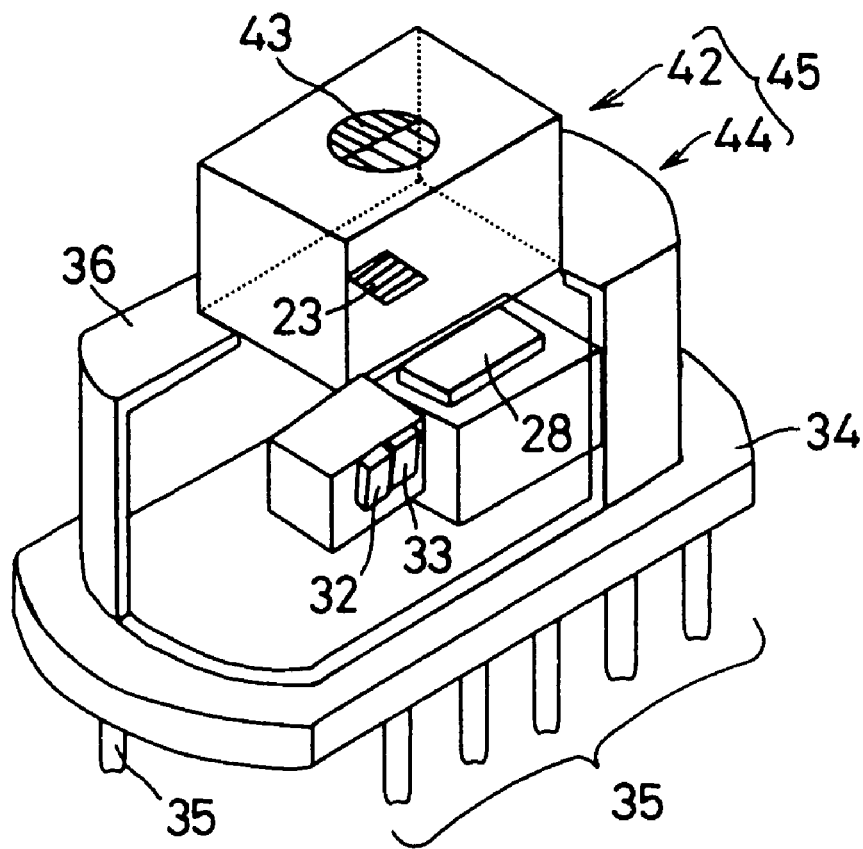
FIG. 7 is a perspective view showing a hologram integrated laser unit.

FIG. 7 is a perspective view showing a hologram integrated laser unit 45. The hologram integrated laser unit (hereinafter represented as a hologram laser unit) 45 is a first optical assembly in which a surface provided with the polarization grating 23 of the hologram element 42 is fixed on an upper surface of the cap 36 of a laser unit having a built-in light receiving/emitting element (hereinafter represented as a light receiving/emitting element unit) 44 on the side of the semiconductor laser element and the surface is integrated. The light receiving/emitting element unit 44 is a light source unit comprising the semiconductor laser unit 22 and the light-receiving element 28 shown in FIG. 1.

The following description is given as a second embodiment about an optical pick-up apparatus using the hologram laser unit 45 instead of the semiconductor laser unit 22 shown in FIG. 1. In this embodiment, description about the same configuration as the first embodiment is omitted and the same reference numerals are denoted for the corresponding portions.

In this embodiment, the laser element 32 for DVD emitting red laser light whose oscillating wavelength is for instance 635 nm and the laser element 33 for CD emitting infrared laser light whose oscillating wavelength is for instance 784 nm are used. The laser element 32 for DVD and the laser element 33 for CD is mounted on the common sub-mount 38 in parallel as shown in FIG. 2. In the case of a laser element 32 for DVD emitting red laser light whose oscillating wavelength is for instance approximately 635 nm like the laser element 32 for DVD in this embodiment, characteristics such as a preferable threshold of oscillation and reliability or like that are given by making a polarizing indication of the laser light to be emitted perpendicular to a mount surface. The polarizing indication of the laser light emitted from the laser element 33 for CD is usually parallel to the mount surface. This embodiment is given so that the polarization direction of red wavelength laser light emitted from an oscillating point 39 of the laser element 32 for DVD and the polarization direction of infrared wavelength laser light emitted from an oscillating point 39 of the laser element 33 for CD can be perpendicular to each other.

In this embodiment, the light-receiving element 28 built in is a light-receiving element for CD laser to be used for laser light which is emitted from the laser element 33 for CD the light receiving/emitting element unit 44 and is reflected by the information recording surface of the optical recording medium 37. In addition, the light-receiving element 28 arranged on the outside of the light-receiving element unit 44 is a light-receiving element for DVD laser to be used for laser light which is emitted from the laser element 32 for DVD and is reflected by the information recording surface of the optical recording medium 37. In addition, the optical pick-up apparatus in this embodiment is not provided with the λ/2 plate 51 between the laser element 32 for DVD and the laser element 33 for CD which are the light sources and the polarization grating 23.

In FIG. 7, when driving voltage and driving current are supplied to the laser element 32 for DVD via the leads 35 in the light receiving/emitting element unit 44, laser light whose polarization direction is perpendicular to the direction of the groove of the grating 23 is emitted. When the laser light emitted from the laser element 32 for DVD is incident on the polarization grating 23 arranged on the hologram element 42, the laser light is not diffracted and is transmitted as zero-order diffraction light. When driving voltage and driving current are supplied to the laser element 33 for CD via the leads 35 in the light receiving/emitting element unit 44, laser light whose polarization direction is parallel to the direction of the groove of the grating 23 is emitted. When the laser light emitted from the laser element 33 for CD is incident on the polarization grating 23 arranged on the hologram element 42, the laser light is diffracted and is spectrally split into three laser lights.

When one laser light or three laser lights having passed through the polarization grating 23 is (are) incident on the hologram 43 on the hologram element 42, one laser light or three laser lights is (are) diffracted by diffracting action of the hologram 43 and is (are) spectrally split into a plurality of laser lights. Laser light which is transmitted as zero-order diffraction light among split laser lights is converged on the information recording surface of the optical recording medium 37.

As to laser light which is emitted from the laser element 32 for DVD and is reflected by the information recording surface of the optical recording medium 37, the laser light is reflected at right angles to the optical axis by the polarization beam splitter for DVD laser and is incident on the light-receiving element 28 as similarly as the first embodiment. As to laser light which is emitted from the laser element 33 for CD and is reflected by the information recording surface of the optical recording medium 37, the laser light follows the same route as an approach route and is incident on the hologram 43 of the hologram element 42. The laser light being incident on the hologram 43 is diffracted by diffracting action of the hologram 43 and is spectrally split into a plurality of laser lights. Laser light which is transmitted as first-order diffraction light among split laser lights is incident on the light-receiving element 28 arranged on a position corresponding to a diffraction direction.

Consequently, in the optical pick-up apparatus in this embodiment, only one polarization beam splitter is sufficient for at right angles reflecting laser light reflected by the information recording surface of the optical recording medium 37 to lead the reflected laser light to the light-receiving element 28. This polarization beam splitter is concretely a polarization beam splitter for DVD laser to lead the laser light which is emitted from the laser element 32 for DVD and is reflected by the information recording surface of the optical recording medium 37 to the light-receiving element for DVD.

Since this makes the hologram element 42 and the light receiving/emitting element unit 44 of the optical pick-up apparatus in this embodiment unified as the hologram laser unit 45, a number of optical parts and a number of assembling processes are reduced at the time of producing the optical pick-up apparatus and optical adjusting operation such as an optical axis adjustment is simplified and productivity of the optical pick-up apparatus can be improved. In addition, reduction of the number of optical parts enables the optical pick-up apparatus to be miniaturized and become lighter and enables cost of the optical pick-up apparatus to be reduced.

In this embodiment, as to laser lights which are emitted from the laser element 32 for DVD and the laser element 33 for CD and pass through the polarization grating 23 and are incident on the hologram 43, the laser lights are diffracted by diffracting action of the hologram 43 and are spectrally split into a plurality of laser lights. Only laser light transmitted as zero-order diffraction light among the spectrally split laser lights is converged on the information recording surface of the optical recording medium 37 and for instance laser light diffracted as ± first-order diffraction light is not converged on the information recording surface of the optical recording medium 37 and becomes unnecessary light. This unnecessary light becomes a factor of reducing optical utilization efficiency for the laser lights emitted from the laser element 32 for DVD and the laser element 33 for CD.

And then suppression of reduction of the optical utilization efficiency is considered. The following description is given as a third embodiment about the optical pick-up apparatus using the hologram element 42 provided with a polarizing hologram which is the hologram 43 with predetermined polarization characteristics instead of the hologram 43 on the hologram element 42 of the optical pick-up apparatus in this embodiment.

Since the optical pick-up apparatus in the third embodiment has same configuration as the second embodiment except the hologram 43 in the second embodiment, description about the same configuration as the second embodiment is omitted and the same reference numerals are denoted for the corresponding portions.

When the polarization grating 23 and the polarizing hologram are arranged so that directions of the groove formed on the polarization grating 23 and the groove formed on the polarizing hologram can be orthogonal to each other, the same polarization characteristics are given to the polarizing hologram as given to the polarizing 23. According to detailed description about the polarization characteristics, when the polarization direction of laser light being incident on the polarizing hologram is perpendicular to the direction of the groove of the polarizing hologram, the laser light is not diffracted and when the polarization direction of laser light being incident on the polarizing hologram is parallel to the direction of the groove of the polarizing hologram, the laser light is diffracted. In addition, when the polarization grating 23 and the polarizing hologram are arranged so that directions of the groove formed on the polarization grating 23 and the groove formed on the polarizing hologram can be parallel to each other, orthogonal polarization characteristics to the polarization grating 23 are given to the polarizing hologram. According to detailed description about the orthogonal polarization characteristics, when the polarization direction of laser light being incident on the polarizing hologram is perpendicular to the direction of the groove of the polarizing hologram, the laser light is diffracted and when the polarization direction of laser light being incident on the polarizing hologram is parallel to the direction of the groove of the polarizing hologram, the laser light is not diffracted.

When driving voltage and driving current are supplied to the laser element 32 for DVD via the leads 35 arranged on the light receiving/emitting element unit 44, laser light whose polarization direction is perpendicular to the direction of the groove of the polarization grating 23 is emitted from the laser element 32 for DVD. When laser light emitted from the laser element 32 for DVD is incident on the polarization grating 23 arranged on the hologram element 42, the laser light is not diffracted and is transmitted as zero-order diffracting light. In addition, when driving voltage and driving current are supplied to the laser element 33 for CD via the leads 35 arranged on the receiving/emitting element unit 44, laser light whose polarization direction is parallel to the direction of the groove of the polarization grating 23 is emitted from the laser element 33 for CD.

Laser light emitted from the laser element 33 for CD is incident on the polarization grating 23 arranged on the hologram element 42 and is diffracted and is spectrally split into three laser lights. One laser light or three laser lights having passed through the polarization grating 23 is (are) incident on the polarizing hologram arranged on the hologram element 42.

As to laser light which is emitted from the laser element 33 for CD and is incident on the polarizing hologram, the laser light is not diffracted by the polarization characteristics of the polarizing hologram and every laser light is transmitted as zero-order diffraction light. By arranging the λ/4 plate 41 between the hologram element 42 and the object lens in accordance with similar way of thinking as the optical pick-up apparatus 21 shown in FIG. 5, the polarization direction of laser light reflected by the information recording surface of the optical recording medium 37 and the polarization direction of the original laser light can be orthogonal to each other. Consequently, as to laser light which is emitted from the laser element 33 for CD and is reflected by the information recording surface of the optical recording medium 37, every laser light is diffracted by the polarizing hologram and is incident on the light-receiving element 28 arranged on a position corresponding to the diffracting direction.

On the other hand, as to laser light which is emitted from the laser element 32 for DVD and is incident on the polarizing hologram, the laser light is diffracted by the polarization characteristics of the polarizing hologram and is spectrally split. However, laser light emitted from the laser element 32 for DVD is reflected by the information recording surface of the optical recording medium 37 and then a hundred percent of the laser light is reflected by the polarization beam splitter 25A and does not pass through the polarizing hologram and therefore optical loss can be sufficiently reduced by forming the groove of the polarizing hologram having depth in which ± first-order diffraction light arises as hardly as possible.

Consequently, the optical pick-up apparatus in this embodiment can eliminate unnecessary light which has arisen because laser light is spectrally split by the hologram 43 in the optical pick-up apparatus in the second embodiment by using the polarizing hologram and can converge all the laser lights emitted from the laser element 33 for CD on the information recording surface of the optical recording medium 37. This enables optical utilization efficiency for the laser lights emitted from the laser element 32 for DVD and the laser element 33 for CD to be improved in comparison with the optical pick-up apparatus in the second embodiment.

Figure 8:
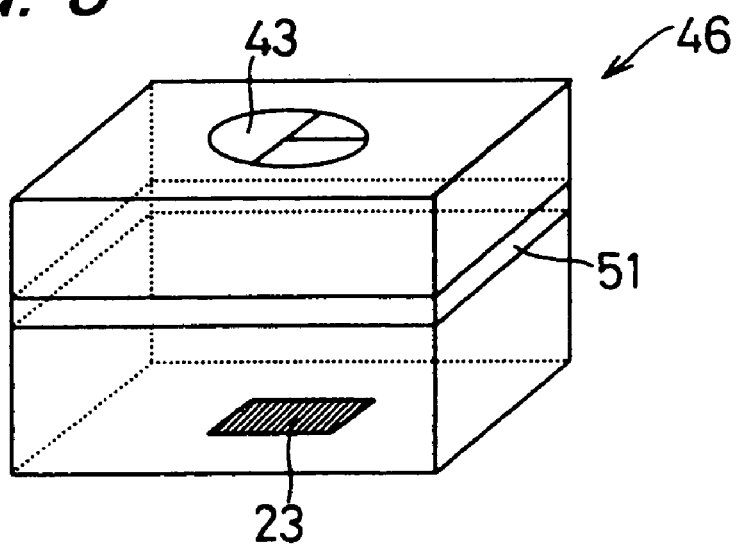
FIG. 8 is a perspective view showing a λ/2 plate integrated hologram element.
Figure 9:
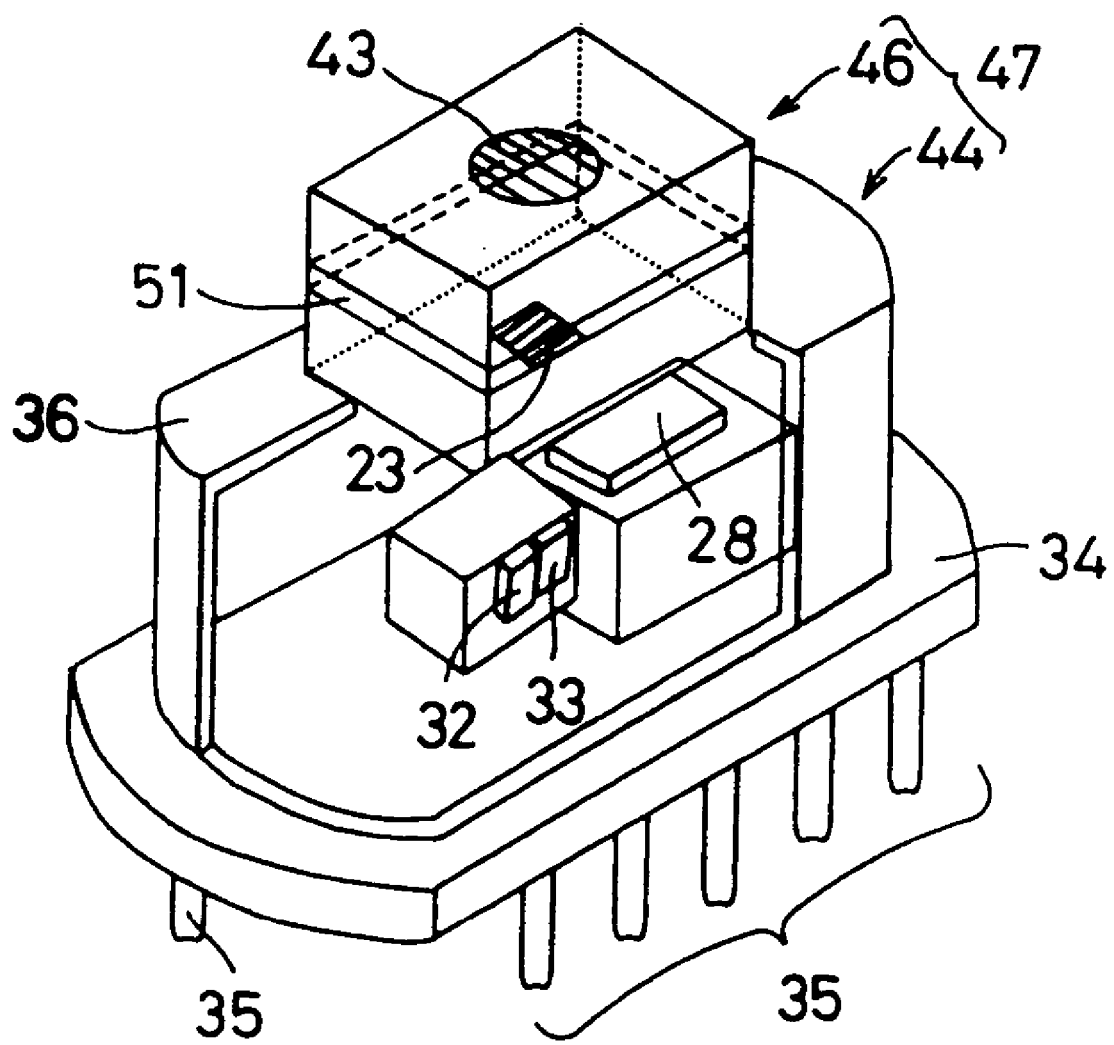
FIG. 9 is a perspective view showing a λ/2 plate integrated hologram laser unit.

FIG. 8 is a perspective view showing a λ/2 plate integrated hologram element 46. The λ/2 plate integrated hologram element (hereinafter represented as a λ/2 plate hologram element) 46 is a second optical element provided with the λ/2 plate 51 between the polarization grating 23 and the hologram 43 of the hologram element 42 shown in FIG. 6. FIG. 9 is a perspective view showing a λ/2 plate integrated hologram laser unit 47. The λ/2 plate integrated hologram laser unit (hereinafter represented as a λ/2 plate hologram laser unit) 47 is a second optical assembly in which a surface provided with the polarization grating 23 of the λ/2 plate hologram element 46 shown in FIG. 8 is fixed on the upper surface of the cap 36 in the light receiving/emitting element unit 44 showing in FIG. 7 on the side of the semiconductor laser element and the surface is integrated.

The following description is given as a fourth embodiment about an optical pick-up apparatus using the λ/2 plate hologram laser unit 47 instead of the hologram laser unit 45 in the optical pick-up apparatus in the second embodiment.

Since the optical pick-up apparatus in the fourth embodiment has the same configuration as the optical pick-up apparatus in the second embodiment except the hologram element 42, description about the same configuration as the second embodiment is omitted and the same reference numerals are denoted for the corresponding portions. In FIG. 9, when driving voltage and driving current are supplied to the laser element 32 for DVD via the leads 35 arranged on the light receiving/emitting element unit 44, laser light whose polarization direction is perpendicular to the direction of the groove of the polarization grating 23 is emitted from the laser element 32 for DVD. When laser light emitted from the laser element 32 for DVD is incident on the polarization grating 23 arranged on the λ/2 plate hologram element 46, the laser light is not diffracted and is transmitted as zero-order diffracting light.

In addition, when driving voltage and driving current are supplied to the laser element 33 for CD via the leads 35 arranged on the light receiving/emitting element unit 44, laser light whose polarization direction is parallel to the direction of the groove of the polarization grating 23 is emitted from the laser element 33 for CD. When the laser light emitted from the laser element 33 for CD is incident on the polarization grating 23 arranged on the λ/2 plate hologram element 46, the laser light is diffracted and is spectrally split into three laser lights.

One laser light or three laser lights having passed through in the polarization grating 23 is (are) converted from linear polarization in the first polarization direction to linear polarization in the second polarization direction orthogonal to the first polarization direction by being incident on the .LAMBDA./2 plate 51. The linear polarizing laser light in the second polarization direction is incident on the hologram 43 arranged on the .LAMBDA./2 plate hologram element 46. The linear polarizing laser light in the second polarization direction being incident on the hologram 43 is not subject to diffracting action of the hologram 43 and is transmitted as zero-order diffraction light and is converged on the information recording surface of the optical recording medium 37. Thus, in this embodiment, arranging the .LAMBDA./2 plate 51 between and the hologram 43 enables the linear polarizing laser light in the second polarization direction being incident on the hologram 43 not to be subject to diffracting action of the hologram 43.

As to laser light which is emitted from the laser element 33 for CD and is reflected by the information recording surface of the optical recording medium 37, the laser light follows the same route as an approach route and is incident on the hologram 43 of the λ/2 plate hologram element 46, but the polarization direction of the laser light is rotated at an angle of 90 degrees by the laser light's passing through λ/4 plate 41 twice. This leads to diffraction of the laser light which is reflected by the information recording surface of the optical recording medium 37 is incident on the hologram 43 because of diffracting action of the hologram 43. The diffracted laser light is incident on the light-receiving element 28 arranged on a position corresponding to the diffracting direction. As mentioned above, since there is no unnecessary diffracting light arising by diffracting action of the hologram 43, optical utilization efficiency for the laser light emitted from the laser element 33 for CD can be made a maximum value.

As to laser light which is emitted from the laser element 32 for DVD, the polarization direction of the laser light is also rotated at an angle of 90 degrees by the laser light's passing through λ/4 plate 41 twice. This leads to arising of unnecessary diffracting light when the laser light reflected by the information recording surface of the optical recording medium 37 is incident on the hologram 43, but the laser light reflected by the information recording surface of the optical recording medium 37 is reflected by the polarization beam splitter 25A at right angles. Consequently, since there is no necessity of diffracting the laser light reflected by the information recording surface of the optical recording medium 37, it is enough for the groove of the hologram 43 to have such a depth of the groove that diffraction efficiency becomes as small as possible.

In addition, in the optical pick-up apparatus in this embodiment provided with the λ/2 plate hologram laser unit 47 configured by the light receiving/emitting element unit 44 and λ/2 plate hologram element 46, Only one polarization beam splitter is sufficient for reflecting the laser light reflected by the information recording surface of the optical recording medium 37 at right angles and leading the reflected laser light to the light-receiving element 28.

This enables the λ/2 plate hologram element 46 and the light receiving/emitting element 44 in the optical picking-up apparatus in this embodiment to be unitized as a λ/2 plate hologram laser unit 47 and therefore a number of optical parts and a number of assembling processes are reduced at the time of producing the optical pick-up apparatus and optical adjusting operation such as an optical axis adjustment is simplified and productivity of the optical pick-up apparatus can be improved. In addition, reduction of the number of optical parts enables the optical pick-up apparatus to be miniaturized and become lighter and enables cost of the optical pick-up apparatus to be reduced.

Figure 10A:
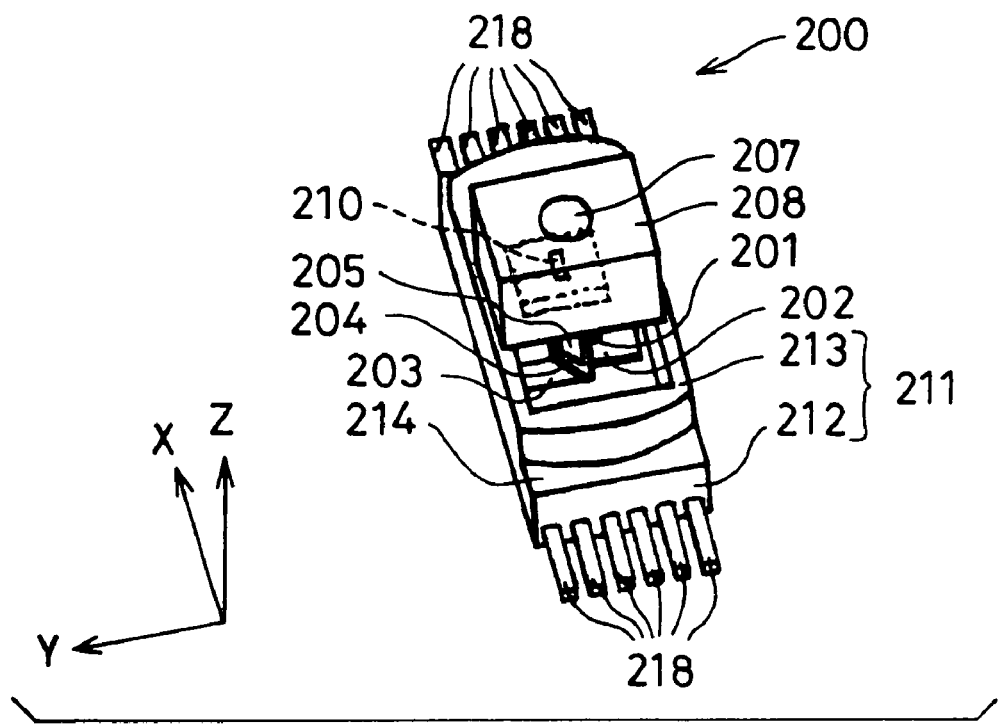
FIG. 10A is a simplified perspective view showing a semiconductor laser apparatus according to a fifth embodiment of the invention.
Figure 10B:
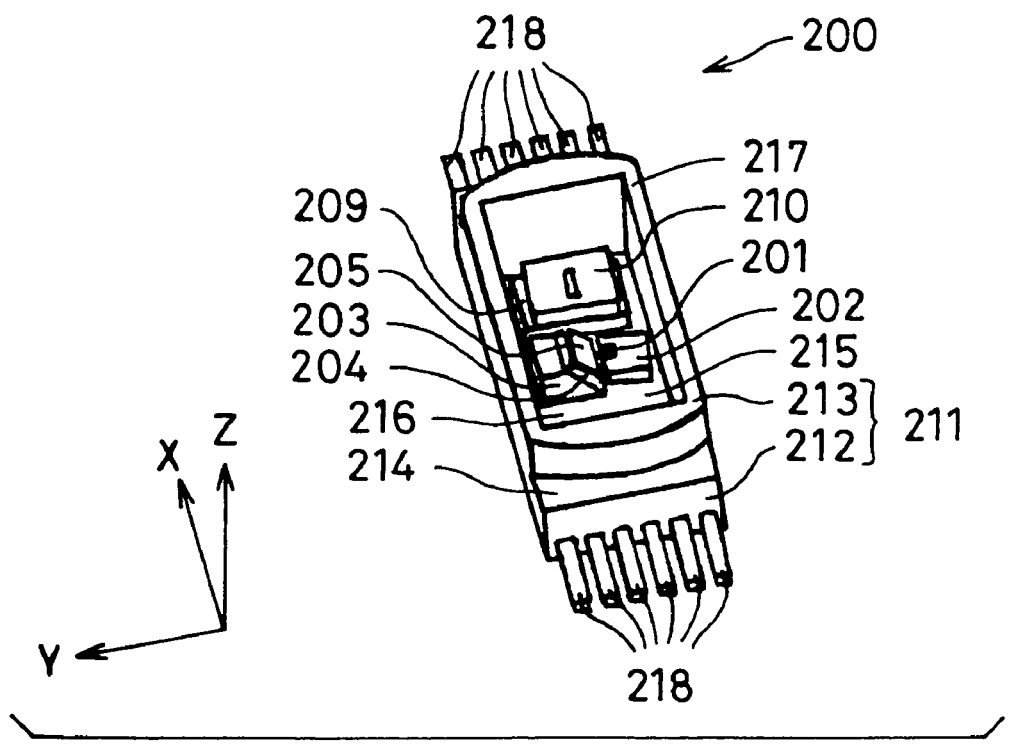
FIG. 10B is a perspective view showing the semiconductor laser apparatus omitting a hologram element.
Figure 11:
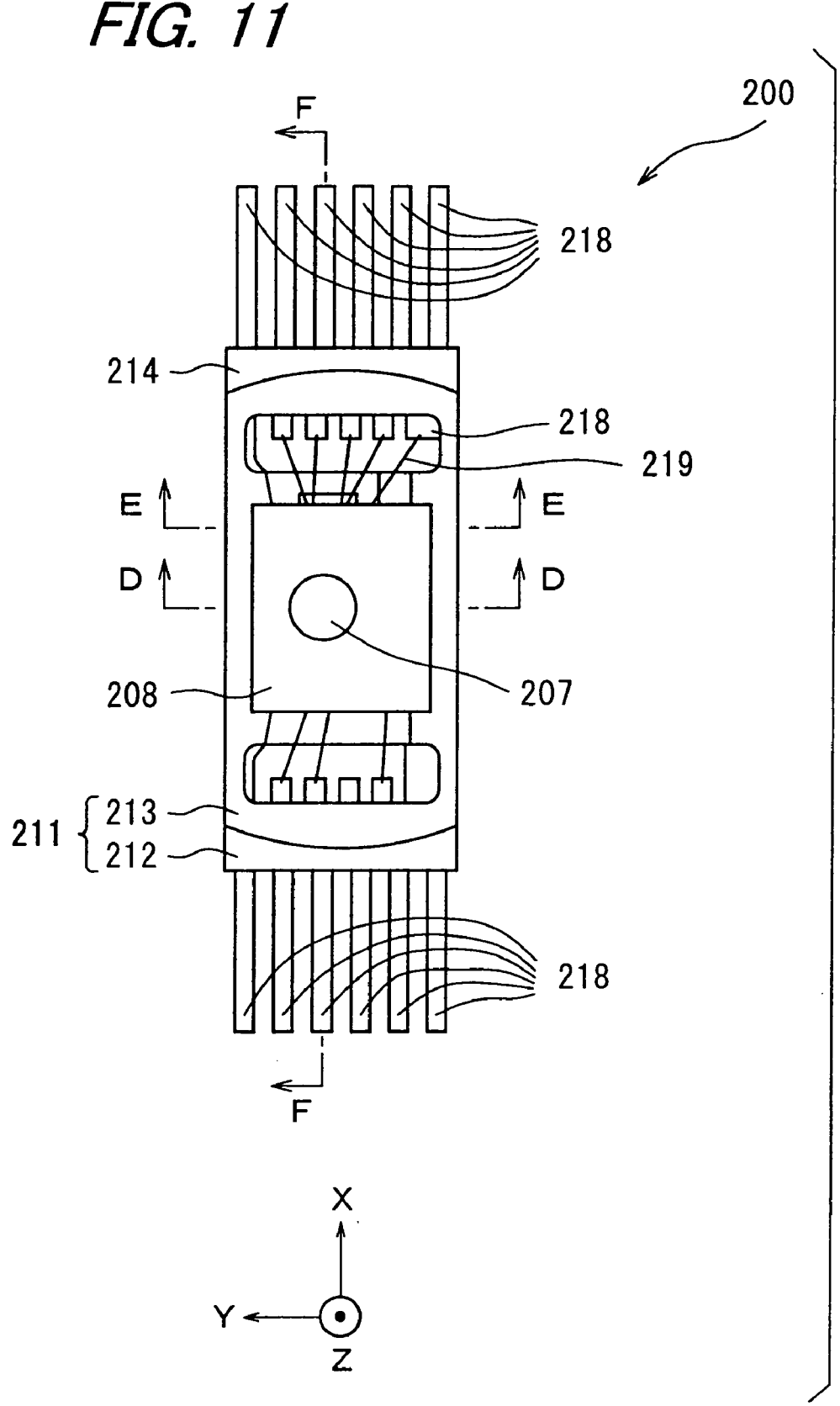
FIG. 11 is a front view showing the semiconductor laser apparatus.
Figure 12:
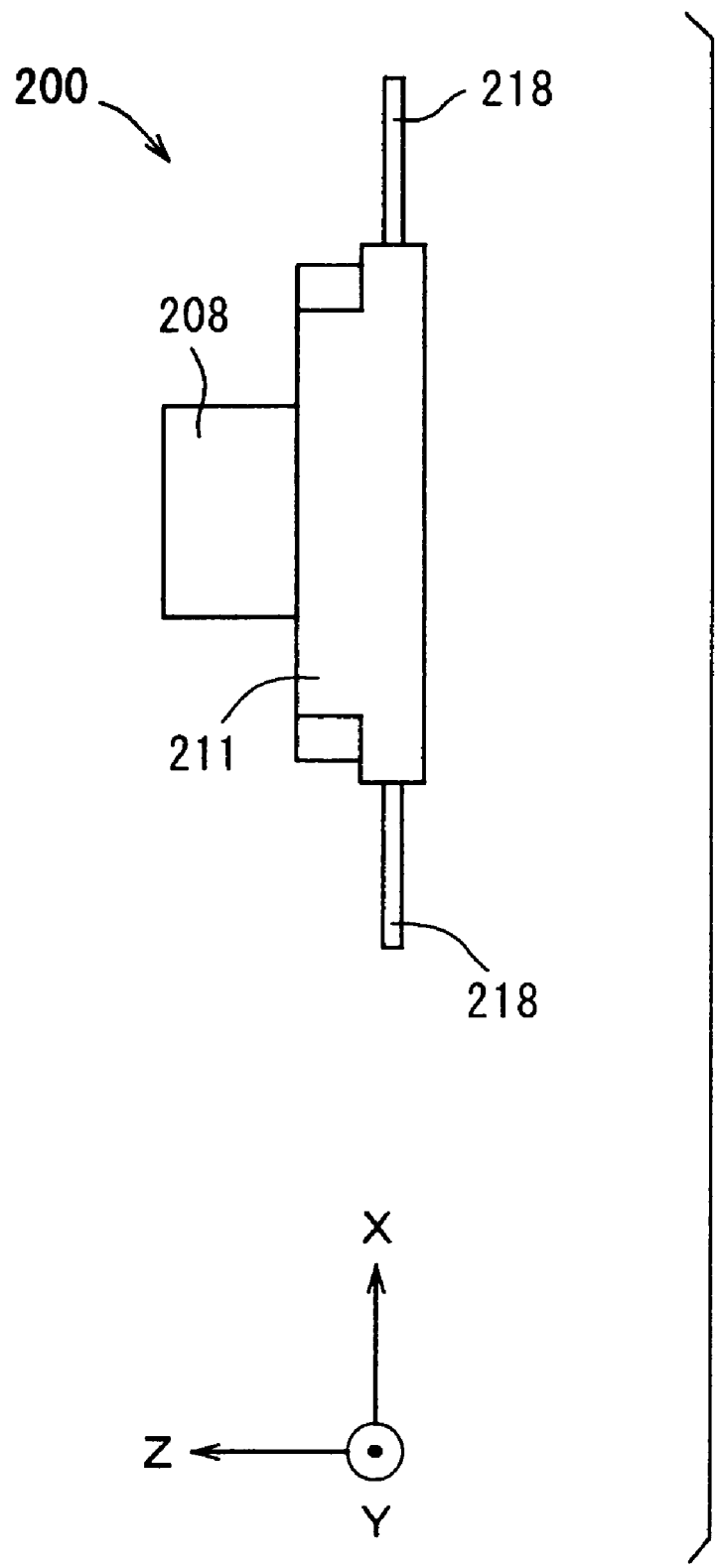
FIG. 12 is a right side view showing the semiconductor laser apparatus.
Figure 13:
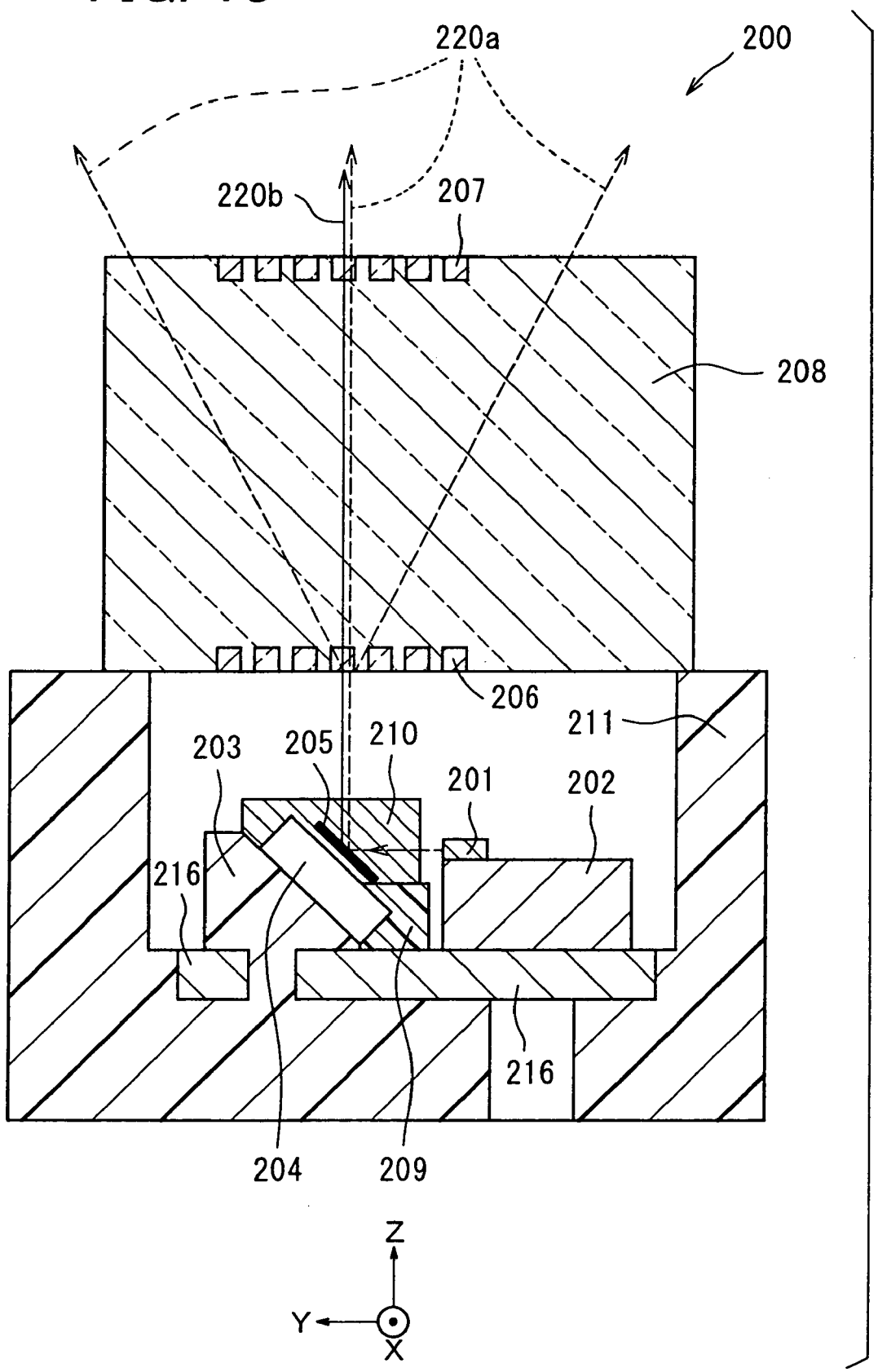
FIG. 13 is a cross sectional view taken along a cross sectional line D—D of FIG. 11.
Figure 14:
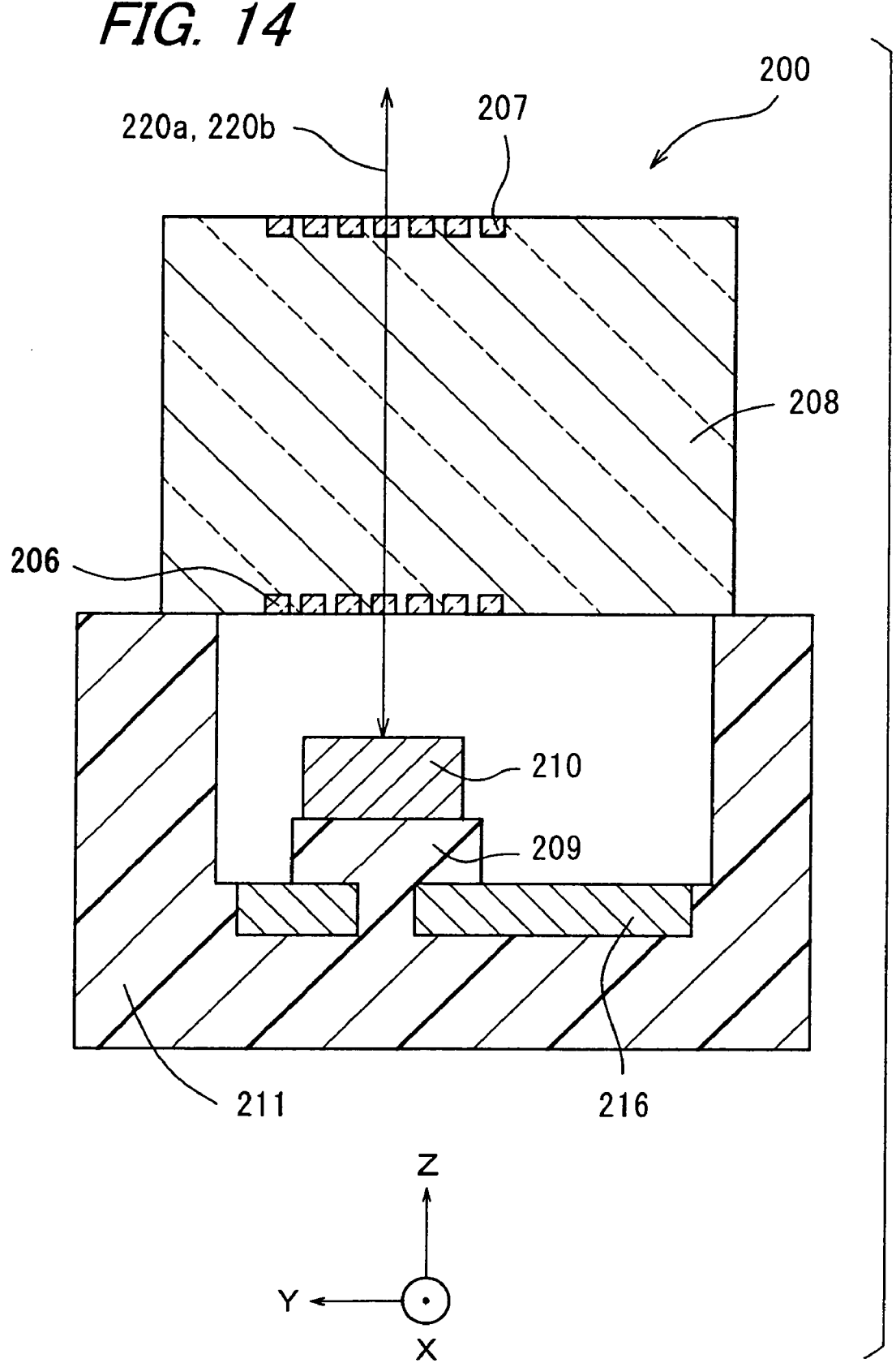
FIG. 14 is a cross sectional view taken along a cross sectional line E—E of FIG. 11.
Figure 15:
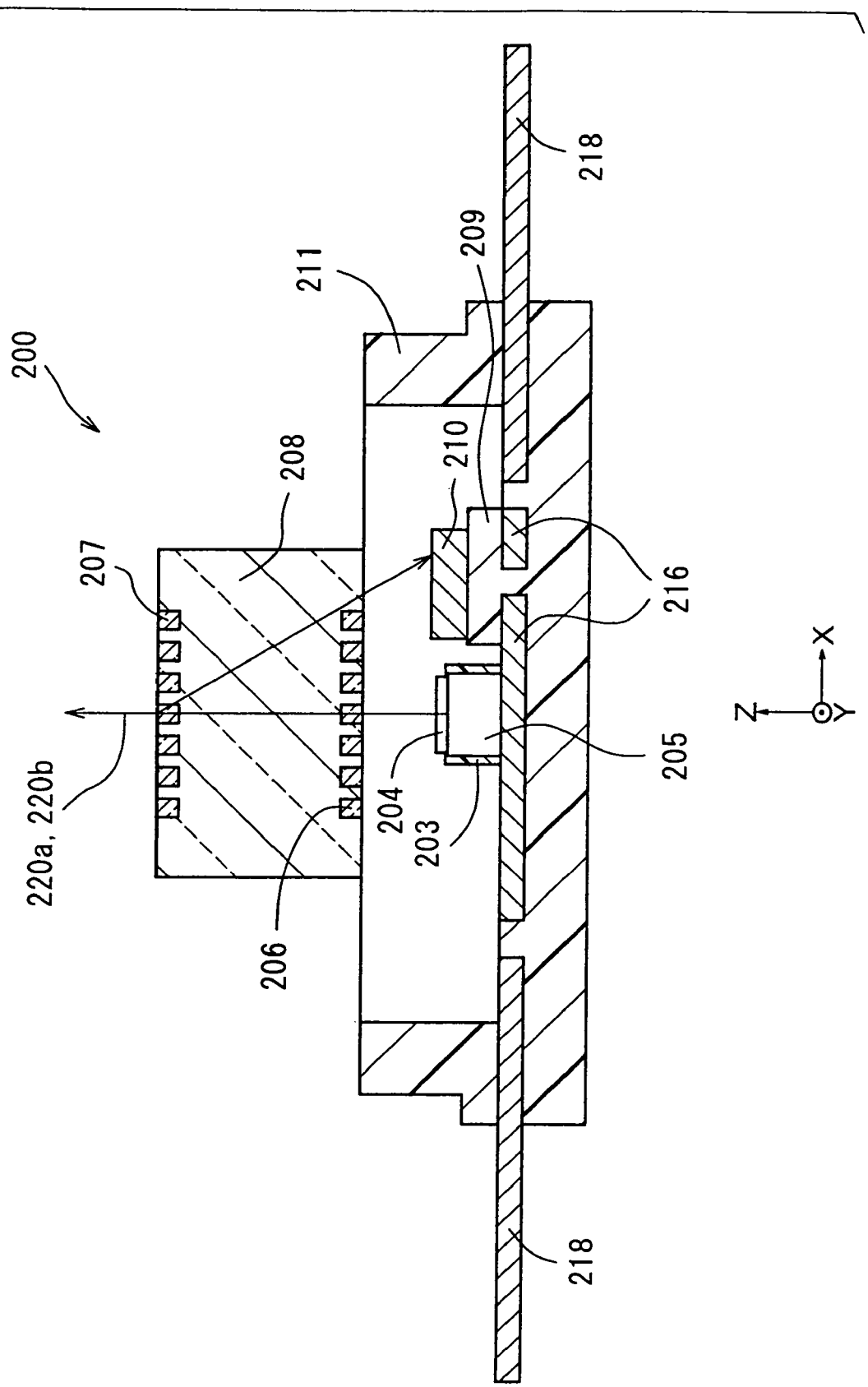
FIG. 15 is a cross sectional view taken along a cross sectional line F—F of FIG. 11.

FIG. 10A is a simplified perspective view showing a semiconductor laser apparatus 200 according to a fifth embodiment of the invention. FIG. 10B is a perspective view showing the semiconductor laser apparatus 200 omitting a hologram element 208. FIG. 11 is a front view showing the semiconductor laser apparatus 200. FIG. 12 is a right side view showing the semiconductor laser apparatus 200. FIG. 13 is a cross sectional view taken along a cross sectional line D—D of FIG. 11. FIG. 14 is a cross sectional view taken along a cross sectional line E—E of FIG. 11. FIG. 15 is a cross sectional view taken along a cross sectional line F—F of FIG. 11, Here, an X-axis, a Y-axis and a Z-axis shown in these drawings are three-dimensional orthogonal coordinate axes. Directions of the X-axis, the Y-axis and the Z-axis correspond to a longitudinal direction, a width direction and a thickness direction respectively of the semiconductor laser apparatus 200.

The semiconductor laser apparatus 200 comprises a semiconductor laser element 201, a light-receiving element 202 for monitoring, an optical axis conversion mirror mounting portion 203, an optical axis conversion mirror 204, a half wavelength plate 205, a hologram element 208, a light-receiving element mounting portion 209 for detecting a signal, a light-receiving element 210 for detecting a signal, an insulating frame 211, and leads 218. The hologram element 208 comprises a grating for generating three beams 206 and a hologram pattern for branching signal light 207.

The insulating frame 211 is a base formed of resin material with high formability and excellent heat resistance such as polyphenylene sulfide (abbreviated as PPS) and liquid crystal polymer or the like. The insulating frame 211 has a base portion 212 and a frame circumference portion 213. The base portion 212 has a shape of substantially rectangular parallelepiped. The frame circumference portion 213 is formed so that the frame circumference portion 213 can be connected to the base portion 212 can project in one direction of the z-axis from an upper surface 214 of the base portion.

Two outer circumferential portions of the frame circumference portion 213 facing each other in the Y-axis direction are formed so that these outer circumferential portions can be parallel to the X-axis direction. Two outer circumferential portions of the frame circumference portion 213 facing each other in the X-axis direction are formed so as to curve in a shape of circular arc so that these outer circumferential portions can approach to one direction or another direction of the X-axis as these outer circumferential portions heads for the both ends in the Y-axis direction. According to further detailed description, sides of two outer circumferential portions of the frame circumference portion 213 facing each other in the X-axis direction are formed in a shape of a cylindrical face having the same curvature radius. In addition, an insulating frame 211 is formed so that a center of cylindrical surface having the same curvature radius can coincide with the light axis of the semiconductor laser element 201.

A frame concave portion 215 opened in one direction of the Z-axis is formed in the insulating frame 211. In addition, the insulating frame 211 has an island portion 216. Here, a dimension of thickness from the island portion 216 to an upper surface 217 of the frame circumference portion is greater than a dimension of thickness from the upper surface 214 of the base portion to the upper surface 217 of the frame circumference portion.

A plurality of leads (in this embodiment, six leads) 218 are arranged on the side facing one side of the in the X-axis direction of the base portion 212 so that the leads 218 can project on one side in the X-axis direction of the base portion 212 from the side. A plurality of leads (in this embodiment, six leads) 218 are arranged on the side facing another side in the X-axis direction of the base portion 212 so that the leads 218 can project on the other side in the X-axis direction of the base portion 212 from the side. The leads 218 are formed of for instance copper alloy or the like. This copper alloy is realized by for instance copper alloy called as DK-10 including content rates of 0.3 wt % of cobalt (Co) and 0.08 wt % of phosphorus (P).

The island portion 216 is formed by plating a copper plate with tin (Sn). A silicon (Si) sub-mount forming the light-receiving element 202 for monitoring is fixed by adhesive and is mounted on the island portion 216. The semiconductor laser element 201 is fixed by adhesive such as silver (Ag) paste and is mounted on the silicon sub-mount.

The semiconductor laser element 201 is a light source of the semiconductor laser apparatus 200. The semiconductor laser element 201 according to this embodiment comprises first and second oscillating points which emit two different wavelength laser lights respectively. The first and second oscillating points are formed on one chip. The semiconductor laser element 201 is mounted on the silicon sub-mount so that polarization directions of the two laser lights emitted from the first and second oscillating points are parallel to each other. In addition, in the semiconductor laser apparatus 200, distance in the Z-axis direction between the upper surface 214 of the base portion of the insulating frame 211 and oscillating point if the semiconductor element 201 is adjusted so that the distance an coincide with a predetermined distance.

In this embodiment, the first oscillating point emits for instance infrared wavelength laser light and the second oscillating point emits for instance red wavelength laser light. The infrared wavelength laser light is used for performing reading and writing information for optical recording media called as CD family and The red wavelength laser light is used for performing reading and writing information for optical recording media called as DVD family. Here, CD family is optical recording media performing reading and writing information with use of only light and DVD family is optical recording media performing reading and writing information with use of light and magnetism and is greater the optical recording medium in comparison with the CD family.

The light-receiving element 202 for monitoring is realized for instance by a photodiode. The light-receiving element 202 for monitoring receives laser light emitted from the semiconductor laser apparatus 201. The semiconductor laser apparatus 200 makes laser light having a constant quantity of light converged on the optical recording medium by controlling output of the laser light emitted from the semiconductor laser apparatus 201 so that quantity of light of the laser light received by the light-receiving element 202 for monitoring can become constant.

The optical axis conversion mirror mounting portion 203 having an inclined portion tilted at an angle of 45 degrees for the island portion 216 is formed in the Y-axis direction of a silicon sub-mount on one side in the Z-axis direction of the island portion 216. The optical axis conversion mirror mounting portion 203 is formed of resin material with high formability and excellent heat resistance such as polyphenylene sulfide (abbreviated as PPS) and liquid crystal polymer or the like. The optical axis conversion mirror 204 is fixed on the optical axis conversion mirror mounting portion 203 by adhesive. The optical axis conversion mirror 204 changes a traveling direction of the laser light emitted from the semiconductor laser element 201.

The half wavelength plate (hereinafter, there is a case where the half wavelength plate is represented as λ/2 plate) 205 is mounted on the optical axis conversion mirror 204. The λ/2 plate 205 according to this embodiment has polarization characteristics by which a polarization direction for laser light emitted form the semiconductor laser element 201 in one of two different wavebands is changed at an angle of 90 degrees. The λ/2 plate 205 is realized by a plate with an appropriate thickness made by cutting birefringent crystal thin plate for instance such as mica, lithium nitrate and crystal is used as the half wavelength plate.

In addition, the λ/2 plate 205 may be realized by an anisotropic film such as ARTON or the like which has heat resistance and light transmitting resin. The anisotropic film is relatively cheaper than birefringent crystal, but it is difficult for the anisotropic film to independently be mounted on a surface of the optical axis conversion mirror 204 and therefore it is enough for the λ/2 plate 205 to be mounted on the optical axis conversion mirror 204 under condition of being sandwiched between glasses or the like.

As to the λ/2 plate 205 which is a birefringent optical element, when an area of an incident surface on which laser light is incident becomes great, it is difficult for the λ/2 plate 205 to get good optical characteristics, but in the semiconductor laser apparatus 200, the optical axis conversion mirror 204 provided with the λ/2 plate 205 is arranged on a position close to the semiconductor laser element 201 and therefore the λ/2 plate 205 can get good optical characteristics in spite of a relatively small area of the incident surface of the λ/2 plate 205. When a distance from each oscillating point of the semiconductor laser element 201 to the optical axis conversion mirror 204 provided with the λ/2 plate 205 is defined as L and a spreading angle from the optical axis of laser light emitted from each oscillating point of the semiconductor laser element 201 is defined as 30 degrees, it is enough for length dimension of one edge of the optical axis conversion mirror 204 to be approximately a value equal to 0.82×L. However, the spreading angle is an angle between laser light for a direction perpendicular to a mounting surface of the semiconductor laser element 201 and the optical axis. The semiconductor laser element 201 and the optical axis conversion mirror 204 are arranged as mentioned above, the distance L is approximately 1 through 5 mm.

As to laser light emitted from the semiconductor laser element 201, a spreading angle of the laser light with respect to a direction perpendicular to a mounting surface of the semiconductor laser element 201 is large. A spreading angle of the laser light with respect to a direction parallel to the mounting surface of the semiconductor laser element 201 is small and is approximately one-half through one third of the spreading angle of the laser light for the direction perpendicular to the mounting surface of the semiconductor laser element 201.

Consequently, when the semiconductor laser apparatus 200 is applied to the optical pick-up apparatus and a plurality of the semiconductor laser element 201 is used, an interval between oscillating points of the semiconductor laser element 201 is for instance set to a value equal to or less than 200 μm and effect of spherical aberration arising by an oscillating point shifted to vertical direction is made as small as possible and the semiconductor laser element 201 is arranged in a direction of a small spreading angle of the laser light emitted from the semiconductor laser element 201 for the purpose of making a number of condenser lenses one, it is not necessary for the length dimension of the optical axis conversion mirror 204 to be set more than the above mentioned length dimension.

A light-receiving element mounting portion 209 for detecting a signal (hereinafter there is a case where the light-receiving element mounting portion for detecting a signal is simply represented as light-receiving element mounting portion) is formed in one direction of Z-axis of the island portion 216 in one direction of X-axis of the semiconductor laser element 201 and the optical axis conversion mirror 204. The light-receiving element mounting portion 209 is formed of resin material with high formability and excellent heat resistance such as polyphenylene sulfide (abbreviated as PPS) and liquid crystal polymer or the like. The light-receiving element 210 for detecting a signal (hereinafter there is a case where the light-receiving element for detecting a signal is simply represented as light-receiving element) is fixed on the light-receiving element mounting portion 209 by adhesive. The light-receiving element 210 is realized by for instance a photodiode and converts incident light to electric signal. An electrode and lead 218 of each element are electrically connected by gold (Au) wire.

The semiconductor laser apparatus 200 is incorporated in an after-mentioned optical pick-up apparatus on the basis of the upper surface 214 of the base portion and the frame circumference portion 213 of the insulating frame 211 and thereby laser light emitted from the semiconductor laser element 201 can be guided to an optical recording medium with high precision and laser light reflected by the optical recording medium can be guided to the light-receiving element 210.

As mentioned above, after each optical element comprising the semiconductor laser element 201, a silicon sub-mount forming the light-receiving element 202 for monitoring, the optical axis conversion mirror mounting portion 203, the optical axis conversion mirror 204, the λ/2 plate 205, the light-receiving element mounting portion 209 and the light-receiving element 210 is mounted on the island portion 216, the whole of surface which is parallel to the island portion 216 and comprises the upper surface 217 of the frame circumference portion is sealed by insulating resin or the like to avoid physical contact of the optical element with the outside. This makes the optical element sealed.

The hologram element 208 is adhesively fixed by adhesive on a surface facing one direction of z-axis of the frame circumference portion 213 of the insulating frame 211. The grating for generating three beams (there is a case where the grating for generating three beams is represented as simply grating or diffraction grating) 206 is formed on a surface of the hologram element 208 adhesively fixed on the frame circumference portion 213. In addition, the hologram pattern for branching signal light (there is a case where the hologram pattern for branching signal light is simply represented as a hologram pattern) 207 is formed on a surface facing the surface on which the grating 206 of the hologram element 208 is formed.

The grating 206 is polarization grating having polarization characteristics by which diffraction efficiency of ± first-order diffracting light for laser light in a predetermined first polarization direction is greater than diffraction efficiency of ± first-order diffracting light for laser light in a second polarization direction orthogonal to the first polarization direction. The hologram pattern 207 is used for diffracting laser light reflected by the optical recording medium and making the reflected light incident on a predetermined light-receiving portion of the light-receiving element 210. When the laser light reflected by the light recording medium is incident on the hologram pattern 207, the laser light is split into zero-order diffraction light, + first-order diffraction light and − first-order diffraction light. In this embodiment, only + first-order diffraction light is used and neither zero-order diffraction light nor − first-order diffraction light is used. However, since zero-order diffraction light heads for a direction of the semiconductor laser element 201 and becomes a cause of occurrence of noise on the semiconductor laser apparatus 200, diffraction efficiency of zero-order diffraction light on the hologram pattern 207 should be made as low as possible. In addition, as to zero-order diffraction light included in laser lights which are emitted from the semiconductor laser element 201 and are incident on the hologram pattern 207 and are diffracted before being converged on the optical recording medium, the zero-order diffraction light becomes light to be used for reading signal and therefore diffraction efficiency of zero-order diffraction light on the hologram pattern 207 should be made as high as possible. Consequently, in this embodiment, as to diffraction efficiency of zero-order diffraction light and ± first-order diffraction light for laser light which is incident on the hologram pattern 207 before being converged on the optical recording medium and also for laser light which is reflected by the optical recording medium and is incident on the hologram pattern 207, the diffraction efficiency is optimized so as to comply with the above mentioned request.

As to infrared wavelength laser light 220a which is emitted from the first oscillating point of the semiconductor laser element 201 and is used for performing reading and recording information for the optical recording medium called as CD family, the infrared wavelength laser light 220a is incident on the optical axis conversion mirror 204 provided with the λ/2 plate 205 and then is reflected and the traveling direction of the laser light 220a is changed to a direction perpendicular to an incident direction as shown with use of a broken line in FIG. 13. The laser light 220a whose traveling direction is changed by the optical axis conversion mirror 204 is incident on the grating 206. When the laser light 220a is incident on the grating 206, the laser light 220a is split into zero-order diffraction light which is not diffracted and is transmitted and + first-order diffraction light and − first-order diffraction light which are diffracted. After the laser light 220a is split into three laser lights by the grating 206, the laser light 220a is transmitted by the hologram pattern 207 and is converged on not shown the optical recording medium.

As to red wavelength laser light 220b which is emitted from the second oscillating point of the semiconductor laser element 201 and is used for performing reading and recording information for the optical recording medium called as DVD family, the red wavelength laser light 220b is incident on the optical axis conversion mirror 204 provided with the λ/2 plate 205 and then is reflected and the traveling direction of the laser light 220b is changed and a polarization direction for the red wavelength laser light 220b is rotated at an angle of 90 degrees as shown with use of a solid line in FIG. 13.

The laser light 220b whose traveling direction is changed by the optical axis conversion mirror 204 and whose polarization direction is changed by λ/2 plate 205 is incident on the grating 206. When the laser light 220b is incident on the grating 206, the laser light 220b is not split and is transmitted as zero-order diffraction light and passes through the hologram pattern 207 and is converged on not shown the optical recording medium.

As mentioned above, according to this embodiment, as to red wavelength laser light 220b which is emitted from the second oscillating point and is used for performing reading and recording information for the optical recording medium called as DVD family among laser lights 220a and 220b emitted from the first oscillating point and the second oscillating point of the semiconductor laser element 201 respectively, the polarization direction of the red wavelength laser light 220b is rotated at an angle of 90 degrees with use of the λ/2 plate 205. When the laser light 220b is incident on the grating 206, the laser light 220b is not subject to diffracting action and is transmitted by the grating 206.

As mentioned above, as to laser light emitted from the second oscillating point of the semiconductor laser element 101 and used in a case of reading information of DVD or the like, the laser light is not diffracted by the grating 206 with difference from the prior art. Consequently, the optical pick-up apparatus using semiconductor laser apparatus 200 can suppress reduction of optical utilization efficiency accompanied by loss of the quantity of light caused by lowering of the quantity of laser light to be originally converged.

Figure 16:
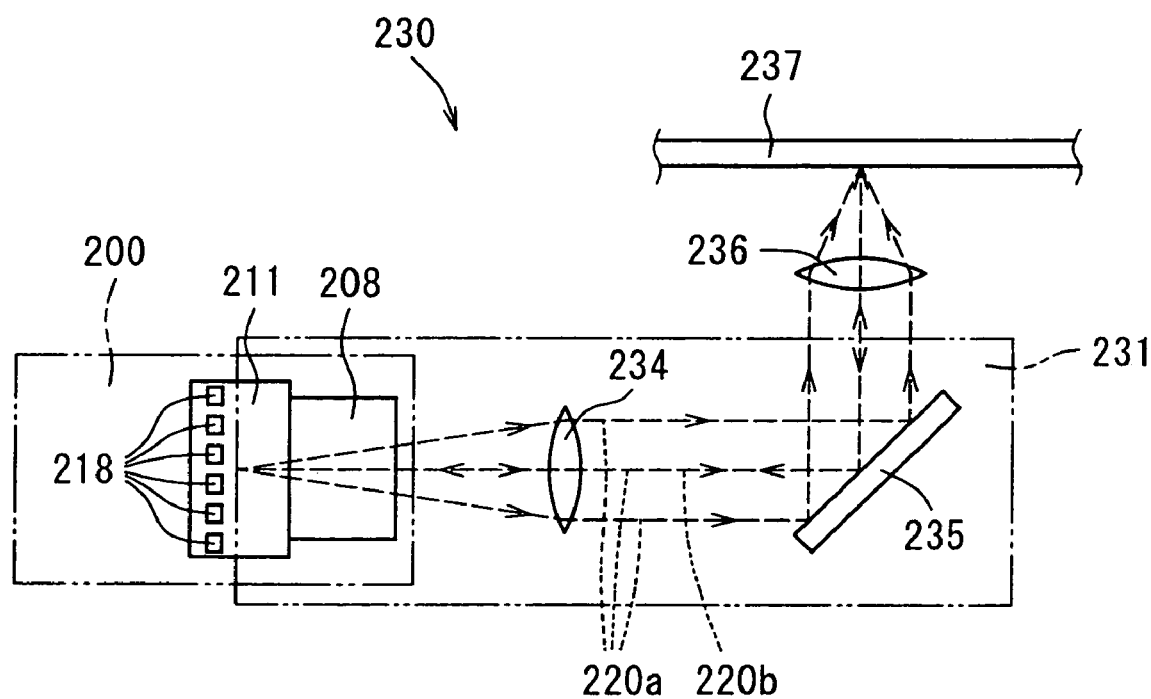
FIG. 16 is a view showing a simplified configuration of an optical pick-up apparatus using the semiconductor laser apparatus.
Figure 17:
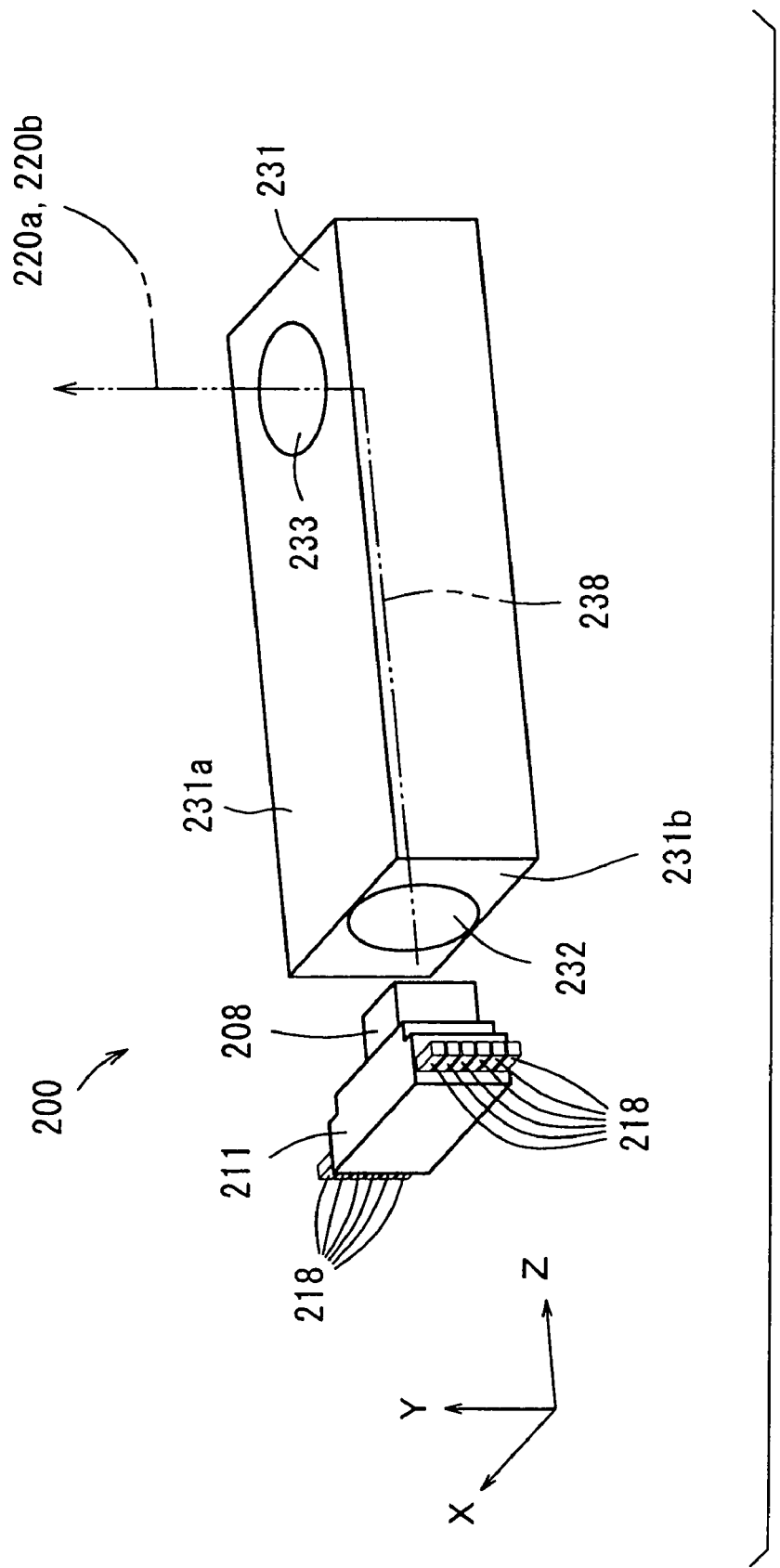
FIG. 17 is a perspective view showing outward forms of a chassis for the optical pick-up apparatus and the semiconductor laser apparatus.

FIG. 16 is a view showing a simplified configuration of an optical pick-up apparatus 230 using the semiconductor laser apparatus 200. FIG. 17 is a perspective view showing outward forms of a chassis for the optical pick-up apparatus 231 and the semiconductor laser apparatus 200. The optical picking-up apparatus 231 is configured with the semiconductor apparatus 200, the chassis for the optical pick-up apparatus 231, a collimating lens 234, a stand-up mirror 235 and an object lens 236. Since configuration and function of the semiconductor laser apparatus 200 shown in FIGS. 16 and 17 are the same as those of the semiconductor laser apparatus 200 shown in FIG. 10A and FIGS. 10B through 15, the same reference numerals are denoted for the corresponding portions and description is omitted.

The collimating lens 234 converts incident light to parallel light. The stand-up mirror 235 inflects an optical path of laser light at an angle of 90 degrees which is emitted from the semiconductor laser element 201 of semiconductor laser apparatus 200 and passes through the hologram element 208 and the stand-up mirror 235 guides the laser light to the object lens 236. The object lens 236 converges the laser light inflected by the stand-up mirror 235 on a the optical recording medium 237.

The chassis for the optical pick-up apparatus (hereinafter there is a case where the chassis for the optical pick-up apparatus is simply represented as chassis). 231 has a shape of substantially rectangular parallelepiped. A circular through-hole 233 is formed on a first wall portion 231a which is one end of the chassis 231 in the Z-axis direction and surfaces one side of Y-axis direction so that the laser light inflected by the stand-up mirror 235 can be transmitted to the object lens 236 by the circular through-hole 233.

A circular attaching hole 232 is formed on a second wall portion 231b which is another end of the chassis 231 in the Z-axis direction and surfaces another side of Z-axis direction so that the semiconductor laser apparatus 200 can be attached to the circular through-hole 232. The collimating lens 234 and the stand-up mirror 235 are arranged in the chassis 231 so that a center of the attaching hole 232 of the chassis 231 can coincide with an optical axis 238 with high precision.

As to assembly of the optical picking-up apparatus 230, first, the semiconductor laser apparatus 200 is inserted in the attaching hole 232 of the chassis 231. The upper surface 214 of the base portion of the semiconductor laser apparatus 200 abuts on a surface on which the attaching hole 232 of the chassis 231 is formed and thereby adjustment is performed for the optical axis 238 of the semiconductor laser apparatus 200 in parallel with the Z-axis direction.

Next, rotational adjustment is performed for the whole of semiconductor laser apparatus 200 so that one main beam and two sub beams generated by the grating 206 of the hologram element 208 on the optical recording medium 237 can have such an appropriate positional relationship between these beams in a tracking direction of the optical recording medium 237 as for instance positions of sub beams with only a half pitch shifted from a track in the case of the main beam located in the center of the track and then the whole of semiconductor laser apparatus 200 adheres to the chassis 231. This makes optical picking-up apparatus 230 completed. Rotating the frame circumference portion 213 of the insulating frame 211 along a circumference face of the attaching hole 232 of the chassis 231 enables precise rotational adjustment to be performed for the whole of semiconductor laser apparatus 200 without displacement of the optical axis 238.

The laser lights 220a and 220b emitted from the semiconductor laser apparatus 200 are converted parallel lights by the collimating lens 234 and are inflected by the stand-up mirror 235 at an angle of 90 degrees and are converged on the optical recording medium 237 by the object lens 236 showing in FIG. 16. In the optical picking-up apparatus 230, the stand-up mirror 235 having a sufficiently big area of an incident surface on which laser light is incident is used to reflect all the laser lights transmitted by the collimating lens 234. Since an effective diameter of the collimating lens 234 is approximately 5 mm, the stand-up mirror 235 having dimension of length of one edge more than 7 mm should be required.

Laser light reflected by the optical recording medium 237 becomes signal light including information recorded on the optical recording medium 237. The signal light follows the same as a path where the laser light passes through the object lens 236, the stand-up mirror 235 and the collimating lens 234 in this order at the time of heading for the optical recording medium 237 from the semiconductor laser apparatus 200, and the signal light returns to the semiconductor laser apparatus 200. The signal light which returns to the semiconductor laser apparatus 200 is diffracted by the hologram pattern 207 of the hologram element 208 in the semiconductor laser apparatus 200 and is incident on the predetermined light-receiving portion of the light-receiving element 210. Information recorded in the optical recording medium and control signals such as a focus error signal and a tracking error signal can be acquired on the basis of a signal obtained from the receiving portion of the light-receiving element 210.

The hologram pattern 207 is split into a plurality of areas to generate information to be recorded on the above mentioned the optical recording medium and control signals such as focus error signal and tracking error signal or the like. In addition, in this embodiment, different hologram patterns may be respectively used for a plurality of different wavelengths. In this case, it is enough for lights to be separated by wavelength in advance.

Figure 18:
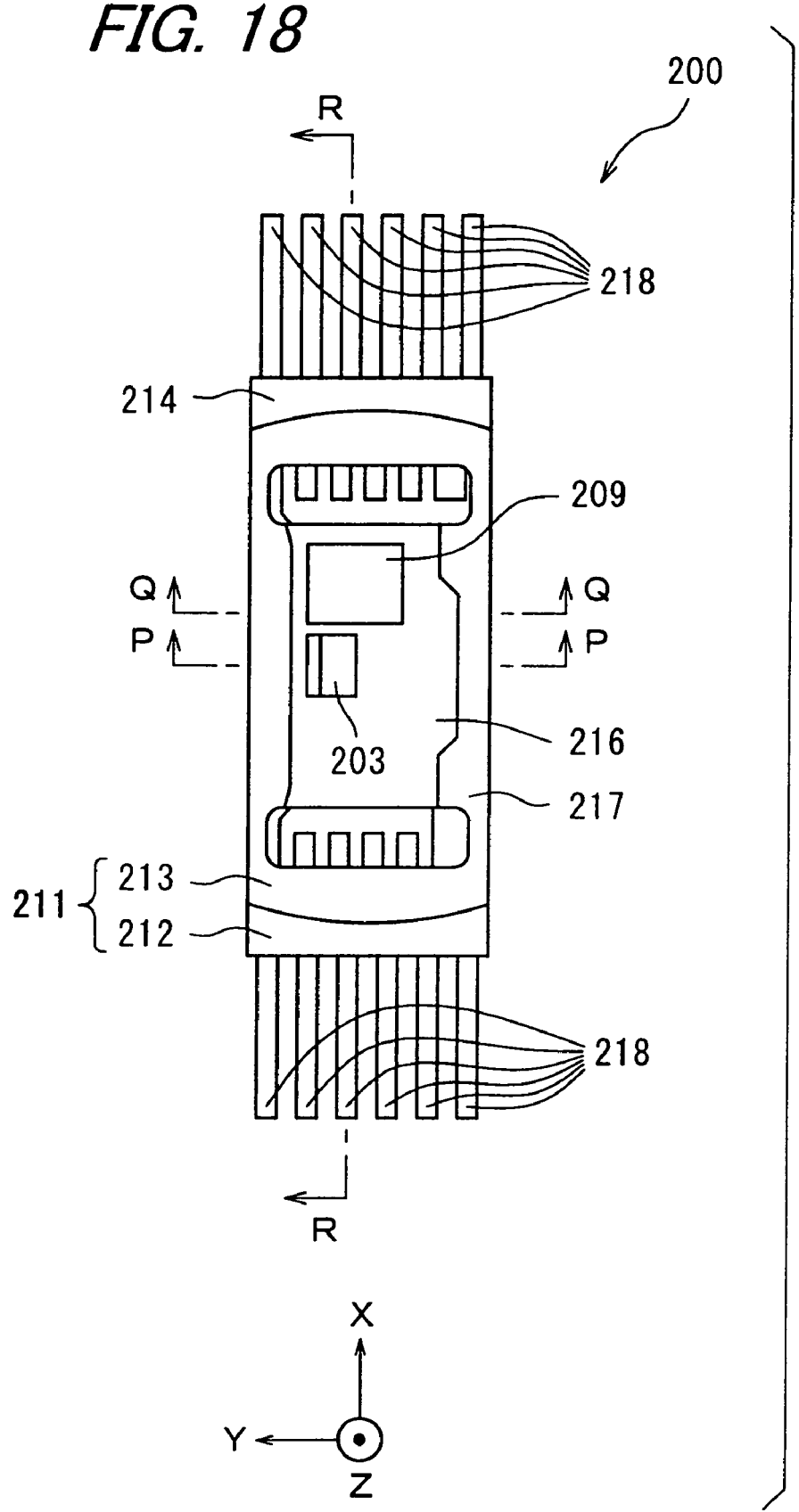
FIG. 18 is a front view showing the semiconductor laser apparatus omitting a hologram element.
Figure 19:
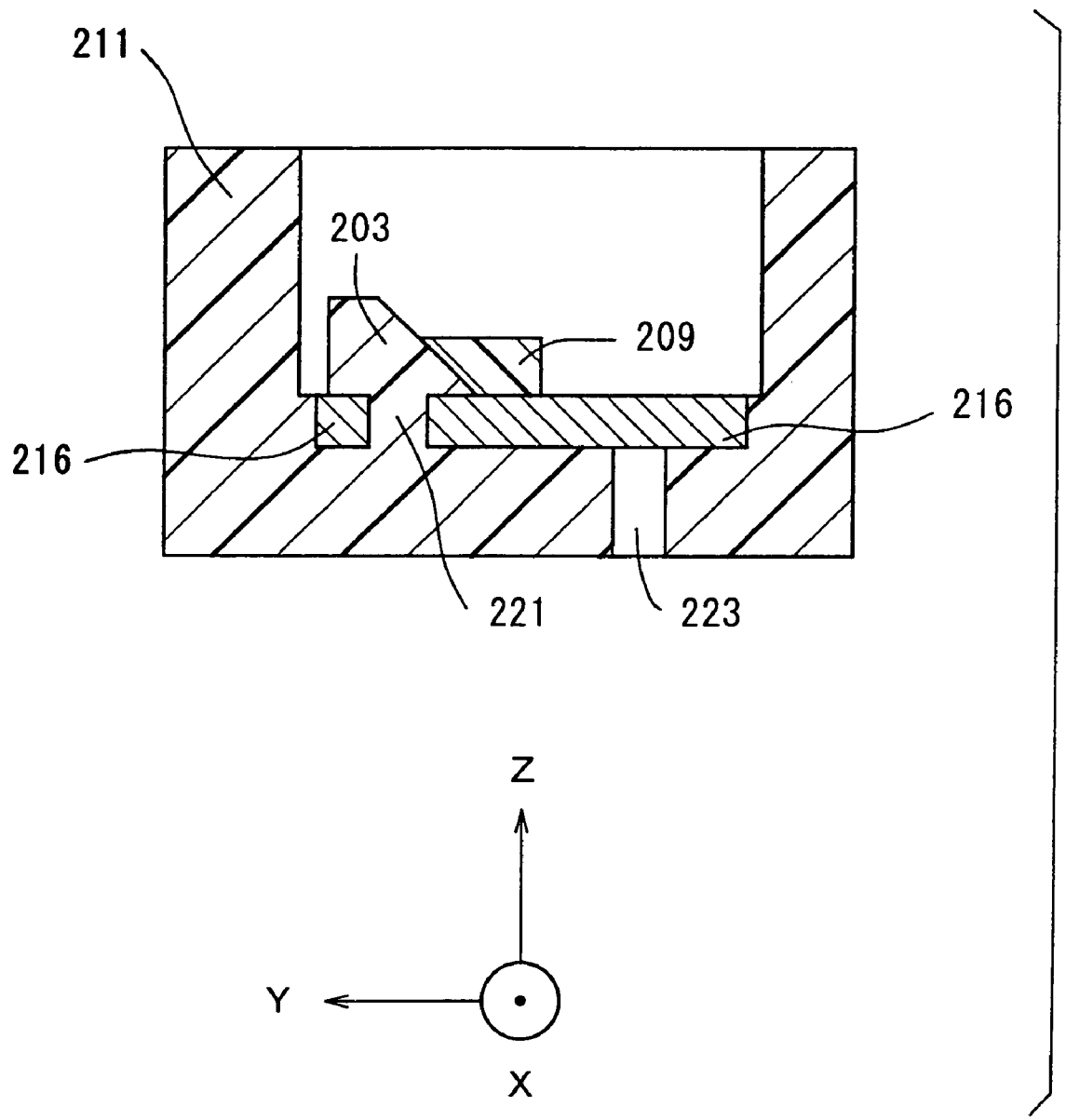
FIG. 19 is a cross sectional view taken along a cross sectional line P—P of FIG. 18.
Figure 21:
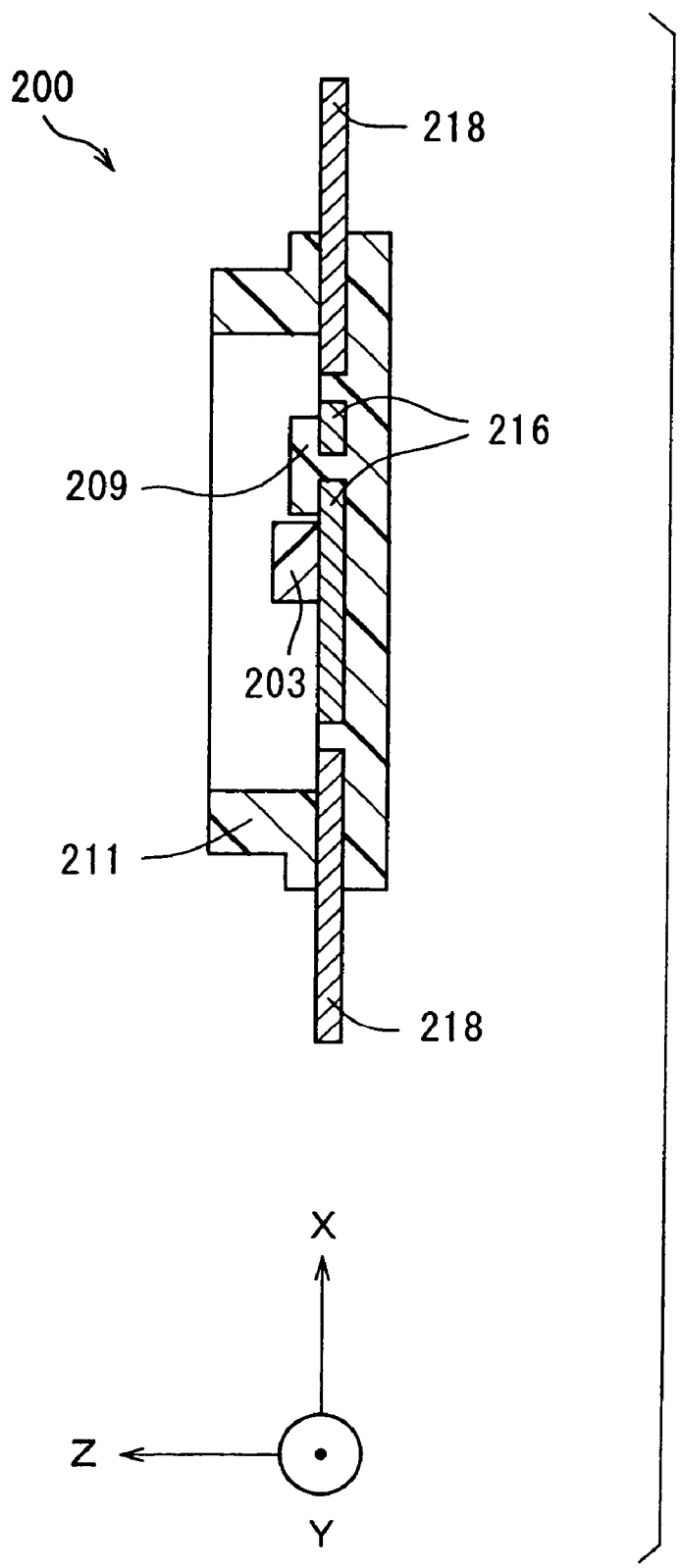
FIG. 21 is a cross sectional view taken along a cross sectional line R—R of FIG. 18.

FIG. 18 is a front view showing the semiconductor laser apparatus 200 omitting the hologram element 208. FIG. 19 is a cross sectional view taken along a cross sectional line P—P of FIG. 18. FIG. 20 is a cross sectional view taken along a cross sectional line Q—Q of FIG. 18. FIG. 21 is a cross sectional view taken along a cross sectional line R—R of FIG. 18.

The optical axis conversion mirror mounting portion 203 and the light-receiving element mounting portion 209 is formed on the island portion 216 with an interval each other in X-axis direction as shown in FIGS. 18 and 21. The optical axis conversion mirror mounting portion 203 is formed on the island portion 216 with an interval from one end of Y-axis direction of the insulating frame 211 to the Y-axis direction as shown in FIG. 19. The light-receiving element mounting portion 209 is formed on the island portion 216 with an interval from one end of Y-axis direction of the insulating frame 211 to the Y-axis direction as shown in FIG. 20.

According to detailed description, the first through-hole 221 penetrating in Z-axis direction is formed on a position close to a central portion of X-axis direction and one end of Y-axis direction of the island portion 216 and the insulating frame 211 and the optical axis conversion mirror mounting portion 203 are integrated and formed by using the same resin material and thereby adhesive strength of the optical axis conversion mirror mounting portion 203 for the insulating frame 211 is aimed. In addition, the second through-hole 222 penetrating in Z-axis direction is formed on a position close to one end of X-axis direction and one end of Y-axis direction of the island portion 216 and the insulating frame 211 and the light-receiving element mounting portion 209 are integrated and formed by using the same resin material and thereby adhesive strength of the light-receiving element mounting portion 209 for the insulating frame 211 is aimed.

In addition, a through-hole 223 for radiation penetrating in Z-axis direction is formed on a position close Lo another end of Y-axis direction of the insulating frame 211 on another side of Z-axis direction of the island portion 216. Forming the through-hole 223 for radiation enables heat irradiated from the semiconductor laser element 201 by itself in the semiconductor laser apparatus 200 to be radiated into atmosphere via the silicon sub-mount mounting the semiconductor 201 and the island portion 216 mounting the silicon sub-mount. This enables thermal stress of the semiconductor laser element 201 to be reduced.

Figure 22:
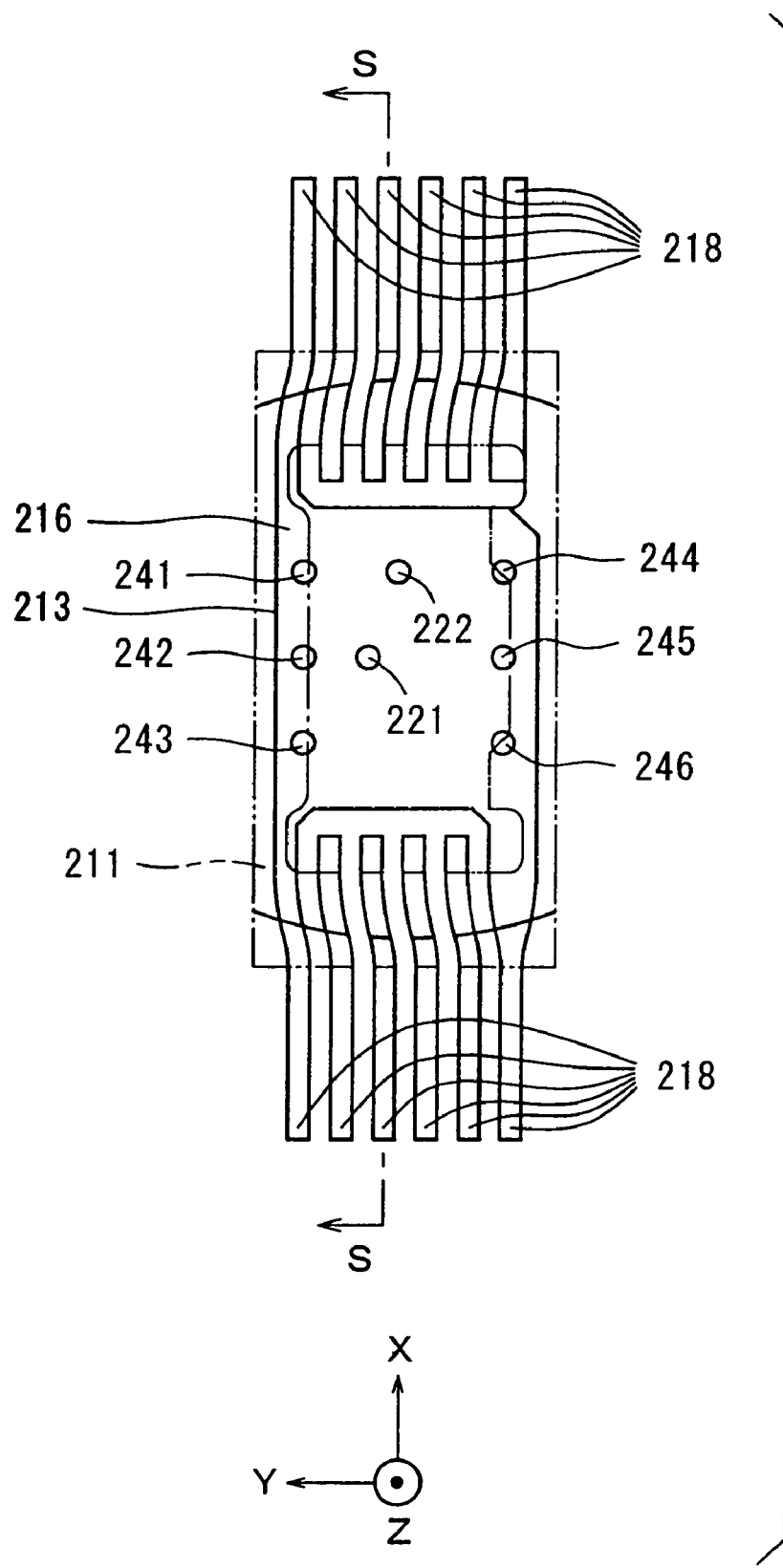
FIG. 22 is a front view showing leads and an island portion of the semiconductor laser apparatus.
Figure 23:
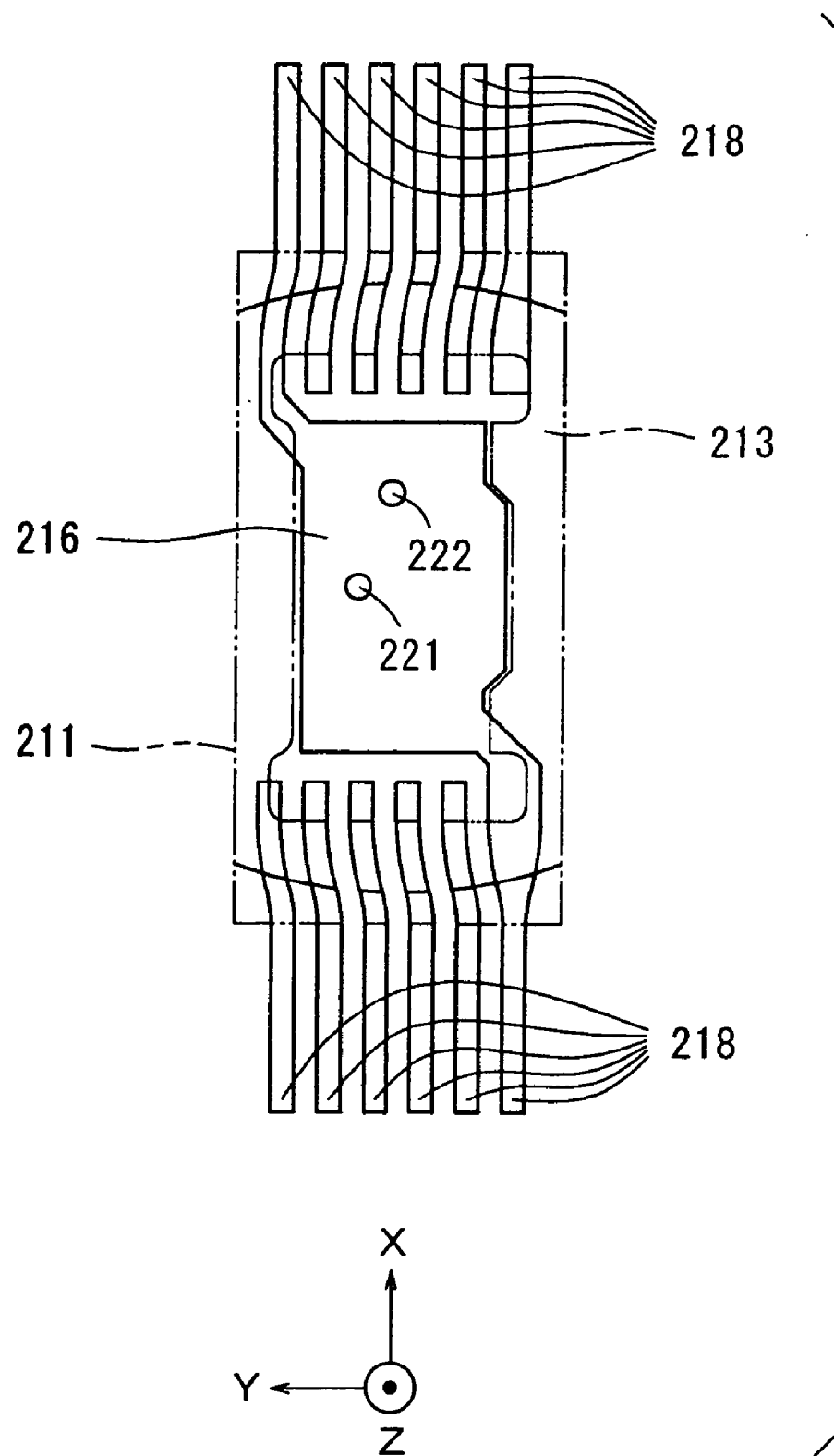
FIG. 23 is a front view showing another example of leads and an island portion of the semiconductor laser apparatus.
Figure 24:
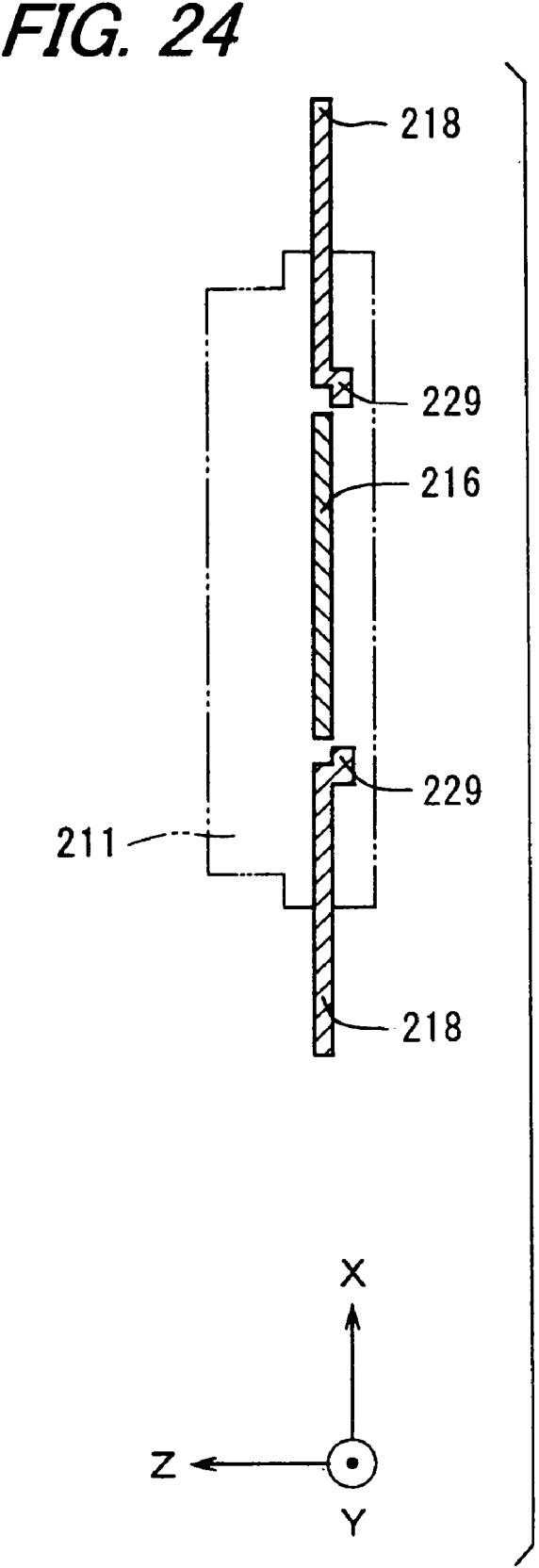
FIG. 24 is a cross sectional view taken along a cross sectional line S—S of FIG. 22.

FIG. 22 is a front view showing leads 218 and an island portion 216 of the semiconductor laser apparatus 200. FIG. 23 is a front view showing another example of leads 218 and an island portion 216 of the semiconductor laser apparatus 200. FIG. 24 is a cross sectional view taken along a cross sectional line S—S of FIG. 22.

As shown in FIG. 22, a third through-hole 241, a fourth through-hole 242, a fifth through-hole 243, a sixth through-hole 244, a seventh through-hole 245 and an eighth through-hole 246 which respectively penetrate the island portion 216 are formed in the Z-axis direction. The third through-hole 241 is formed near one end portion of the island portion 216 in the X-axis direction and on one end portion of the island portion 216 in the Y-axis direction. The fourth through-hole 242 is formed on a center portion of the island portion 216 in the X-axis direction and on one end portion of the island portion 216 in the Y-axis direction. The fifth through-hole 243 is formed near another end portion of the island portion 216 in the X-axis direction and on one end portion of the island portion 216 in the Y-axis direction. The third through-hole 241 and the fourth through-hole 242 are formed with an interval on the island 216 in the X-axis direction, the fourth through-hole 242 and the fifth through-hole 243 are formed with an interval between each other in the X-axis direction of the island 216.

The sixth through-hole 244 is formed near one end portion of the island portion 216 in the X-axis direction and on the other end portion of the island portion 216 in the Y-axis direction. The seventh through-hole 245 is formed on the center portion of the island portion 216 in the X-axis direction and on the other end portion of the island portion 216 in the Y-axis direction. The eighth through-hole 246 is formed near the other end portion of the island portion 216 in the X-axis direction and on the other end portion of the island portion 216 in the Y-axis direction. The sixth through-hole 244 and the seventh through-hole 245 are formed with an interval between each other in the X-axis direction of the island 216. In addition, the seventh through-hole 245 and the eighth through-hole 246 are formed with an interval between each other in the X-axis direction of the island 216.

As mentioned above, forming the third though-hole 241 through the eighth though-hole 246 on the island portion 216 enables stability of strength for attaching the hologram element to the insulating frame to be enhanced even when dimension of width of the frame circumference portion 213 of the insulating frame 211 facing each other in the Y-axis direction is relatively small as shore as shown in FIG. 22. In addition, since the stability of strength for attaching the hologram element to the insulating frame 211 can be enhanced, stability of an optical position can be enhanced.

In addition, as shown in FIG. 23, an area of the island portion 216 is made smaller than an area of the island portion 216 shown in FIG. 22 and the island portion 216 is formed with an interval to the frame circumference portion 213 in the Y-axis direction. As mentioned above, making the area of the island portion 216 relatively small leads to making dimension of width of the frame circumference portion 213 of the insulating frame 211 facing each other in the Y-axis direction is relatively large. This enables the stability of strength for attaching the hologram element to the insulating frame 211 to be enhanced. In addition, stability of an optical position can be enhanced. In addition, since the stability of strength for attaching the hologram element to the insulating frame 211 can be enhanced, stability of an optical position can be given.

As shown in FIG. 24, a projecting portion 229 is formed on another end portion in the X-axis direction of the leads 218 arranged on a side facing in the X-axis direction of the base portion 212 of the insulating frame 211 and is also formed on one end portion in the X-axis direction of the leads 218 arranged on a side facing in the X-axis direction of the base portion 212 of the insulating frame 211. The projecting portion 229 is formed by inflection of one end portion of the leads 218. As mentioned above, forming the projecting portion 229 on the lead 228 can prevent the leads 228 from coming out from the insulating frame 211 when external force in the X-axis direction is applied to the leads 228.

Figure 25:
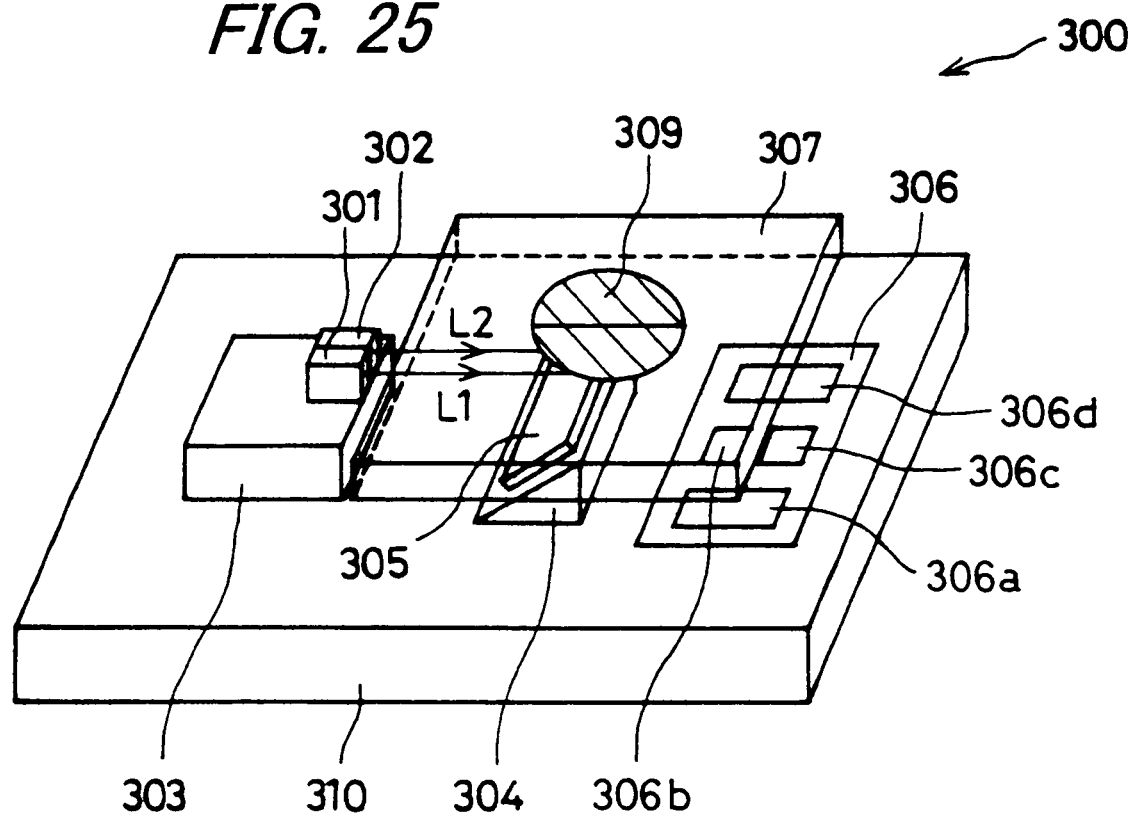
FIG. 25 is a simplified perspective view showing a semiconductor laser apparatus according to a sixth embodiment of the invention.

FIG. 25 is a simplified perspective view showing a semiconductor laser apparatus 300 according to a sixth embodiment of the invention. The semiconductor laser apparatus 300 is configured by a first semiconductor laser element 301, a second semiconductor laser element 302, a silicon sub-mount 303, a microprism 304, a half wavelength plate 305, a light-receiving element 306 for detecting a signal, a hologram element 307 and a silicon substrate 310, the hologram element 307 and the silicon substrate 310. The hologram element 307 comprises a grating 308 for generating three beams (hereinafter there is a case where the grating for generating three beams is simply represented as a grating) and a hologram pattern 309. The light-receiving element 306 for detecting a signal (hereinafter there is a case where the light-receiving element for detecting a signal is simply represented as a light-receiving element) comprises light-receiving portions 306a, 306b, 306c and 306d.

The first and second semiconductor laser elements 301 and 302 are light sources of the semiconductor laser apparatus 300. The first semiconductor laser element 301 emits red wavelength laser light having for instance 650 nm oscillating wavelength. The first semiconductor laser element 301 is used for performing reading and recording information for instance for DVD. The second semiconductor laser element 302 emits infrared wavelength laser light having for instance 780 nm oscillating wavelength. The second semiconductor laser element 302 light is used for performing reading and recording information for instance for CD.

The microprism 304 has similar function as the optical conversion mirror 204 in the semiconductor laser apparatus 200. The one half wavelength plate 305, the light-receiving element 306, the hologram element 307, the grating 308 and hologram pattern 309 have similar functions as the one half wavelength plate 205, the light-receiving element 210, the hologram element 208, the grating 206 and hologram pattern 207 and therefore description about these elements 304 through 309 is omitted.

The first and second semiconductor laser elements 301 and 302 are mounted on the silicon sub-mount 302. The silicon sub-mount 302 is mounted on a central position in the longitudinal direction and a central position in the width direction of the silicon substrate 310 which is a substantially plain plate. The half wavelength plate (hereinafter, there is a case where the half wavelength plate is represented as $\lambda/2$ plate) 305 is mounted on the microprism 304. The light-receiving element 306 is integrated and formed on the silicon substrate 310 by using semiconductor process technology such as for instance chemical vapor deposition (abbreviated as CVD) method or the like.

In addition, a plurality of light-receiving portions 306 such as 4 light-receiving portions 306a, 306b, 306c and 306d in this embodiment. The hologram element 307 is mounted on the upper position of the microprism 304 mounted on the silicon substrate 310 and the light-receiving element 306 formed on the silicon substrate 310. In this embodiment, the hologram pattern 309 formed on a surface of the hologram element 307 has a circular shape and a diffracting area of the hologram pattern 309 is split into two areas.

When the semiconductor laser apparatus 300 configured as mentioned above is used for a optical pick-up apparatus, a laser light L1 emitted from the first semiconductor laser element 301 and a laser light L2 emitted from the second semiconductor laser element 302 are incident on the microprism 304 provided with the $\lambda/2$ plate 305. And thereby the traveling direction of the laser light L1 emitted from the first semiconductor laser element 301 is inflected and the polarization direction of the laser light L1 is rotated at an angle of 90 degrees. The traveling direction of the laser light L2 emitted from the second semiconductor laser element 302 is inflected.

The laser lights L1 and L2 inflected by the microprism 304 are incident on the grating 308. When the laser light L1 emitted from the first semiconductor laser element 301 is incident the grating 308, the laser light L1 is not subject to diffracting action and is transmitted by the grating 308. When the laser light L2 emitted from the first semiconductor laser element 302 is incident the grating 308, the laser light L2 is diffracted and is split into three laser lights. The laser light having passed through the grating 308 passes through the hologram pattern 309 and is converged on not shown the optical recording medium.

As mentioned above, as to the laser light L1 emitted from the first semiconductor laser element 301 to be used in a case where information of DVD is read or the like, the laser light L1 is not diffracted by the grating 308 formed on a hologram element with difference from prior arts. Consequently, an optical pick-up apparatus using the semiconductor laser apparatus 300 can suppress reduction of optical utilization efficiency arising with loss of the quantity of light caused by reduction of quantity of laser light to be converged on an optical recording medium.

In addition, according to this embodiment, since the silicon sub-mount 303 on which the first and second semiconductor laser elements 301 and 302 are mounted and the light-receiving element 306 for detecting a signal are mounted on a plane of the silicon substrate 310, die bonding and wire bonding can be performed from the same direction. This enables assembling work for the semiconductor laser apparatus 300 to be easily performed.

Figure 26:
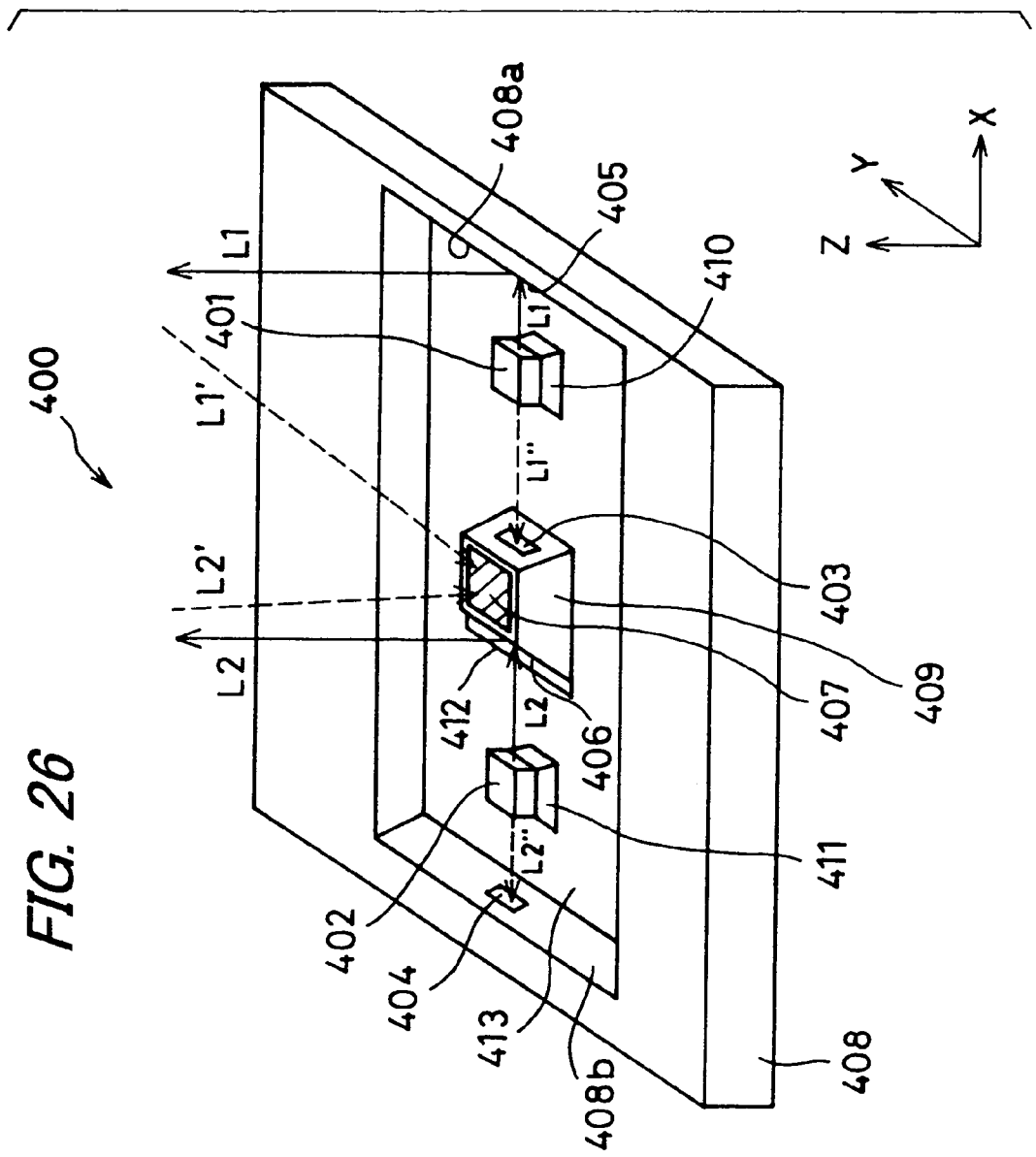
FIG. 26 is a simplified perspective view showing a semiconductor laser apparatus 400 according to a seventh embodiment of the invention.

FIG. 26 is a simplified perspective view showing a semiconductor laser apparatus 400 according to a seventh embodiment of the invention. The semiconductor laser apparatus 400 is configured by a first semiconductor laser element 401, a second semiconductor laser element 402, a first light-receiving element 403 for monitoring, a second light-receiving element 404 for monitoring, a first mirror surface 405, a second mirror surface 406, a light-receiving element 407 for detecting a signal, a silicon substrate 408, a first projecting portion 409, a second projecting portion 410, a third projecting portion 411 and a half wavelength plate 412. In addition, a hologram element is omitted in the semiconductor laser apparatus 400 shown in FIG. 26. Here, The X-axis, Y-axis and Y-axis shown in the FIG. 26 are three dimensional orthogonal coordinate axes. Directions of the X-axis, the Y-axis and the Z-axis respectively correspond to a longitudinal direction, a width direction and a thickness direction of the silicon substrate 408 in the semiconductor laser apparatus 400.

The first and second semiconductor laser elements 401 are light sources of the semiconductor laser apparatus 400. The first semiconductor laser element 401 emits infrared wavelength laser light having for instance 780 nm oscillating wavelength. The first semiconductor laser element 401 is used for performing reading and recording information for instance for CD. The second semiconductor laser element 402 emits red wavelength laser light having for instance 650 nm oscillating wavelength. The second semiconductor laser element 402 is used for performing reading and recording information for instance for DVD.

The first and second light-receiving elements 403 and 404 for monitoring have similar function as the light-receiving elements 202 for monitoring in the semiconductor laser apparatus 200. The first and second mirror surfaces 405 and 406 have similar function as the optical axis conversion mirror 204 in the semiconductor laser apparatus 200. The light-receiving element 407 for detecting a signal (hereinafter, there is a case where the half wavelength plate is simply represented as a light-receiving element) has similar function as the light-receiving element 210 in the semiconductor laser apparatus 200.

The silicon substrate 408 is a substantially plain plate. A substrate concave portion 413 which is opened in one side in the Z-axis direction and is substantially rectangle is formed on the silicon substrate 408. The first projecting portion 409, the second projecting portion 410 and the third projecting portion 411 are also formed on the silicon substrate 408 by projecting from a bottom surface of the substrate concave portion 413 to one side in the Z-axis direction in a process of forming the substrate concave portion 413. In addition, the silicon substrate 408 has a first wall portion 408a and a second wall portion 408b in the Y-axis direction of the silicon substrate 408.

The first wall portion 408a is one end in the X-axis direction of the silicon substrate 408 and surfaces the substrate concave portion 413 and is tilted so that the first wall portion 408a can approach a bottom of the substrate concave portion 413 as the first wall portion 408a heads to another end in the X-axis direction of the silicon substrate 408. The second wall portion 408b is another end in the X-axis direction of the silicon substrate 408 and surfaces the substrate concave portion 413 and is tilted so that the first wall portion 408a can approach the bottom of the substrate concave portion 413 as the second wall portion 408b heads to one end in the X-axis direction of the silicon substrate 408. The first mirror surface 405 is formed on the central portion of the first wall portion 408a. The second light-receiving element 404 for monitoring is formed on the central portion of the second wall portion 408b.

The first projecting portion 409 is formed in a truncated pyramid shape and on the bottom of the substrate concave portion 413 on a central portion in the X-axis direction and a central portion in the Y-axis direction. The second projecting portion 410 is formed in a smaller truncated pyramid shape than the first projecting portion 409 and with an interval from the first projecting portion 409 on one side in the X-axis direction of the first projecting portion 409. The third projecting portion 411 is formed in a smaller truncated pyramid shape than the first projecting portion 409 and with an interval from the first projecting portion 409 on another side in the X-axis direction of the first projecting portion 409. The second and third projecting portions 410 and 411 have the same size.

The light-receiving element 407 is arranged on a surface of the first projecting portion 409 facing one side in the Z-axis direction. The first light-receiving element 403 for monitoring is formed on a side facing one side in the X-axis direction of the first projecting portion 409. The second mirror surface 406 is formed on a side facing another side in the X-axis direction of the first projecting portion 409. In addition, the half wavelength plate (hereinafter there is a case where the half wavelength is represented as λ/2 plate) 412 is attached to the second mirror surface 406. The first semiconductor laser element 401 is fixed by adhesive and is mounted on a surface facing one side in the Z-axis direction of the second projecting portion 410. The second semiconductor laser element 402 is fixed by adhesive and is mounted on a surface facing one side in the Z-axis direction of the third projecting portion 411.

In the semiconductor laser apparatus 400, only the second mirror surface 406 to be used for inflecting a traveling direction of the laser light L2 emitted from the second semiconductor laser element 402 is formed on the first projecting portion 409 and the first mirror surface 405 is not formed on the first projecting portion 409. This is because an angle of inclination of a surface facing one side in the X-axis direction of the first projecting portion 409 cannot be set to a predetermined angle with use of the present technology when an angle of inclination of a surface facing another side in the X-axis direction of the first projecting portion 409 is defined as the predetermined value.

As to the laser light L1 emitted from the first semiconductor laser element 401 to one side in the X-axis direction, the laser light L1 is incident on the first mirror surface 405. Here, the first mirror surface 405 is a crystal surface of the silicon substrate 408 and has the similar function as the optical axis conversion mirror 204 in the above mentioned semiconductor laser apparatus 200 and has optical characteristics equal to or more than those of a reflection surface formed in a shape of prism with use of a glass or the like. An angle of inclination of the first mirror surface 405 can be set to the predetermined angle of inclination with appropriate selection of a surface direction of the silicon substrate 408 and an etching solution. A laser light L1 being incident on the first mirror surface 405 is reflected and is diffracted and split into three laser lights by the grating formed on the hologram element which is arranged on one side in the Z-axis direction of the silicon substrate 408 and is not shown. And then the three laser lights pass through the hologram pattern formed on the hologram element and are converged on the optical recording medium. A laser light L1' which is emitted from the first semiconductor laser element 401 and is reflected by the optical recording medium is diffracted by the hologram pattern of the hologram element and is incident on a predetermined light-receiving portion of the light-receiving element 407. In addition, a laser light L1" which is emitted from the first semiconductor laser element 401 to another side in the X-axis direction is incident on the first light-receiving element 403 for monitoring.

As to a laser light L2 emitted from the second semiconductor laser element 402 on one side in the X-axis direction, the laser light L2 is incident on the second mirror surface 406 on which the $\lambda/2$ plate 412 is arranged. As to the laser light L2 being incident on the second mirror surface 406 on which the $\lambda/2$ plate 412 is arranged, the polarization direction of the is rotated at an angle of 90 degrees and simultaneously the laser light L2 is reflected and passes through the grating and the hologram pattern formed on the hologram element not shown and is converged on the optical recording medium. As to a laser light L2' which is emitted from the second semiconductor laser element 402 and is reflected by the optical recording medium, the laser light L2' is diffracted by the hologram pattern formed on the hologram element not shown and is incident on a predetermined light-receiving portion of the light-receiving element 407. In addition, a laser light L2" which is emitted from the second semiconductor laser element 402 on another side in the X-axis direction is incident on the second light-receiving element 404 for monitoring.

As mentioned above, as to the laser light L2 which is used for a case of reading information of DVD or the like and is emitted from the second semiconductor laser element 402, the laser light L2 is not diffracted by the grating formed on the hologram element with difference from the prior art. Consequently, the optical pick-up apparatus using the semiconductor laser apparatus 300 can suppress reduction of optical utilization efficiency with loss of quantity of light caused by reduction of quantity of light of laser light to be naturally converged on the optical recording medium.

In addition, according to this embodiment, as to the first projecting portion 409 on which the light-receiving element 407 for detecting a signal is mounted and the second and third projecting portions 410 and 411 on which the first and second semiconductor laser elements 401 and 402 are mounted, these projecting portions 409, 410 and 411 are mounted on a bottom of the substrate concave potion 413 of the substrate 408 and therefore die bonding and wire bonding can be easily performed from the same direction. This enables assembling work of the semiconductor laser apparatus 400 to be easily performed.

In addition, in another embodiment of the semiconductor laser apparatus 400, two semiconductor laser elements 401 and 402 may be arranged in parallel and a semiconductor laser element comprising two oscillating point may be formed on one chip.

Figure 27A:
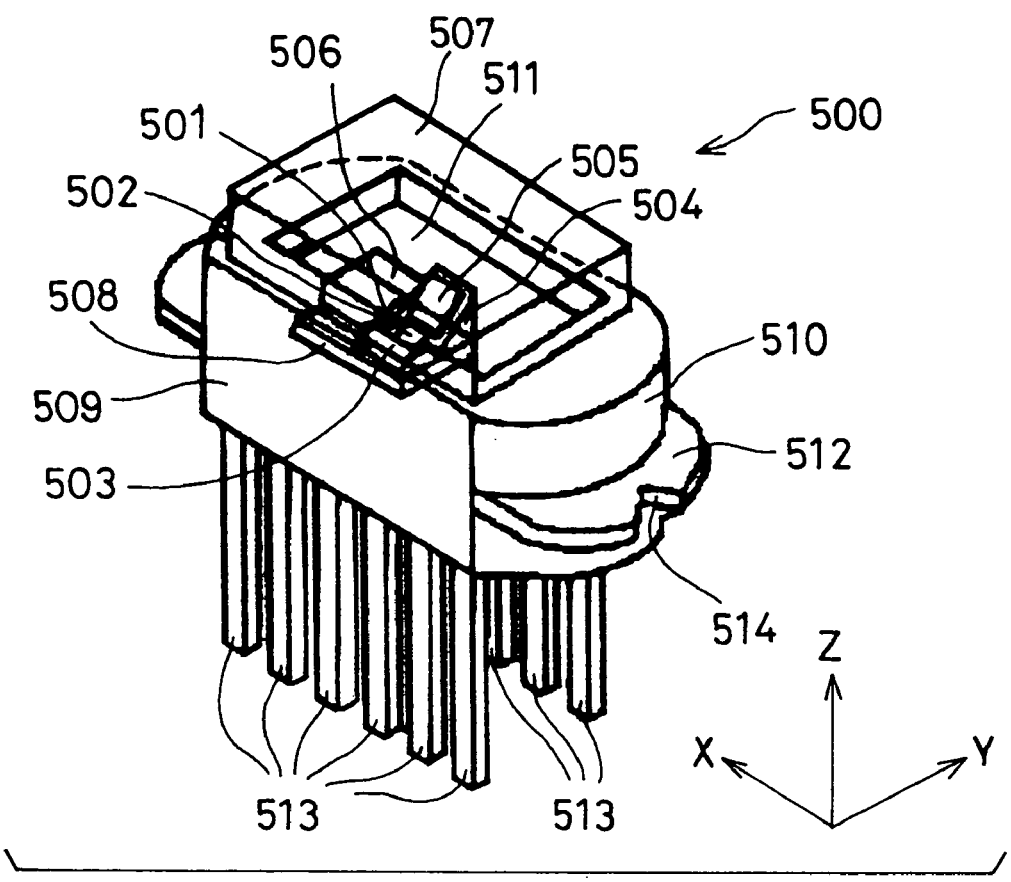
FIG. 27A is a simplified perspective view showing a semiconductor laser apparatus 500 according to an eighth embodiment of the invention.
Figure 27B:
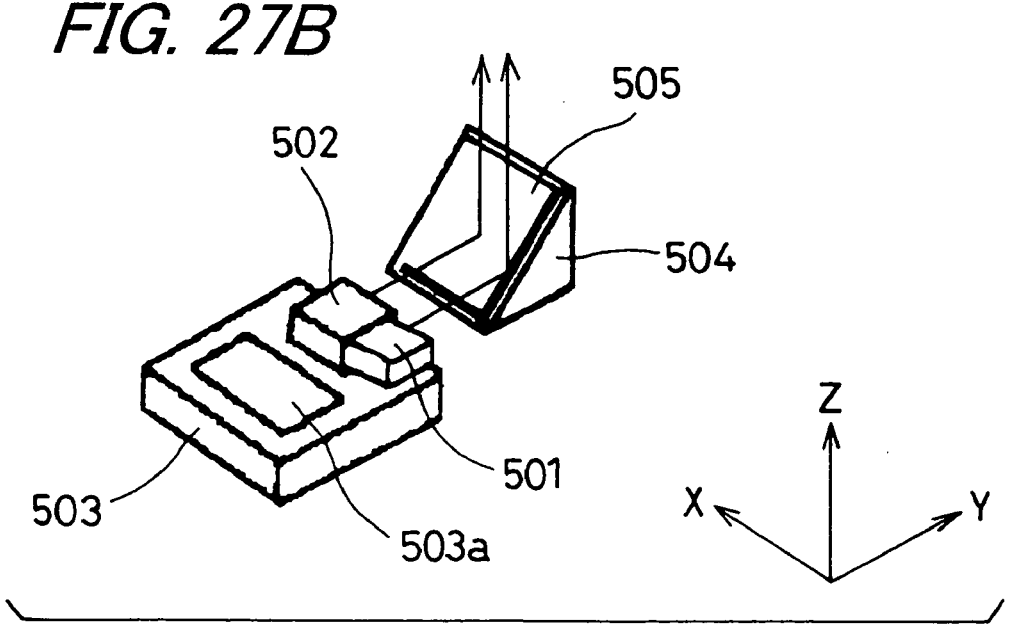
FIG. 27B is a perspective view showing some portions extracted from the semiconductor laser apparatus.
Figure 28:
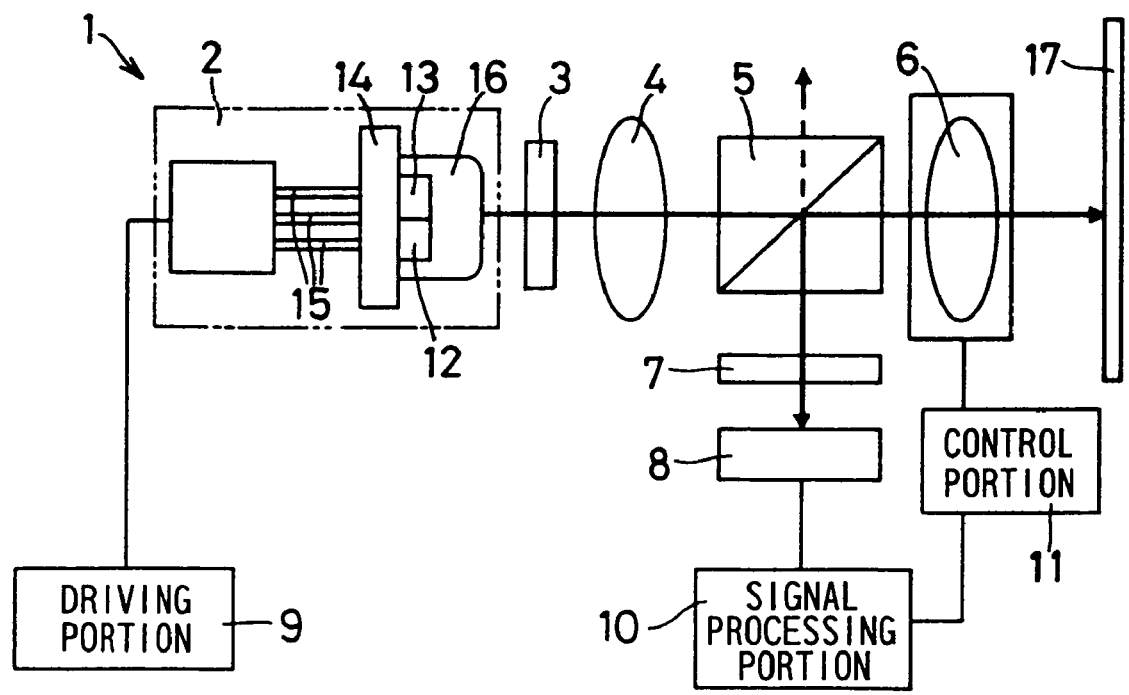
FIG. 28 is a view showing a simplified configuration of a conventional optical pick-up apparatus.
Figure 29:
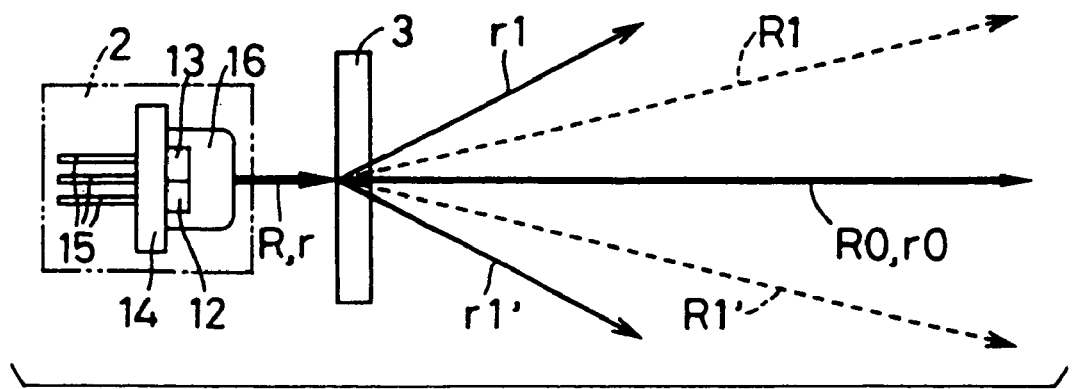
FIG. 29 is a view showing diffraction light arising after laser lights respectively emitted from first and second semiconductor laser elements transmits a grating.
Figure 30A:
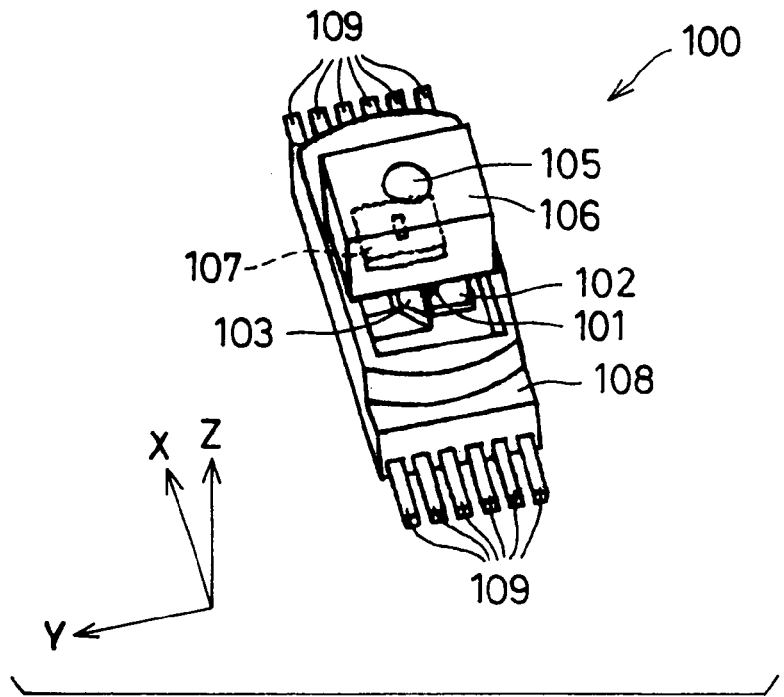
FIG. 30A is a simplified perspective view showing a conventional semiconductor laser apparatus.
Figure 30B:
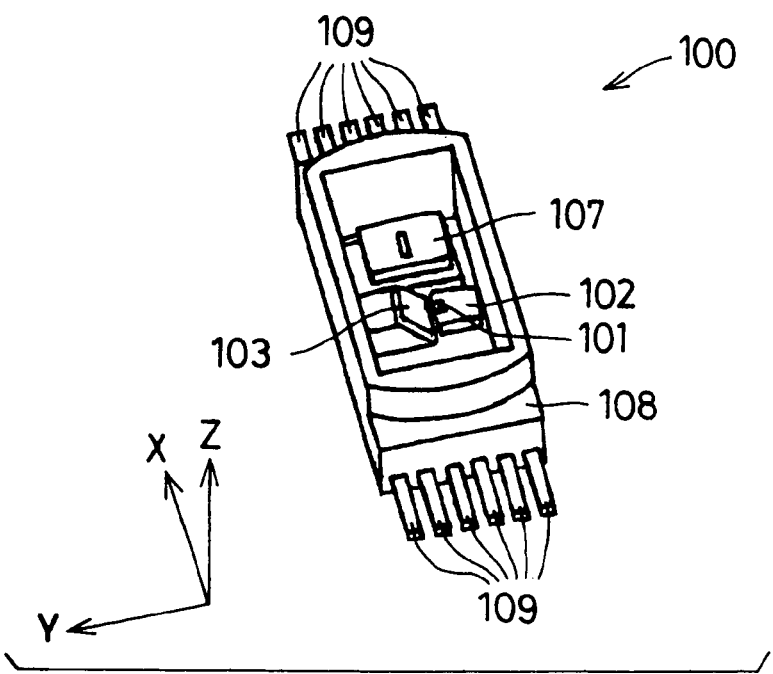
FIG. 30B is a perspective view showing the semiconductor laser apparatus omitting a hologram element.
Figure 31:
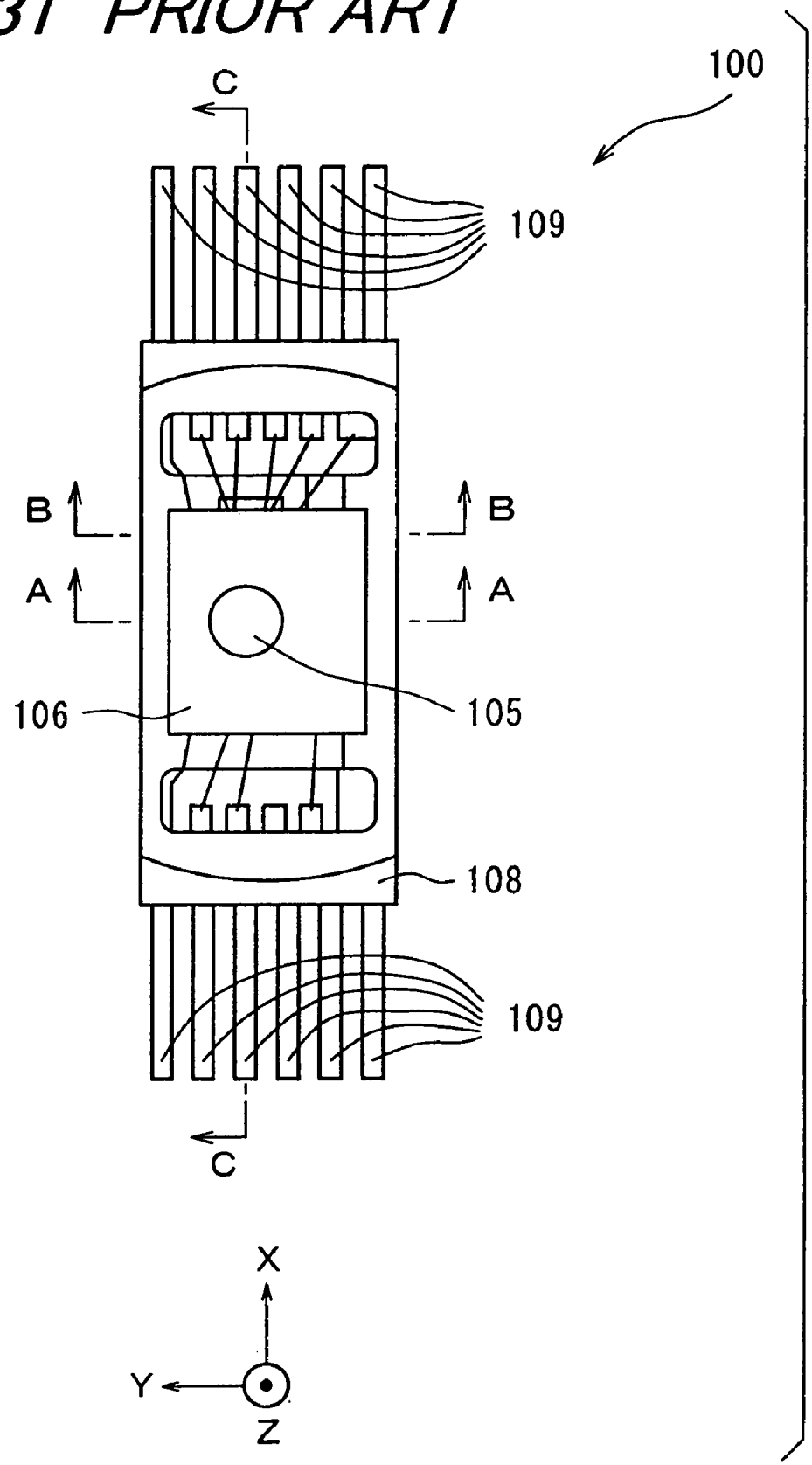
FIG. 31 is a front view showing the semiconductor laser apparatus.
Figure 32:
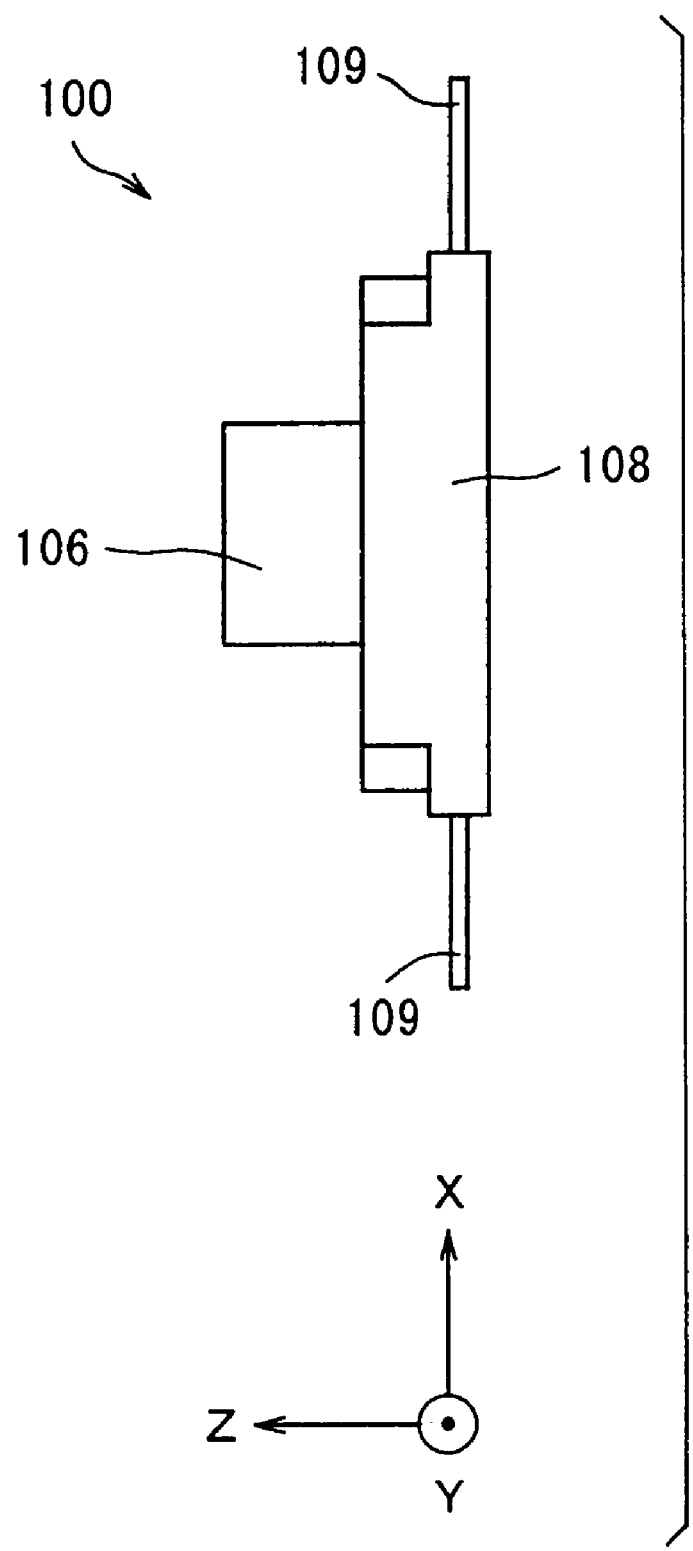
FIG. 32 is a right side view showing the semiconductor laser apparatus.
Figure 33:
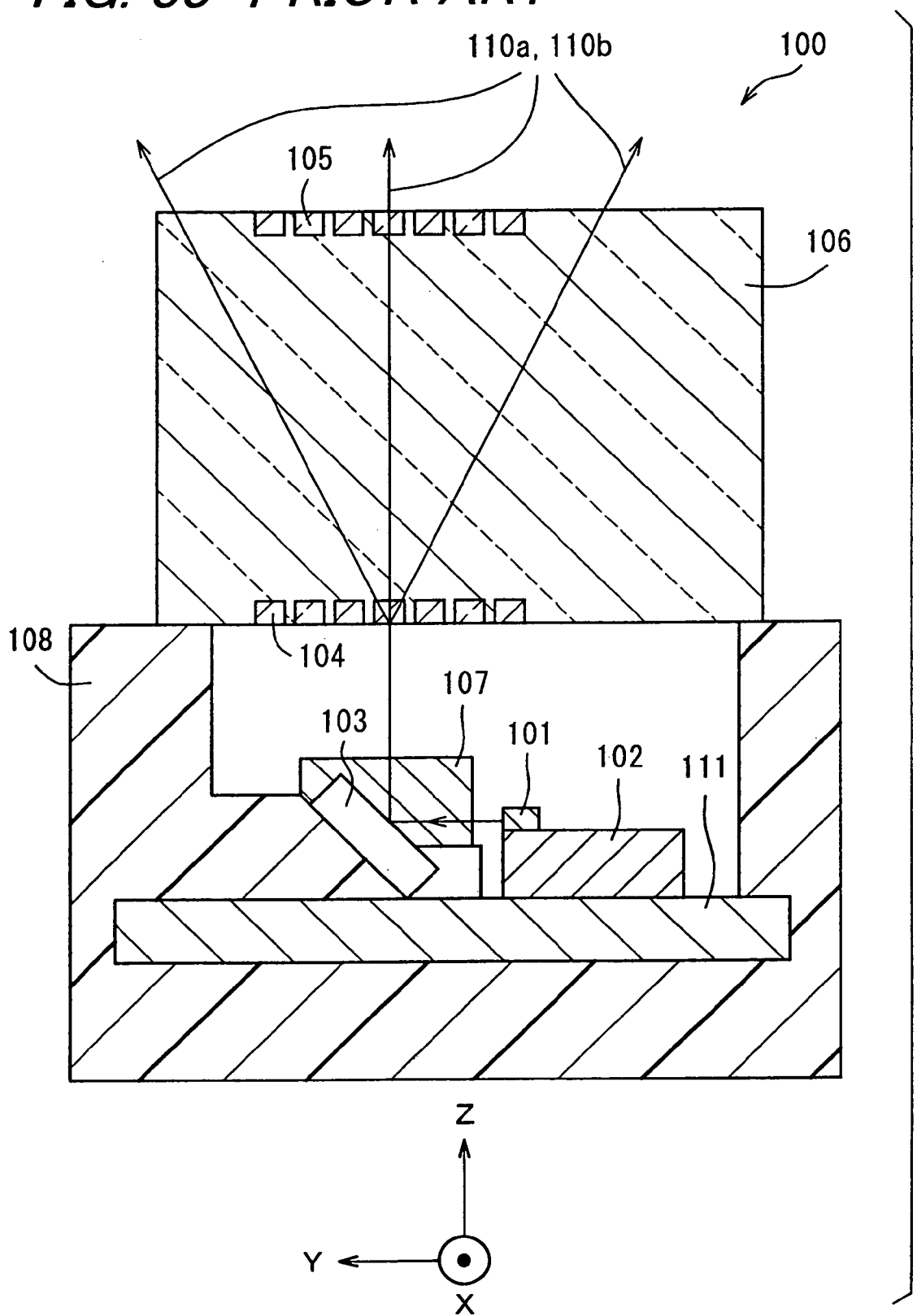
FIG. 33 is a cross sectional view taken along a cross sectional line A—A of FIG. 31.
Figure 34:
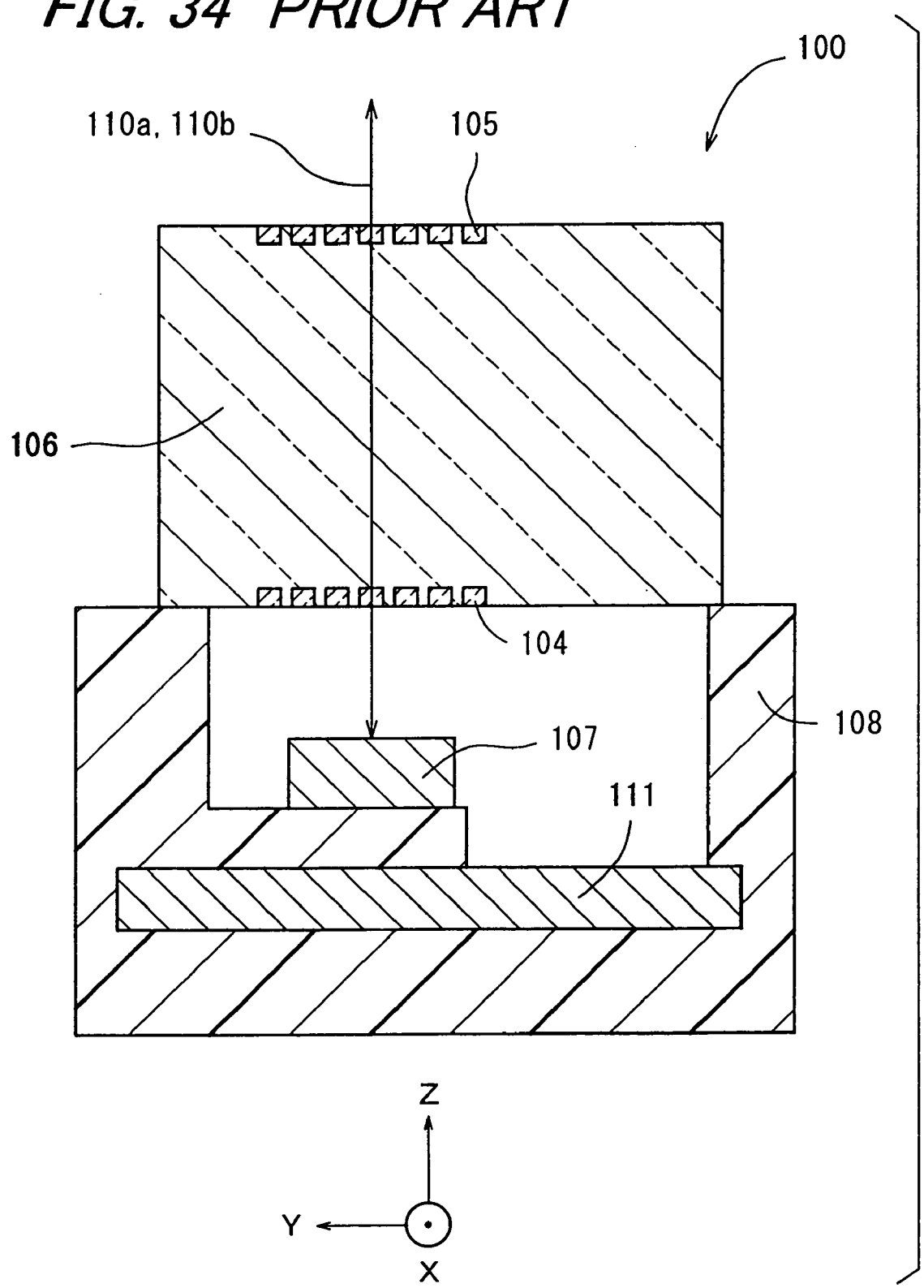
FIG. 34 is a cross sectional view taken along a cross sectional line B—B of FIG. 31.
Figure 35:
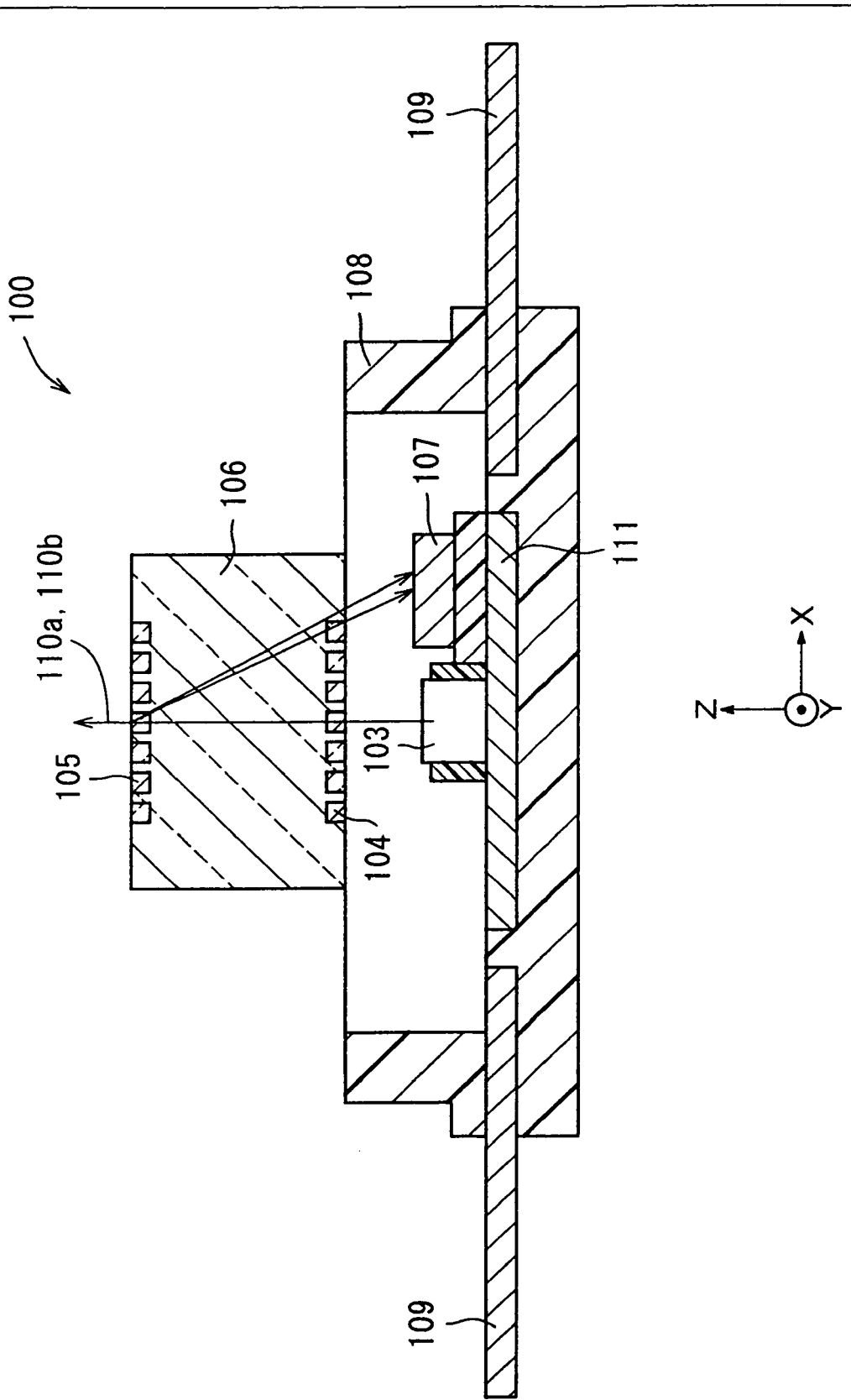
FIG. 35 is a cross sectional view taken along a cross sectional line C—C of FIG. 31.

FIG. 27A is a simplified perspective view showing a semiconductor laser apparatus 500 according to an eighth embodiment of the invention. FIG. 27B is a perspective view showing some portions extracted from the semiconductor laser apparatus 500.

A semiconductor laser apparatus 500 is configured by a first semiconductor laser element 501, a second semiconductor laser element 502, a sub-mount 503, a light-receiving element 503a for monitoring, a laser light stand-up mirror 504, a half wavelength plate 505, a light-receiving element 506 for detecting a signal, a hologram element 507, a pedestal portion 508, a cap 509, an insulating frame 510, a stem 512 as a metal pedestal and leads 513. Here, an X-axis, a Y-axis and a Z-axis are three-dimensional orthogonal coordinate axes. Directions of the X-axis, the Y-axis and the Z-axis correspond to a longitudinal direction, a width direction and a thickness direction respectively of the insulating frame 510 in the semiconductor laser apparatus 500.

The first and second semiconductor laser elements 501 and 502 are light sources of the semiconductor laser apparatus 500. The first semiconductor laser element 501 emits infrared wavelength laser light having for instance 780 nm oscillating wavelength. The first semiconductor laser element 501 is used for performing reading and recording information for instance for CD. The second semiconductor laser element 502 emits red wavelength laser light having for instance 650 nm oscillating wavelength. The second semiconductor laser element 502 light is used for performing reading and recording information for instance for DVD.

The sub-mount 503, the light-receiving element 503a for monitoring, the laser light stand-up mirror 504, the half wavelength plate 505, the light-receiving element 506 for detecting a signal, the hologram element 507, the insulating frame 510 and the leads 513 in the semiconductor laser apparatus 500 have the similar functions as the silicon sub-mount, the light-receiving element 202 for monitoring, the optical axis conversion mirror 204, the half wavelength plate 205, the light-receiving element 210, the hologram element 208, the insulating frame 211 and the leads 218 in the above mentioned semiconductor laser apparatus 200, and the explanation is omitted.

A plurality of leads (in this embodiment, twelve leads) 513 are formed on a surface facing another side in the Z-axis direction of the stem 512 so that the leads 513 can project to another side in the Z-axis direction of from the surface. That is, the leads 513 kept under a condition electrically insulated from the stem 512 are attached to the stem 513. The insulating frame 510 is fixed by adhesive and is mounted on the surface facing one side in the Z-axis direction of the stem 512. The frame concave portion 511 which is opened to one side in the Z-axis direction and is substantially rectangle is formed on a central portion of the insulating frame 510. The pedestal portion 508 is arranged on a bottom portion of the frame concave portion 511.

The sub-mount 503, the laser light stand-up mirror 504 and the light-receiving element 506 for detecting a signal (hereinafter there is a case where the light-receiving element for detecting a signal is simply represented as light-receiving element) are mounted on a surface facing one side in the Z-axis direction of the pedestal portion 508. The sub-mount 503 is mounted on another end portion in the X-axis direction and another end portion in the Y-axis direction of the pedestal portion 508. The laser light stand-up mirror (hereinafter there is a case where the laser light stand-up mirror is represented as stand-up mirror) 504 is mounted on the other end portion in the X-axis direction and one end portion in the Y-axis direction of the pedestal portion 508. The half wavelength plate (hereinafter, there is a case where the half wavelength plate is represented as $\lambda/2$ plate) 505 is arranged on the laser light stand-up mirror 504. The light-receiving element 506 is mounted on one side in the X-axis of the sub-mount 503 and the laser light stand-up mirror 504 of the pedestal portion 508.

The first and second semiconductor laser elements 501 and 502 are mounted on one end in the Y-axis direction of the sub-mount 503 in parallel in the X-axis direction. The light-receiving element 503a for monitoring is formed on another side in the Y-axis direction of the first and second semiconductor laser elements 501 and 502 of the sub-mount 503.

Covering one side in the Z-axis direction of the insulating frame 510 with the cap 509 makes the frame concave portion 511 sealed to avoid physical contact of optical elements such as the first and second semiconductor laser elements 501 and 502, the stand-up mirror 504 and the light-receiving element 506 on the pedestal portion 508 with the outside.

The hologram element 507 is mounted on a surface facing one side in the Z-axis of the cap 509. The hologram element 507 comprises a polarization grating for generating three beams and a hologram pattern which are not shown. The polarization grating for generating three beams is formed on a surface facing the cap 509 of the hologram element 507 and the hologram pattern is formed on a surface parallel to the surface on which the polarization grating for generating three beams is formed.

In addition, a notch portion 514 caving toward one side in the X-axis direction of the stem 512 is formed on another end in the X-axis direction of the stem 512. The notch portion 514 is formed in substantially V shape when the notch portion 514 is viewed from one side in the Z-axis of the stem 512. Forming the notch portion 514 on the stem 512 enables position adjustment and rotation adjustment of the semiconductor laser apparatus 500 to be easily performed with use of a jig adaptable to the notch portion 514 at the time of practical installation of the semiconductor laser apparatus 500.

Laser light emitted from the first semiconductor laser element 501 on one side in Y-axis direction is incident on the stand-up mirror 504 on which the $\lambda/2$ plate 505 is arranged. As to the laser light emitted from the first semiconductor laser element 501 and being incident on the mirror 504 on which the $\lambda/2$ plate 505 is arranged, the laser light is reflected and is incident on the polarization grating for generating three beams of the hologram element 507. The laser light being incident on the polarization grating for generating three beams is diffracted and is split into three laser lights. These three laser lights pass through the hologram pattern of the hologram element 507 and is converged on an optical recording medium not shown. The laser light reflected by the optical recording medium is diffracted by the hologram pattern of the hologram element 507 and is incident on the predetermined light-receiving portion of the light-receiving element 506.

Laser light emitted from the second semiconductor laser element 502 on one side in Y-axis direction is incident on the stand-up mirror 504 on which the $\lambda/2$ plate 505 is arranged. As to the laser light emitted from the second semiconductor laser element 501 and being incident on the mirror 504 on which the $\lambda/2$ plate 505 is arranged, polarization direction of the laser light is rotated at an angle of 90 degrees and is reflected and is incident on the polarization grating for generating three beams of the hologram element 507. The laser light being incident on the polarization grating for generating three beams is not diffracted and is transmitted and passes through the hologram pattern of the hologram element 507 and is converged on an optical recording medium not shown. The laser light reflected by the optical recording medium is diffracted by the hologram pattern of the hologram element 507 and is incident on the predetermined light-receiving portion of the light-receiving element 506.

As mentioned above, as to the laser light which is used for a case of reading information of DVD or the like and is emitted from the second semiconductor laser element 502, the laser light is not diffracted by the grating formed on the hologram element 507 with difference from the prior art. Consequently, the optical pick-up apparatus using the semiconductor laser apparatus 500 can suppress reduction of optical utilization efficiency with loss of quantity of light caused by reduction of quantity of light of laser light to be naturally converged on the optical recording medium.

In the above mentioned embodiment, description is given about the optical pick-up apparatus provided with the semiconductor laser apparatus according to the invention, but this invention is not restricted to this optical pick-up apparatus. Another optical pick-up apparatus provided with a semiconductor laser apparatus may be allowed.

In addition, in the above mentioned embodiment semiconductor laser apparatus, description is given about the semiconductor laser apparatus configured by the hologram element integrated with the insulating frame or the silicon substrate, but in another embodiment of a semiconductor laser apparatus, the semiconductor laser apparatus may not be configured by the hologram element integrated with the insulating frame or the silicon substrate. In this case, since rotation adjustment of the semiconductor laser apparatus becomes unnecessary, there is no necessity in forming two outer circumferential portions facing each other in the longitudinal direction of frame circumference portion in a shape of an arc.

In addition, in the above mentioned embodiment of the optical pick-up apparatus provided with the semiconductor laser apparatus according to the invention, one semiconductor laser element comprising two oscillating points formed on one chip as the light source and respectively oscillating two laser lights having different oscillating wavelength is used or two semiconductor laser elements respectively comprising one oscillating point formed on a separate chip, but combination of these semiconductor laser elements may be used without restriction of the above mentioned use of these semiconductor laser elements.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical pick-up apparatus comprising:
a light source for emitting laser light in two wavebands;
a light-receiving element for receiving laser light which is emitted from the light source and is reflected by an optical recording medium; and
a diffraction grating having polarization characteristics between the light source and the optical recording medium by which the laser light emitted from the light source and being incident is transmitted without diffraction when a polarization direction for the laser light is equal to a predetermined first polarization direction and also by which the laser light emitted from the light source and being incident is diffracted when a polarization direction for the laser light is equal to a predetermined second polarization direction,
the optical pick-up apparatus performing at least one of processes for reading information of the optical recording medium and recording information on the optical recording medium by irradiating the optical recording medium by the laser light emitted from the light source on the optical recording medium, and
the polarization directions of the laser lights in the two wavebands being orthogonal with each other on a position on which the laser light is incident on the diffraction grating,
wherein the light source emits the first and second polarization directional laser lights which are parallel to each other, and a half wavelength plate is arranged between the diffraction grating and the light source so as not to have an effect on a polarization direction for the second polarization directional laser light and so as to change a polarization direction for the first polarization directional laser light.

2. A semiconductor laser apparatus comprising:
a light source for emitting laser light in a plurality of wavebands and installed so that polarization directions of a plurality of laser lights emitted therefrom can be parallel to each other;
an optical axis conversion mirror for changing a traveling direction of laser light emitted from the light source and provided with a half wavelength plate for changing a polarization direction for laser light in one of wavebands; and
a light-receiving element for receiving reflected light of laser light which is emitted from the light source and is transmitted in one direction; and
a polarization diffraction grating having polarization characteristics by which diffraction efficiency for laser light in a predetermined first polarization direction is greater than diffraction efficiency for laser light in a second polarization direction orthogonal to the first polarization direction.

3. A semiconductor laser apparatus comprising:
a light source for emitting laser light in a plurality of wavebands and installed so that polarization directions of a plurality of laser lights emitted therefrom can be parallel to each other;
an optical axis conversion mirror for changing a traveling direction of laser light emitted from the light source and provided with a half wavelength plate for changing a polarization direction for laser light in one of wavebands; and
a light-receiving element for receiving reflected light of laser light which is emitted from the light source and is transmitted in one direction; and
a hologram for diffracting reflected light of laser light transmitted in one direction into a direction of the light-receiving element,
the hologram having polarization characteristics by which diffraction efficiency for laser light in a predetermined first polarization direction is greater than diffraction efficiency for laser light in a second polarization direction orthogonal to the first polarization direction.

* * * * *